(12) United States Patent
Hashimoto et al.

(10) Patent No.: US 9,225,923 B2
(45) Date of Patent: Dec. 29, 2015

(54) IMAGING APPARATUS, IMAGING SYSTEM, IMAGING APPARATUS DRIVING METHOD, AND IMAGING SYSTEM DRIVING METHOD

(71) Applicant: CANON KABUSHIKI KAISHA, Tokyo (JP)

(72) Inventors: Seiji Hashimoto, Yokohama (JP); Atsushi Furubayashi, Tokyo (JP); Takeru Suzuki, Kawasaki (JP); Kazuhiro Sonoda, Yokohama (JP); Daisuke Yoshida, Ebina (JP); Hirofumi Totsuka, Fujisawa (JP); Takashi Muto, Kawasaki (JP); Yasushi Matsuno, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 13/777,087

(22) Filed: Feb. 26, 2013

(65) Prior Publication Data

US 2013/0229555 A1 Sep. 5, 2013

(30) Foreign Application Priority Data

Mar. 1, 2012 (JP) ................ 2012-045653
Jan. 8, 2013 (JP) ................ 2013-001084

(51) Int. Cl.
*H04N 9/083* (2006.01)
*H04N 3/14* (2006.01)
*H04N 5/378* (2011.01)
*H04N 5/369* (2011.01)

(52) U.S. Cl.
CPC .............. *H04N 5/378* (2013.01); *H04N 5/3696* (2013.01)

(58) Field of Classification Search
CPC ............ H04N 5/3745; H04N 5/37452; H04N 5/37455; H04N 5/3693; H04N 5/374578; H04N 5/375
USPC ........... 348/294, 300, 572; 341/126, 155, 172
See application file for complete search history.

(56) References Cited

U.S. PATENT DOCUMENTS

2013/0107087 A1* 5/2013 Okada et al. .................. 348/280

FOREIGN PATENT DOCUMENTS

| CN | 101115142 A | 1/2008 |
|---|---|---|
| CN | 101360190 A | 2/2009 |
| EP | 2257045 A2 | 12/2010 |
| JP | 2000-156823 A | 6/2000 |
| JP | 2001-83407 A | 3/2001 |
| WO | 2012/001868 A1 | 1/2012 |

* cited by examiner

*Primary Examiner* — Antoinette Spinks
(74) *Attorney, Agent, or Firm* — Canon USA, Inc. IP Division

(57) ABSTRACT

Pixels output a first signal based on signal charge of a part of photoelectric conversion units of multiple photoelectric conversion units, and a second signal based on signal charge of multiple photoelectric conversion units. An imaging apparatus outputs signals based on the first signals and signals based on the second signals by reducing the number of signals based on the first signals as compared to the number of signals based on the second signals.

18 Claims, 40 Drawing Sheets

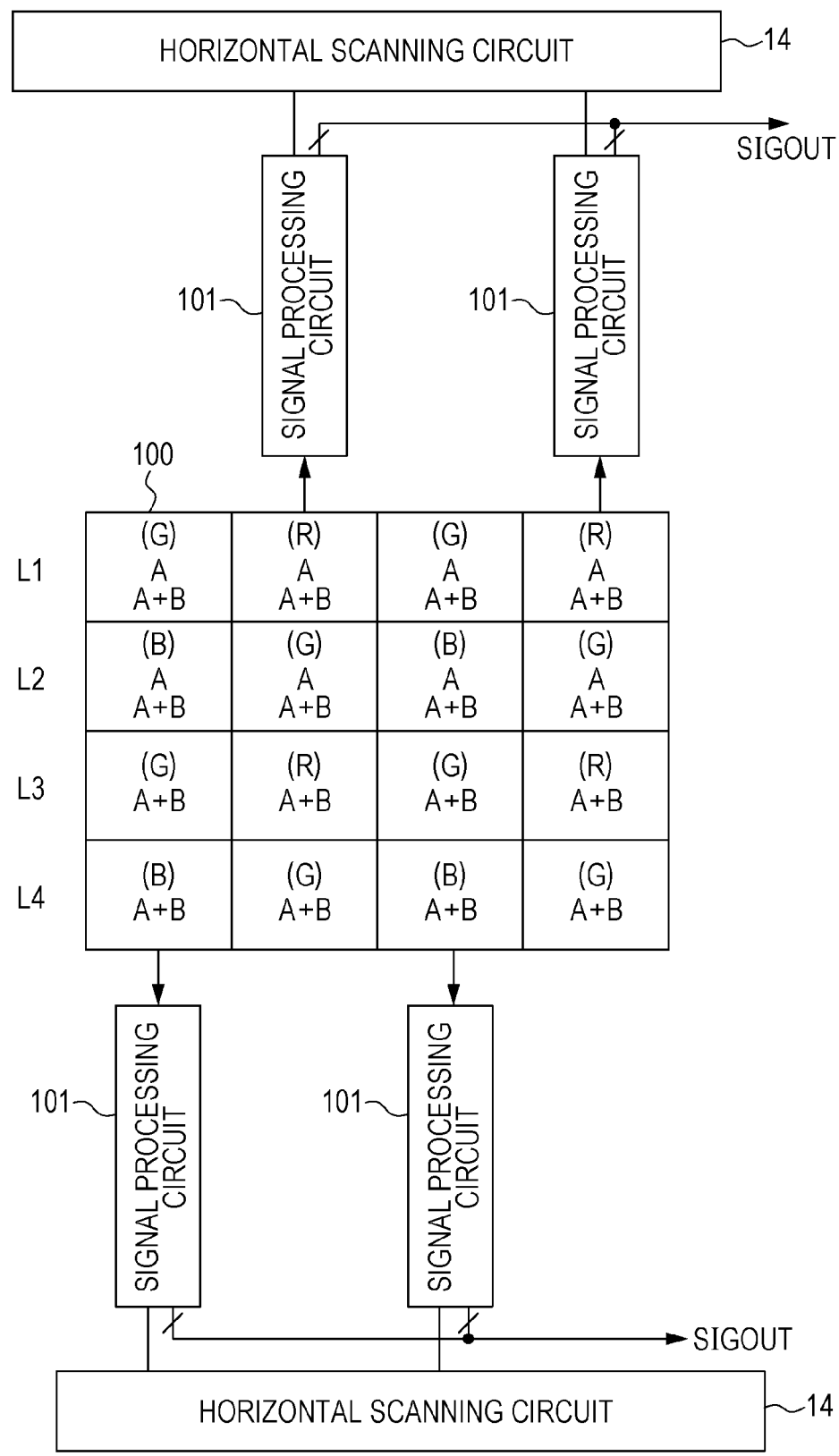

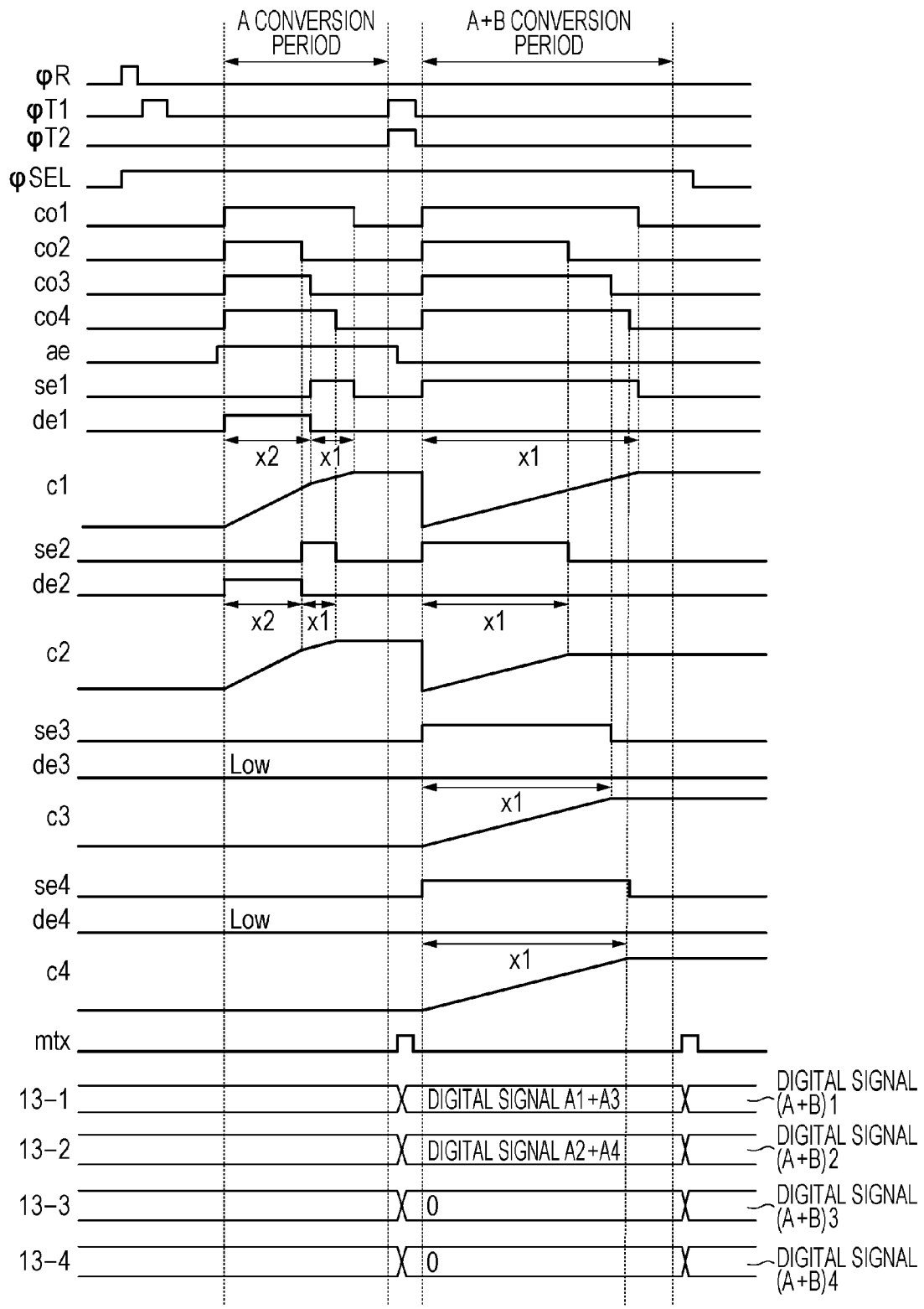

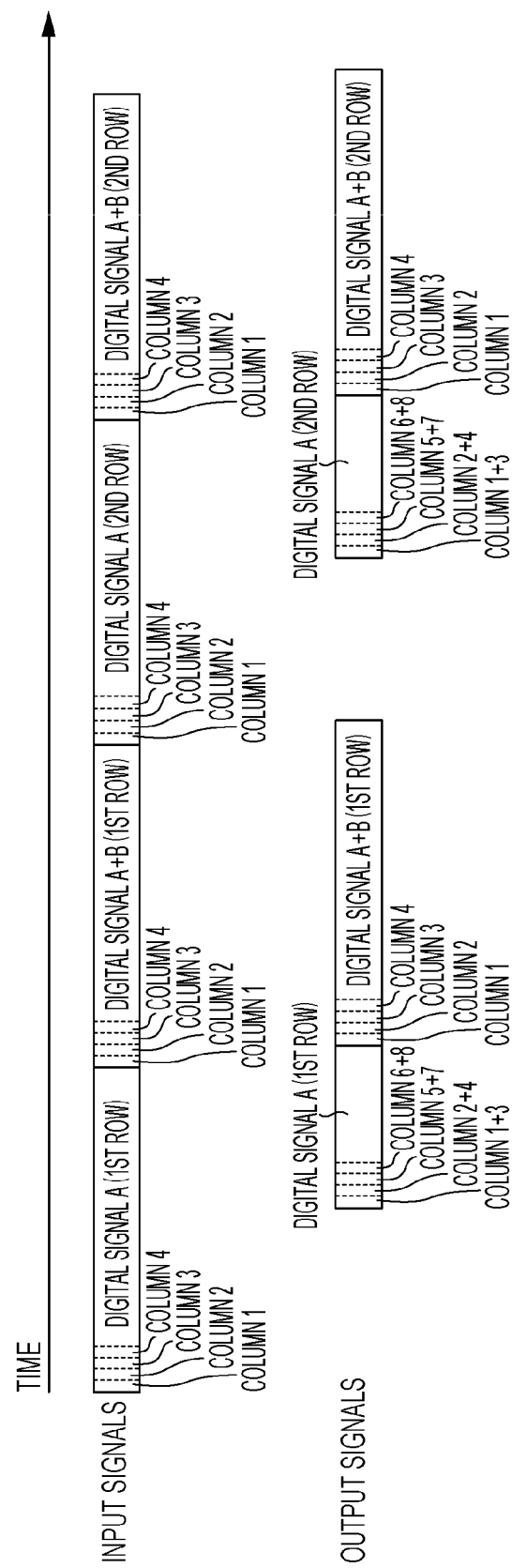

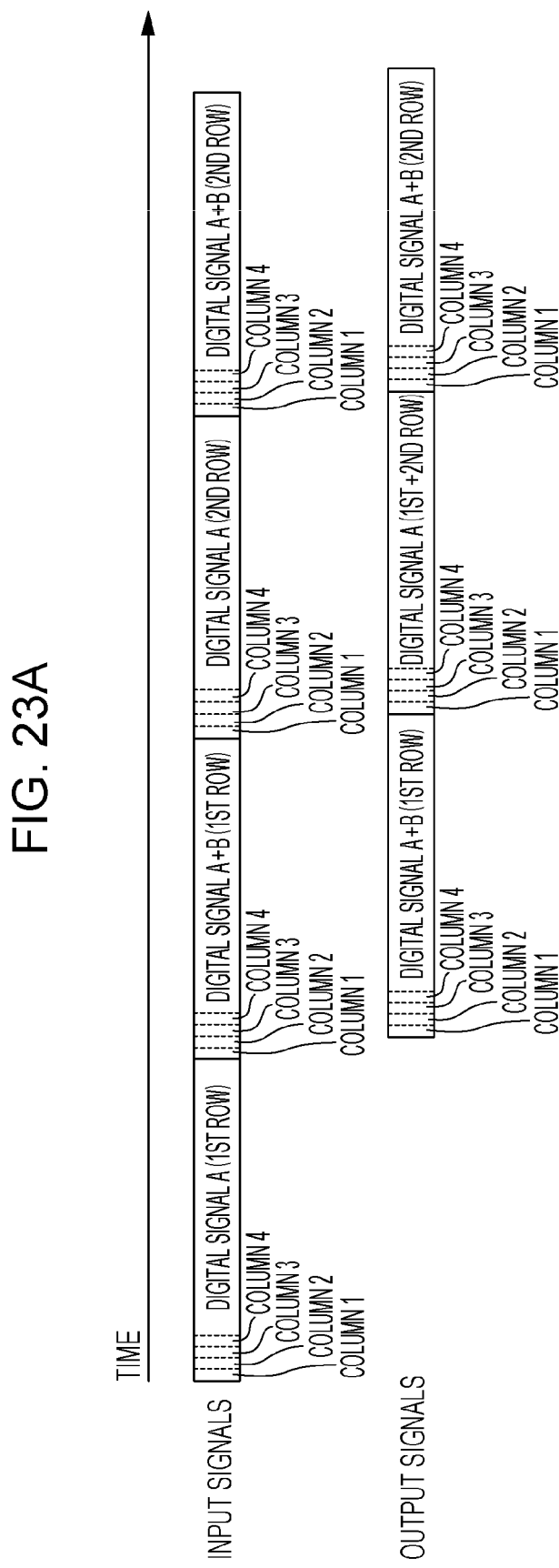

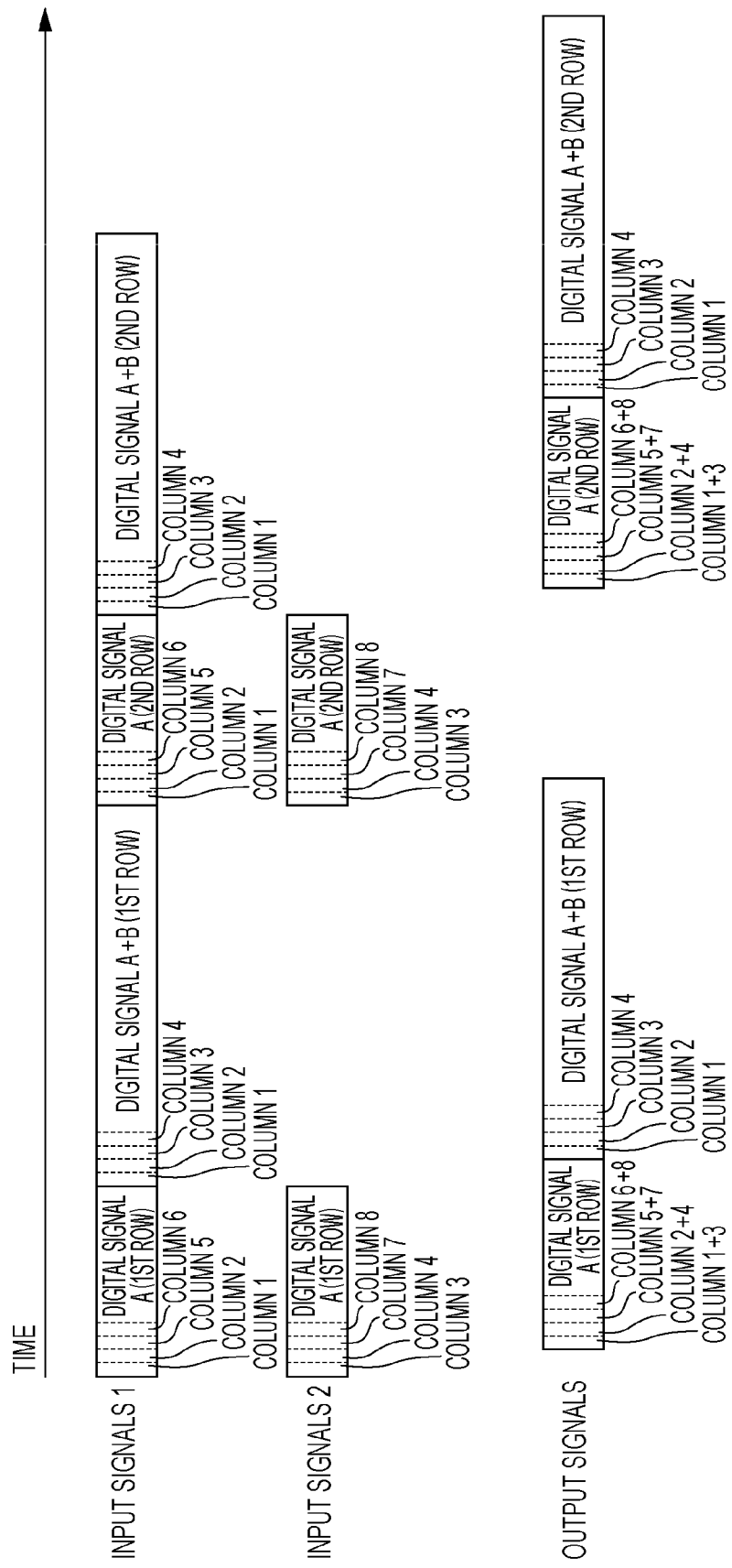

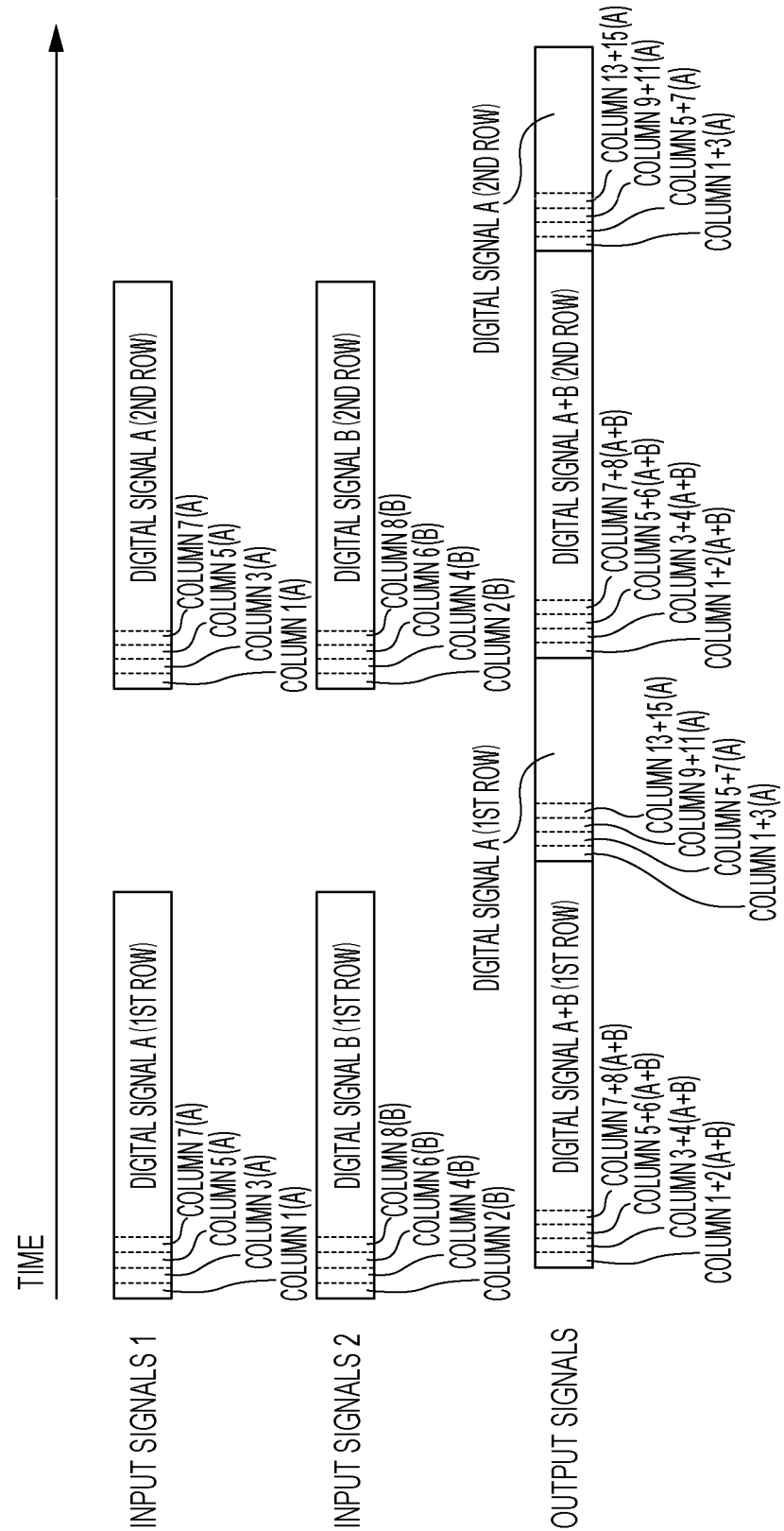

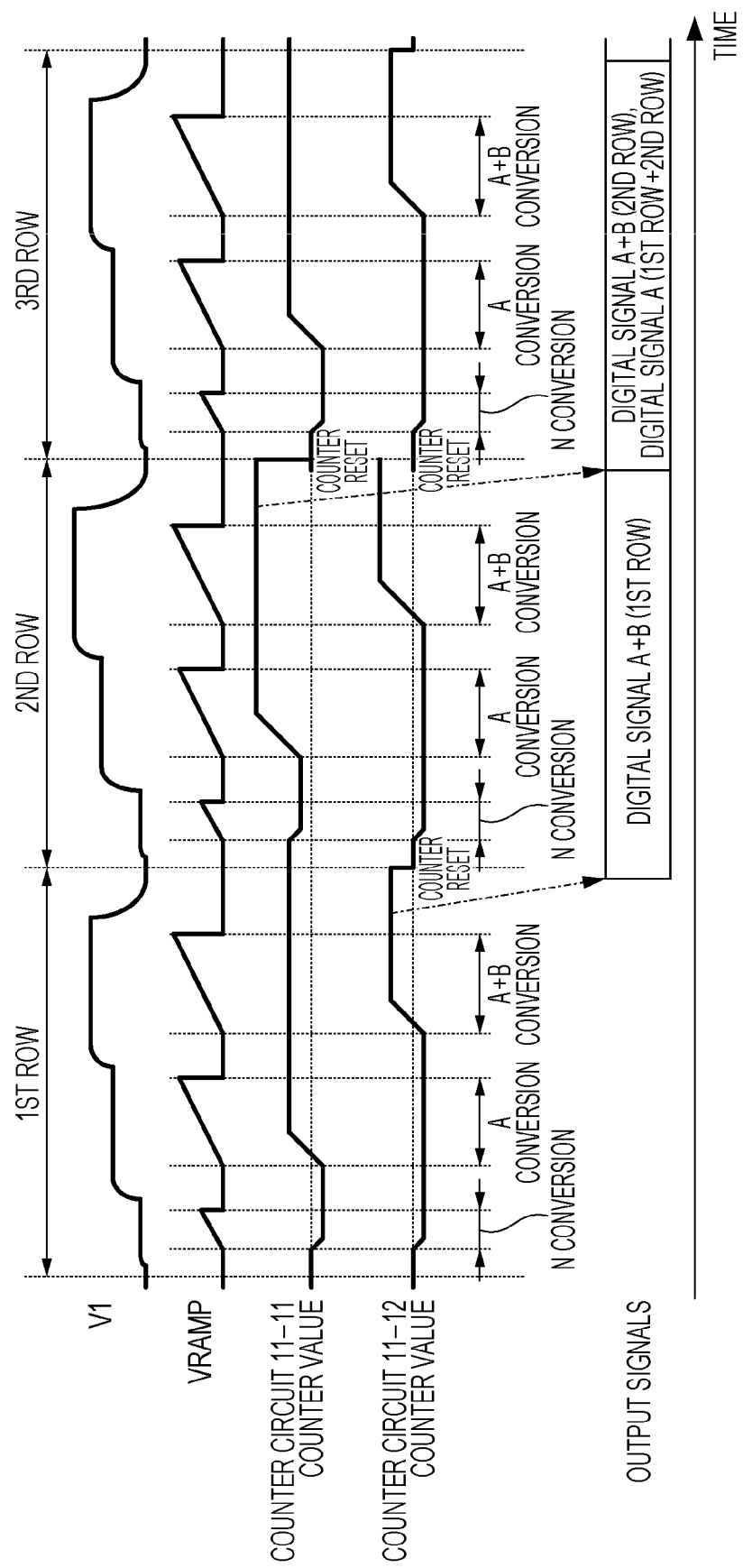

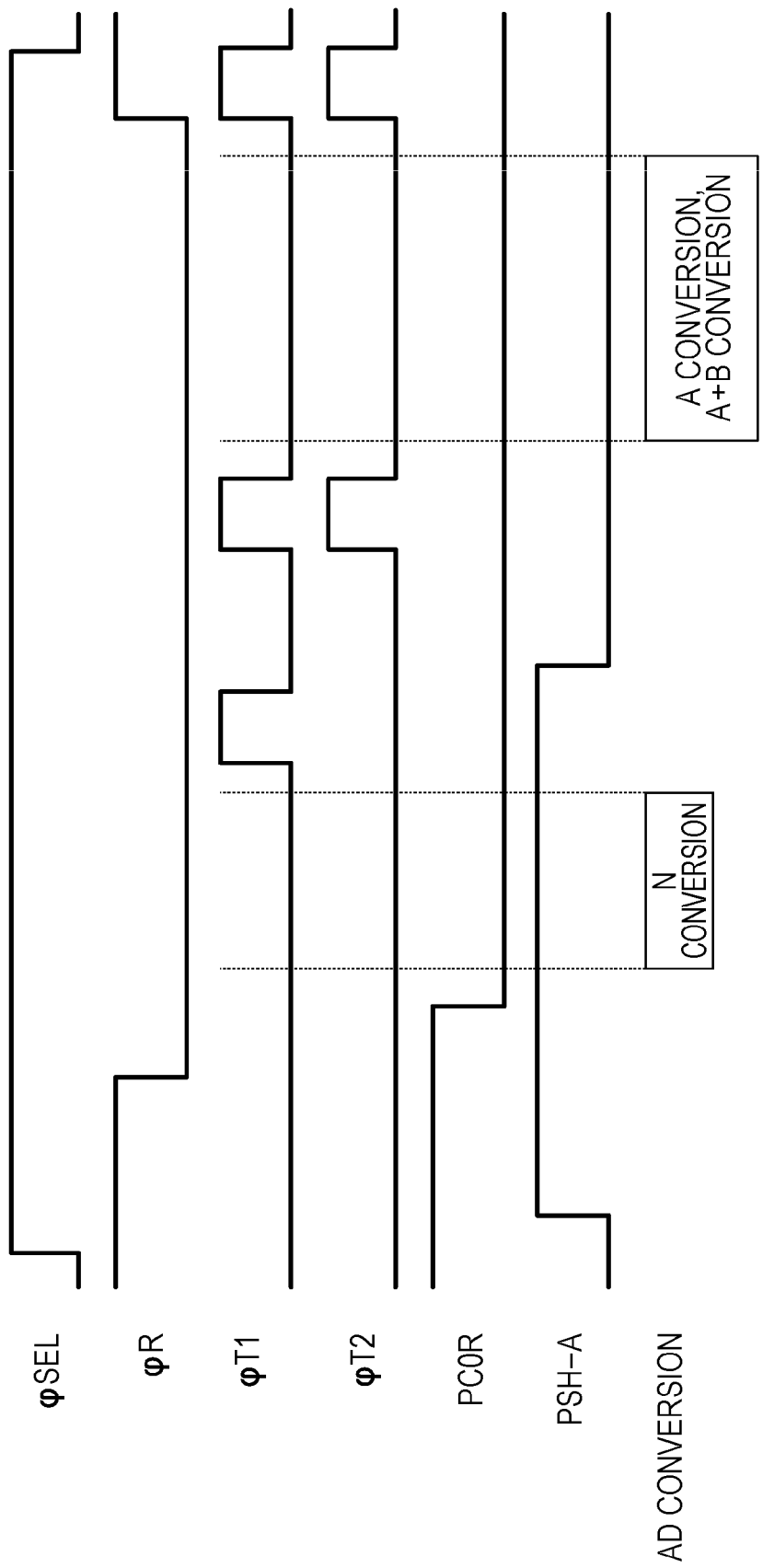

IMAGING APPARATUS, IMAGING SYSTEM, IMAGING APPARATUS DRIVING METHOD, AND IMAGING SYSTEM DRIVING METHOD

BACKGROUND OF THE INVENTION

1. Field of the Invention

One disclosed aspect of the embodiments relates to an imaging apparatus and an imaging system, which include multiple pixels including multiple photoelectric conversion units.

2. Description of the Related Art

Heretofore, there has been known an imaging apparatus which include multiple pixels including multiple photoelectric conversion units and outputs a signal based on one of the photoelectric conversion units, and a signal based on a part of photoelectric conversion units of the other photoelectric conversion units. As for an embodiment using at least these two signals, a focal-point detecting method to perform focal-point detection of the phase difference detecting method has been proposed, for example. As an example of an imaging apparatus which outputs a signal available for such a focal-point detecting method, there has been an imaging apparatus to which a pair of photoelectric conversion units are provided for each micro lens of a micro lens array arrayed in a two-dimensional manner. With Japanese Patent Laid-Open No. 2001-83407, there has been proposed an imaging apparatus wherein addition or non-addition of a signal output from a pair of photoelectric conversion units to which light is input via one micro lens may optionally be performed in increments of pixels including a pair of photoelectric conversion units.

Also, with Japanese Patent Laid-Open No. 2000-156823, there has been described an imaging apparatus including pixels for distance measurement and pixels for imaging operates according to three types of readout methods of a still-image shooting mode, thinning mode, and distance measurement mode. With the still-image shooting mode, though pixel signals of pixels for distance measurement and pixels for imaging are output from the imaging apparatus, pixel signals from the pixels for distance measurement will not be used for the subsequent signal processing, and pixel signals for imaging alone will be used. The distance measurement mode is a mode wherein, contrary to the still-image shooting mode, pixel signals from the pixels for distance measurement are used without using pixel signals from the pixels for imaging in the subsequent signal processing. The thinning mode is a mode wherein at the time of outputting pixel signals from the imaging apparatus, pixel signals are output from the pixels for imaging alone, and pixel signals from the pixels for distance measurement are not output.

With the imaging apparatus disclosed in Japanese Patent Laid-Open No. 2001-83407, sufficient study has not been performed regarding how to obtain an image obtaining signal which is a signal based on multiple photoelectric conversion units, and also how to obtain a signal for performing focal-point detection in the phase difference detecting method, and a signal based on a part of the photoelectric conversion units at high speed. With the imaging apparatus disclosed in Japanese Patent Laid-Open No. 2000-156823, in order to obtain an image obtaining signal, operation has to be performed in one of the still-image shooting mode and thinning mode, and in order to obtain a focal-point detection signal, operation has to be performed in the distance measurement mode. Thus, in order to obtain both of an image obtaining signal and a focal-point detection signal, pixel signals have to be output by scanning pixels of a solid-state imaging element multiple times. Accordingly, with the imaging apparatuses disclosed in Japanese Patent Laid-Open Nos. 2001-83407 and 2000-156823, study has insufficiently been performed regarding how to obtain a signal based on a part of the photoelectric conversion units of the multiple photoelectric conversion units from the imaging apparatus at high speed, and also how to obtain a signal based on the multiple photoelectric conversion units.

SUMMARY OF THE INVENTION

An embodiment is an imaging apparatus including: a plurality of pixels arrayed in a matrix shape, each including a plurality of photoelectric conversion units configured to generate signal charge, and to output a signal based on the signal charge, wherein at least each of a part of the pixels of the plurality of pixels outputs a first signal based on m (m is an integer) photoelectric conversion units which each of the pixels includes, the signal charge of n (n is an integer less than m) photoelectric conversion units within one frame period, and wherein each of the plurality of pixels outputs a second signal based on the signal charge of the m photoelectric conversion units which each of the plurality of pixels includes, within the one frame period, and wherein the number of signals based on the first signals which the imaging apparatus outputs is less than the number of signals based on the second signals which the imaging apparatus outputs.

Also, an embodiment is an imaging system including: an imaging apparatus, and a focal-point detection signal processing unit, wherein the imaging apparatus includes a plurality of pixels arrayed in a matrix shape; and wherein each of the plurality of pixels includes a plurality of photoelectric conversion units configured to generate signal charge, and wherein at least each of a part of the pixels of the plurality of pixels outputs a first signal based on m (m is an integer) photoelectric conversion units which each of the pixels includes, the signal charge of n (n is an integer less than m) photoelectric conversion units within one frame period, and wherein each of the plurality of pixels outputs a second signal based on the signal charge of the m photoelectric conversion units which each of the plurality of pixels includes, within the one frame period and wherein the imaging apparatus outputs each of a signal based on the second signals of the plurality of pixels and a signal based on the first signal, to the focal-point detection signal processing unit, and wherein the focal-point detection signal processing unit outputs, of the signals based on the first signals of the plurality of pixels output to the focal-point detection signal processing unit, the signal based on the first signals of a part of the pixels of the plurality of pixels, and does not output the signal based on the first signals of the other pixels of the plurality of pixels.

Also, an embodiment is a driving method for an imaging apparatus including a plurality of pixels arrayed in a matrix shape, each of which includes a plurality of photoelectric conversion units configured to generate signal charge, the driving method comprising outputting, with at least a part of the pixels of the plurality of pixels, a first signal based on of m (m is an integer) photoelectric conversion units which each of the pixels includes, the signal charge of n (n is an integer less than m) photoelectric conversion units within one frame period outputting, with each of the plurality of pixels, a second signal based on the signal charge of the m photoelectric conversion units which each of the plurality of pixels includes, within the one frame period and outputting, with the imaging apparatus, the signals based on the first signals and the signals based on the second signals by reducing the number of signals based on the first signals as compared to the number of signals based on the second signals.

Also, an embodiment is a driving method for an imaging system including an imaging apparatus to perform signal processing of a signal output from the imaging apparatus, the imaging apparatus including a plurality of pixels arrayed in a matrix shape, each of which includes a plurality of photoelectric conversion units configured to generate signal charge, and a lens array including a plurality of micro lenses, with light condensed at one of the micro lenses being input to the plurality of photoelectric conversion units which the pixels include, the driving method comprising outputting, with at least a part of the pixels of the plurality of pixels, a first signal based on of m (m is an integer) photoelectric conversion units which each of the pixels includes, the signal charge of n (n is an integer less than m) photoelectric conversion units within one frame period outputting, with each of the plurality of pixels, a second signal based on the signal charge of the m photoelectric conversion units which each of the plurality of pixels includes, within the one frame period and outputting, with the imaging apparatus, the signals based on the first signals and the signals based on the second signals by reducing the number of signals based on the first signals as compared to the number of signals based on the second signals wherein the signal processing is processing to obtain a difference signal which is difference between the signal based on the first signal of the pixel, and the signal based on the second signal of the pixel, to perform focal-point detection using the difference signal and the signal based on the first signal of the pixel, and to form an image using the signal based on the second signal of the pixel.

Also, an embodiment is a driving method for an imaging system including an imaging apparatus to perform signal processing of a signal output from the imaging apparatus, the imaging apparatus including a plurality of pixels arrayed in a matrix shape, each of which includes a plurality of photoelectric conversion units configured to generate signal charge, and a lens array including a plurality of micro lenses, with light condensed at one of the micro lenses being input to the plurality of photoelectric conversion units which the pixels include, the driving method comprising, outputting, with each of the plurality of pixels, a first signal based on of m (m is an integer) photoelectric conversion units which each of the pixels includes, the signal charge of n (n is an integer less than m) photoelectric conversion units within one frame period, outputting, with each of the plurality of pixels, a second signal based on the signal charge of the m photoelectric conversion units which each of the plurality of pixels includes, within the one frame period, and outputting, with the imaging apparatus, the signal based on the first signal and the signal based on the second signal, wherein the signal processing is processing to output, of the signals based on the first signals of the plurality of pixels, the signals based on the first signals of a part of the pixels of the plurality of pixels, and not to output the signals based on the first signals of the other pixels of the plurality of pixels.

One disclosed aspect of the embodiments may provide an imaging apparatus which enables a signal based on a part of photoelectric conversion units of multiple photoelectric conversion units to be obtained at high speed and also enables a signal based on the multiple photoelectric conversion units to be obtained.

Further features of the disclosure will become apparent from the following description of exemplary embodiments with reference to the attached drawings.

BRIEF DESCRIPTION OF THE DRAWINGS

FIG. 2 is a schematic diagram exemplifying a pixel unit and a signal processing circuit regarding an imaging apparatus.

FIG. 19 is a diagram representing operation timing regarding the imaging apparatus according to another example.

FIG. 22B is a diagram representing operation timing regarding the imaging apparatus according to another example.

FIG. 23A is a diagram representing operation timing regarding an imaging apparatus according to another example.

FIG. 24B is a diagram representing operation timing regarding the imaging apparatus according to another example.

FIG. 26A is a diagram representing operation timing regarding an imaging apparatus according to another example.

FIG. 28B is a diagram representing operation timing regarding the imaging apparatus according to another example.

FIG. 31 is a diagram representing operation timing regarding the imaging apparatus according to another example.

DESCRIPTION OF THE EMBODIMENTS

First Embodiment

Hereinafter, an imaging apparatus according to the present embodiment will be described with reference to the drawings.

Pixels provided to the imaging apparatus according to the present embodiment output a signal serving as a basis of a focal-point detection signal for focal-point detection by the phase difference detecting method, and a signal serving as a basis of an image obtaining signal which is a signal for imaging. For example, a signal serving as a basis of a focal-point detection signal is output from multiple pixels arrayed in a line a linear shape or cross shape. The imaging apparatus processes a signal serving as a basis of a focal-point detection signal and a signal serving as a basis of an image obtaining signal to be output from pixels to output a focal-point detection signal and an image obtaining signal. Based on the focal-point detection signal output from the imaging apparatus, mutual phase difference of incident light may be detected. Based on this detected phase difference, focal-point detection may be performed.

Figure 1A:
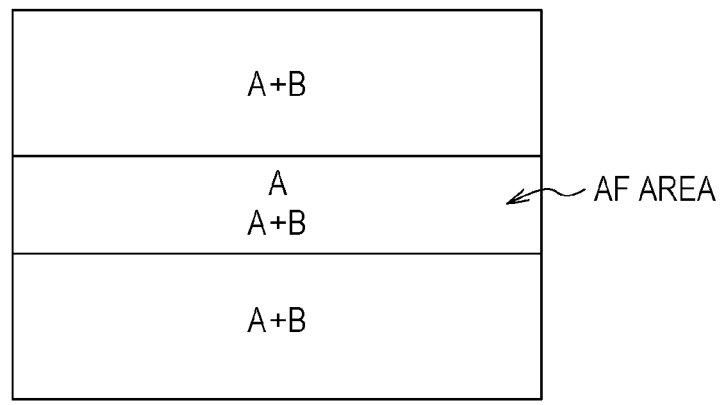
FIG. 1A is a schematic diagram illustrating an array example of pixels to be operated as focal-point detecting pixels.

FIG. 1A illustrates, with the imaging apparatus according to the present embodiment, an example of how to read out a signal that a pixel outputs (hereinafter, referred to as pixel signal). Each of the pixels according to the present embodiment has multiple photoelectric conversion units, as will be described later. A pixel signal to be output based on one signal charge of the multiple photoelectric conversion units will be referred to as a signal A. Also, a pixel signal to be output based on signal charge of the multiple photoelectric conversion units will be referred to as a signal A+B. A signal A is a signal serving as a basis of a focal-point detection signal which is a signal for detecting a focal point. The signal A+B is a signal serving as a basis of an image obtaining signal. The signal A+B is a second signal that a pixel outputs, and the signal A is a first signal that a pixel outputs.

Figure 1B:
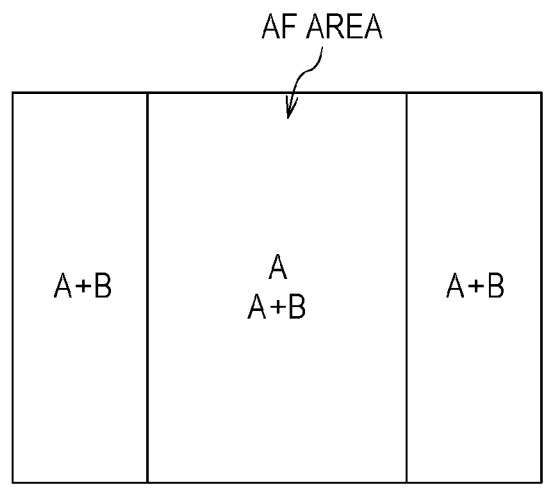
FIG. 1B is a schematic diagram illustrating another array example of pixels to be operated as focal-point detecting pixels.
Figure 1C:
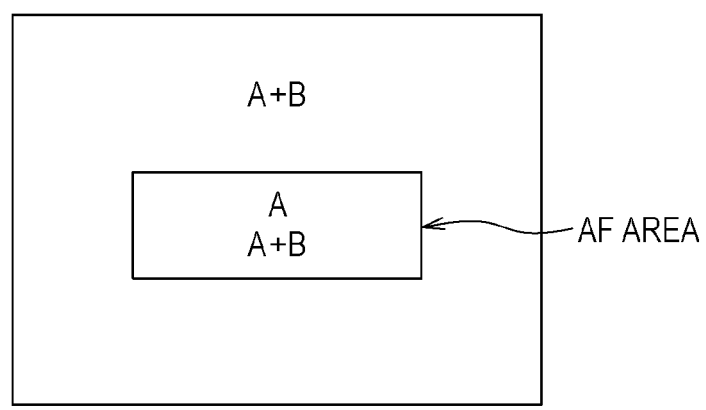
FIG. 1C is a schematic diagram illustrating another array example of pixels to be operated as focal-point detecting pixels.

FIGS. 1A to 1C schematically represent a mode wherein pixels are arrayed in multiple rows by multiple columns. FIG. 1A is a mode wherein all of the pixels in a part of rows output the signal A. Also, a pixel in an area where A and A+B are described together outputs the signal A, and then outputs the signal A+B. A pixel in an area described as A+B performs output of the signal A+B, but does not perform output of the signal A.

FIG. 2 illustrates a schematic diagram collectively illustrating a signal processing circuit and a horizontal scanning circuit which extract pixels in four rows by four columns which are part of the imaging apparatus illustrated in FIG. 1A, and also process the signal from a pixel. Pixels in FIG. 2 are arrayed in a Bayer array with four rows by four columns as basic units. Hereinafter, an area where pixels in multiple rows by multiple columns are arrayed will be referred to as a pixel unit. In FIG. 2, R (Red), G (Green), and B (Blue) which are colors of a color filter 22 provided to pixels are enclosed in parentheses, and a symbol to be output is notated therebelow. Specifically, a pixel in the first row counted from top of FIG. 2 and in the first column counted from the left has a green color filter, and indicates that the signal A and signal A+B are output in a time-sharing manner. In FIG. 2, all of the pixels in the first row L1 and second row L2 counted from top of the drawing output the signal A, and the signal A+B in a time-sharing manner. All of the pixels in the third row L3 and fourth row L4 counted from top of the drawing do not output the signal A but the signal A+B alone. Note that, unless otherwise noted, at the time of referring to a pixel as the X'th row (X is a natural number), all pixels are counted from top of the drawing through the present Specification. Similarly, at the time of referring to a pixel as the Y'th column (Y is a natural number) as well, unless otherwise noted, all pixels are counted from left of the drawing through the present Specification. A signal processing circuit 101 is provided to each column of pixels arrayed in multiple columns, a pixel signal is read out from each pixel based on the signal from a horizontal scanning circuit 14, and the read signal is output to the outside of the imaging apparatus. With the example of the imaging apparatus illustrated in FIG. 2, the two horizontal scanning circuits 14 are provided sandwiching a pixel area where pixels 100 are arrayed in a matrix shape. The signal processing circuits 101 are electrically connected to the same horizontal scanning circuit 14 every other row. According to this configuration, for example, the two horizontal scanning circuits 14 select the signal processing circuits provided to the first column and second column respectively, and accordingly, pixel signals may be output from the pixels 100 in the first column and second column at the same time.

Figure 3A:
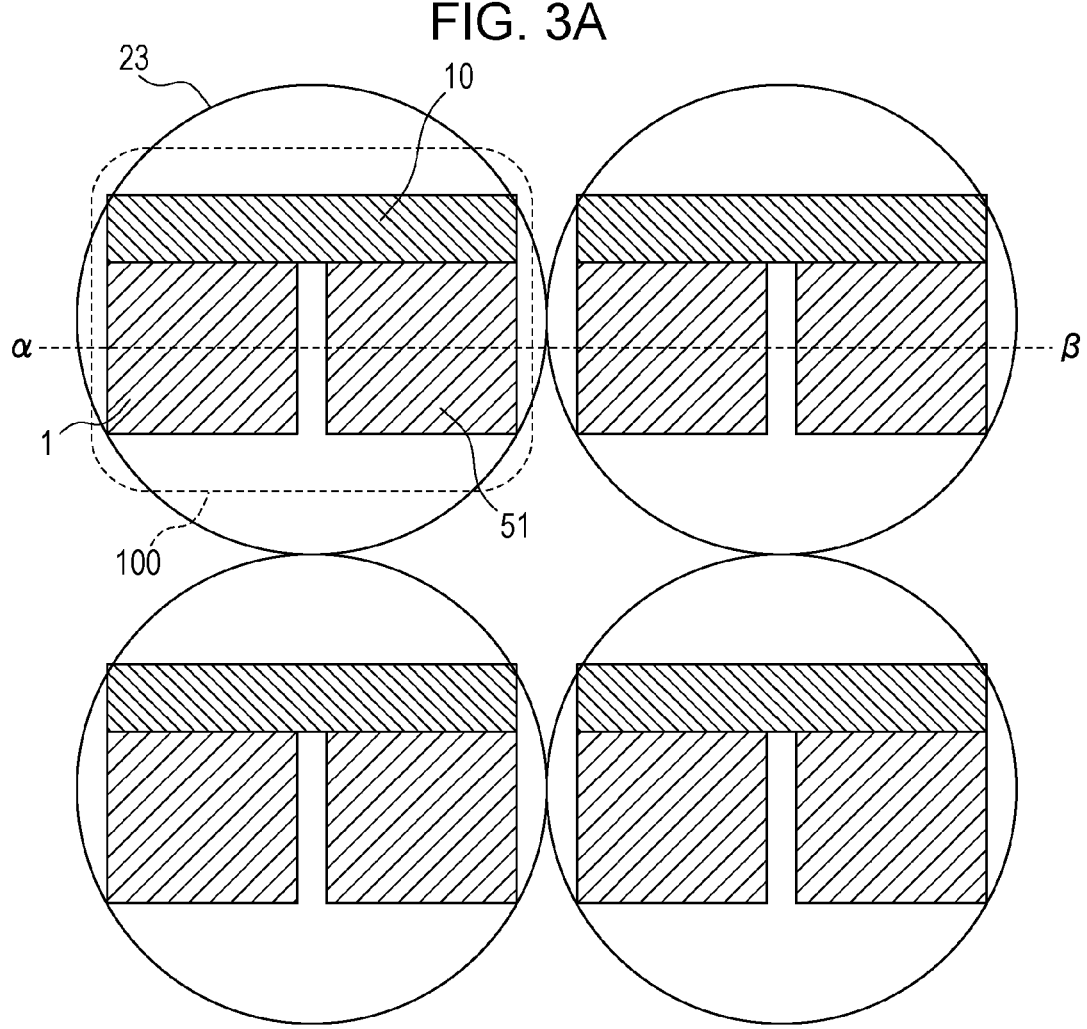
FIG. 3A is a diagram illustrating an array example regarding the pixel unit of the imaging apparatus.

FIG. 3A is a top-face schematic view of the imaging apparatus regarding the present embodiment. The pixels 100 include a first photodiode 1 which is a first photoelectric conversion unit, a second photodiode 51 which is a second photoelectric conversion unit, and an intra-pixel readout circuit unit 10 electrically connected to the photodiodes 1 and 51. Hereinafter, at the time of collectively representing the photodiodes 1 and 51 which the one pixel 100 includes, this is referred to as a light-receiving unit. One micro lens 23 is allocated so as to cover one light-receiving unit, and condenses light flux into the light-receiving unit. That is to say, one micro lens is provided corresponding to one light-receiving unit. Also, light condensed by one micro lens is input to multiple photoelectric conversion units included in the pixel 100 provided corresponding to one micro lens. The imaging apparatus according to the present embodiment includes a micro lens array including multiple micro lenses.

Figure 3B:
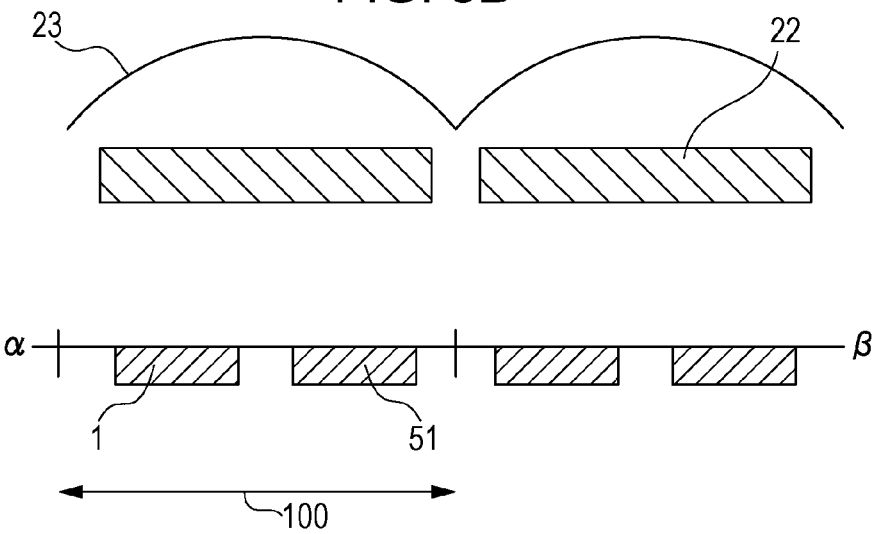
FIG. 3B is a diagram illustrating an array example regarding the pixel unit of the imaging apparatus.

Next, FIG. 3B illustrates the cross sections of the two pixels 100 of a portion indicated with a straight line α-β in FIG. 3A. The color filter 22 is provided between the micro lens 23 and the photodiodes 1 and 51.

Figure 4:
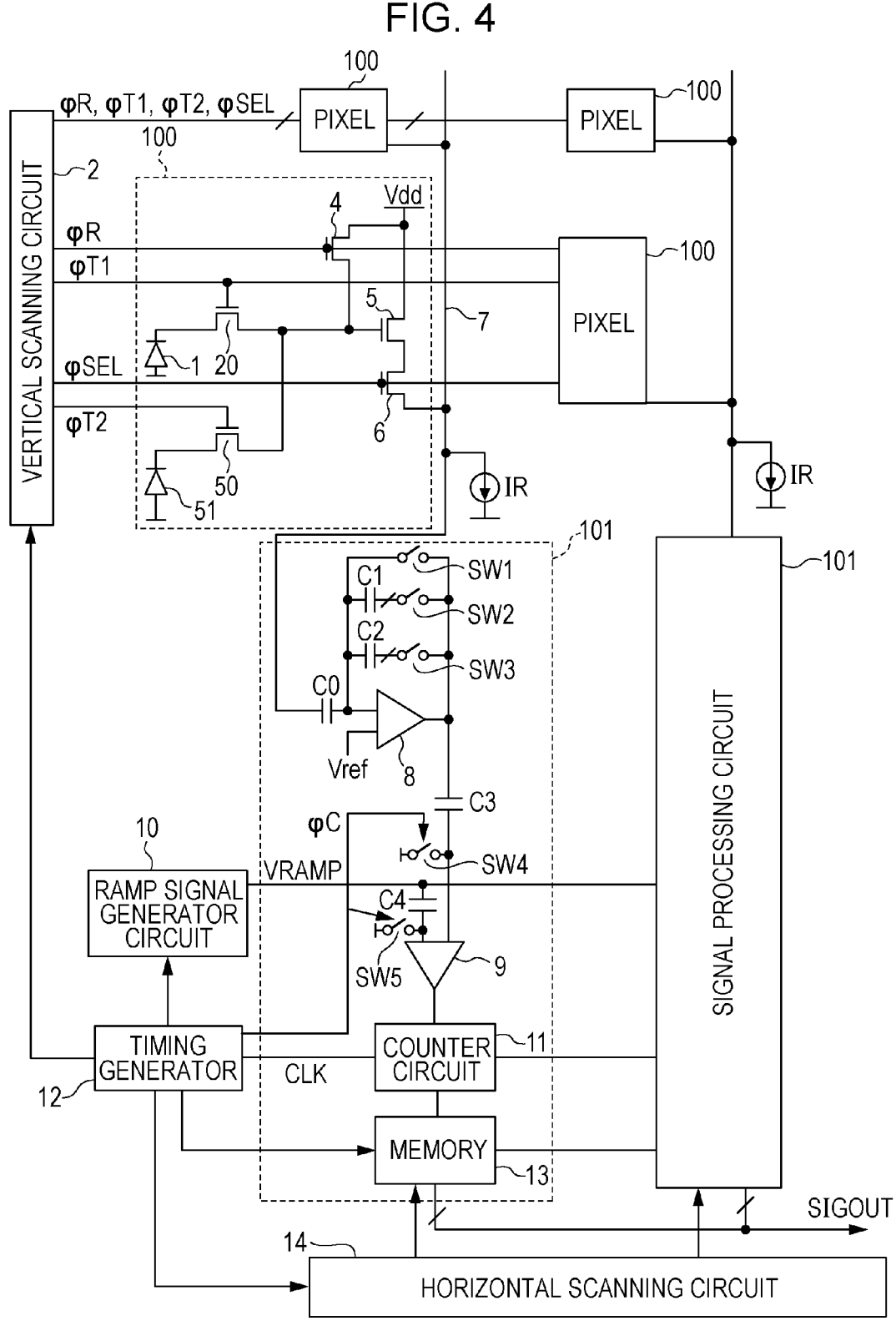
FIG. 4 is a schematic diagram regarding the imaging apparatus.

FIG. 4 is a schematic diagram schematically representing the imaging apparatus according to the present embodiment by extracting the pixels 100 in two rows by two columns, and the two columns of the signal processing circuits 101. Reference numeral 2 is a vertical scanning circuit, which is a vertical scanning circuit which selects a pixel for each row based on a timing signal from a timing generator 12 (hereinafter, referred to as TG 12) to output a pixel signal from a pixel.

Next, the pixels 100 will be described. The pixels 100 include transfer MOS transistors 20 and 50, a reset MOS transistor 4, an amplifier MOS transistor 5, and a selection MOS transistor 6. With the photodiodes 1 and 51, when light is input, signal charge occurs due to photoelectric conversion. Signal charge that the photodiode 1 holds is transferred to the input node of the amplifier MOS transistor 5 with a transfer pulse φT1 that a vertical scanning circuit 2 which will be described later with reference to FIG. 6 supplies to the gate of the transfer MOS transistor 20 being as a high level (hereinafter, will be referred to as H level. Similarly, a low level will be referred to as L level). Similarly, signal charge that the photodiode 51 holds is transferred to the input node of the amplifier MOS transistor 5 with a transfer pulse φT2 that the vertical scanning circuit 2 supplies to the gate of the transfer MOS transistor 50 being as H level. When changing a reset pulse φR that the vertical scanning circuit 2 supplies to the gate of the reset MOS transistor 4 to H level, the potential of the input node of the amplifier MOS transistor 5 is reset. The amplifier MOS transistor 5 outputs an electric signal to the selection MOS transistor 6 based on the signal charge transferred to the input node. The selection MOS transistor 6 outputs a signal that the amplifier MOS transistor 5 output to a vertical signal line 7 when a selection pulse φSEL to be supplied from the vertical scanning circuit 2 to the gate is H level.

A signal to be output to the vertical signal line 7 based on the potential of the input node of the amplifier MOS transistor 5 to which the signal charge from the photodiode 1 has been transferred is equivalent to the signal A. Also, a signal to be output to the vertical signal line 7 based on the potential of the input node of the amplifier MOS transistor 5 to which the signal charge from the photodiode 51 has been transferred is equivalent to the signal B. Also, signal charge that has been accumulated in each of the photodiodes 1 and 51 is transferred to the input node of the amplifier MOS transistor 5 with both of transfer pulses φT1 and φT2 being as H level. A signal to be output to the vertical signal line 7 based on the potential of the input node of the amplifier MOS transistor 5 is equivalent to the above-mentioned signal A+B. With the present embodiment, with regard to the signal B, i.e., the signal to be output to the vertical signal line 7 when signal charge alone held at the photodiode 51 after photoelectric conversion is transferred to the input node of the amplifier MOS transistor 5, output operation from the pixel 100 is not performed. The signal equivalent to the signal B is obtained by a later-described digital signal processing circuit performing difference processing between an image obtaining signal and a focal-point detection signal. This signal B is, as with the signal A, a signal serving as a basis of a focal-point detection signal to be used for focal-point detection. This is the end of description regarding the pixels 100.

Next, the signal processing circuit 101 will be described. Reference symbol C0 is clamp capacitor. Reference numeral 8 is an operational amplifier, and amplifies and outputs pixel signals output from the pixels 100 via the clamp capacitor C0. Feedback capacitors C1 and C2 are provided to a feedback path of the operational amplifier 8 along with switches SW1 and SW3, respectively. Reversal gain according to a capacity ratio between summation Cf_total of capacity values of the feedback capacitors serially connected to the switches SW2 and SW3 which are an electro-conductive state with respect to the output terminal and input terminal of the operational amplifier 8 of the feedback capacitors C1 and C2, and the clamp capacitor C0 occurs on the output terminal of the operational amplifier 8.

A signal output from the operational amplifier 8 is input to a comparator circuit 9 via a clamp capacitor C3. With the comparator circuit 9, a ramp signal VRAMP of which the voltage value is changed depending on time is supplied from the ramp signal generator circuit 10 via a clamp capacitor C4. The comparator circuit 9 performs comparison between the ramp signal VRAMP and a signal to be output from the operational amplifier 8 via the clamp capacitor C3, and outputs a latch signal LAT which is a signal based on the comparison result to a counter circuit 11. Specifically, when a magnitude relation between the ramp signal VRAMP and the signal output from the operational amplifier 8 reverses, the signal level of the latch signal LAT that the comparator circuit 9 outputs is changed. A clock pulse signal CLK is output to the counter circuit 11 from the TG 12. The counter circuit 11 generates a count signal obtained by counting the clock pulse signal CLK since the ramp signal generator circuit 10 started change in the voltage value of the ramp signal VRAMP depending on time until the latch signal LAT from the comparator circuit 9 is changed. When the latch signal LAT output from the comparator circuit 9 changes, the counter circuit 11 ends counting of the clock pulse signal CLK, and also holds the count signal when the latch signal LAT changes. When a period for changing the ramp signal VRAMP is ended, memory 13 which is a signal holding unit performs acquisition of the count signal held at the counter circuit 11, and holds the count signal. The horizontal scanning circuit 14 sequentially selects memory 13 of each column based on the timing signal from the TG 12, and transfers the count signal held at the memory 13 of each column. A signal output by this horizontal scanning circuit 14 is an output signal SIGOUT that the imaging apparatus outputs. The output signal SIGOUT according to the present embodiment is a later-described digital signal N, digital signal A, and digital signal A+B. That is to say, the output signal SIGOUT is a signal based on a pixel signal. Also, the digital signal A+B is a signal based on the second signal, and the digital signal A is a signal based on the first signal. With the present embodiment, the signal based on the second signal is an image obtaining signal, and the signal based on the first signal is a focal-point detection signal. Note that the ramp signal VRAMP is an example of a reference signal to be compared with an analog signal at the comparator circuit 9.

Figure 5:
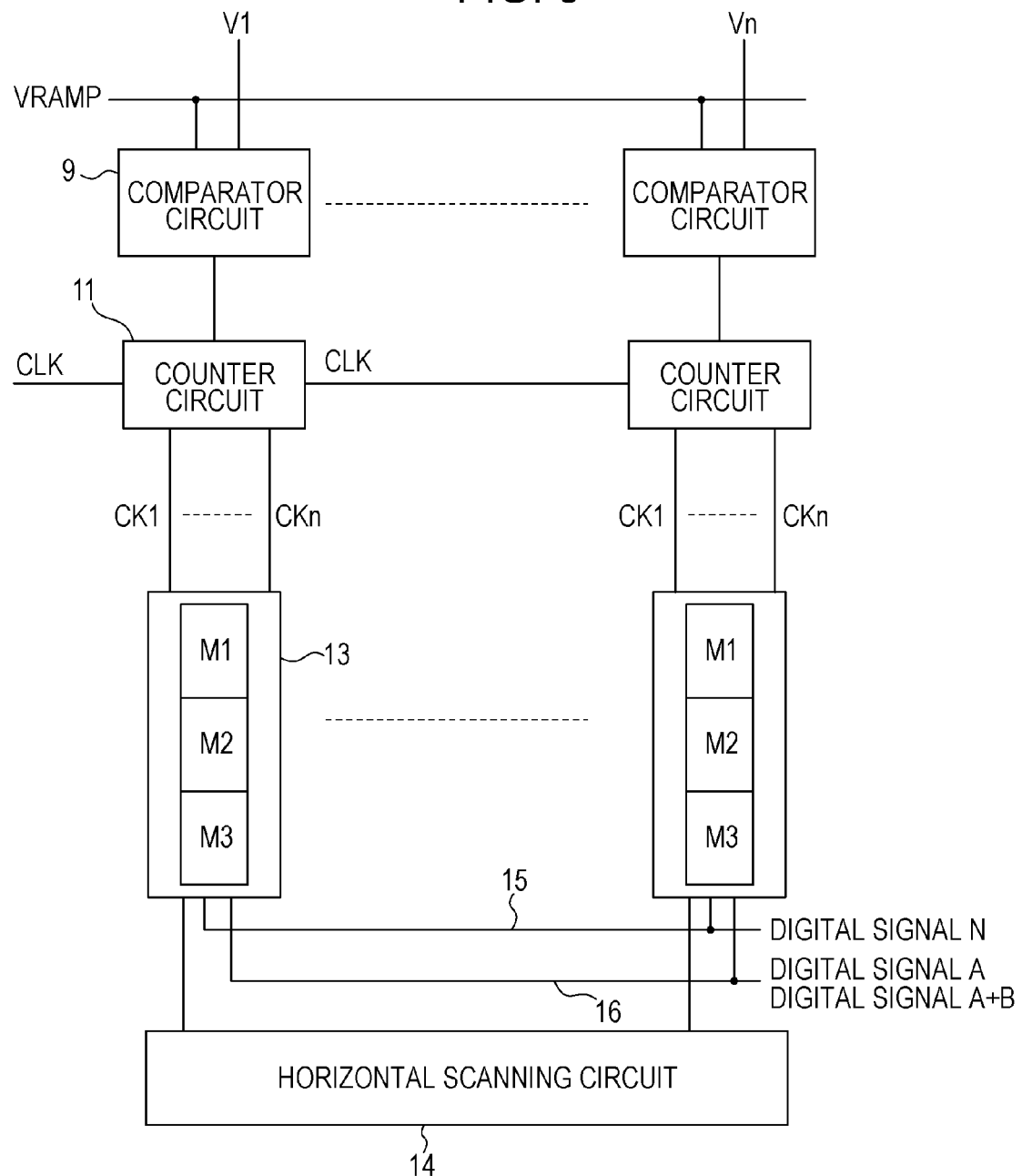
FIG. 5 is a schematic diagram illustrating an example of an analog-to-digital conversion circuit of the imaging apparatus.
Figure 7A:
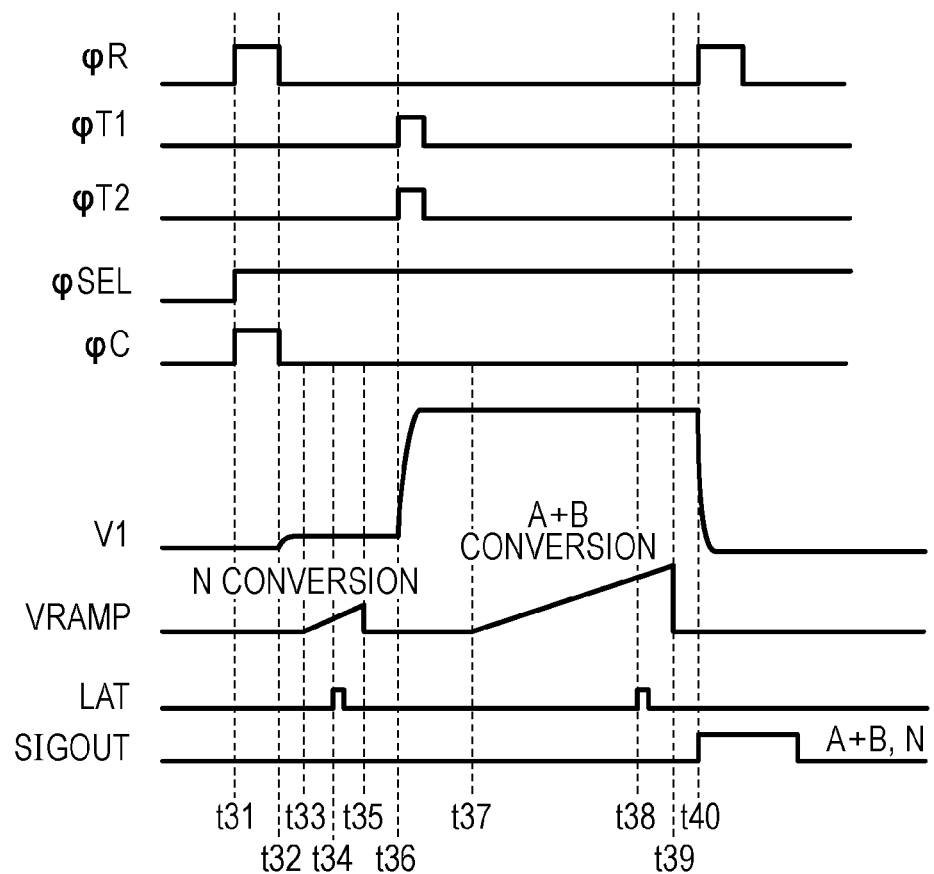
FIG. 7A is a diagram representing operation timing of another example regarding the imaging apparatus.
Figure 7B:
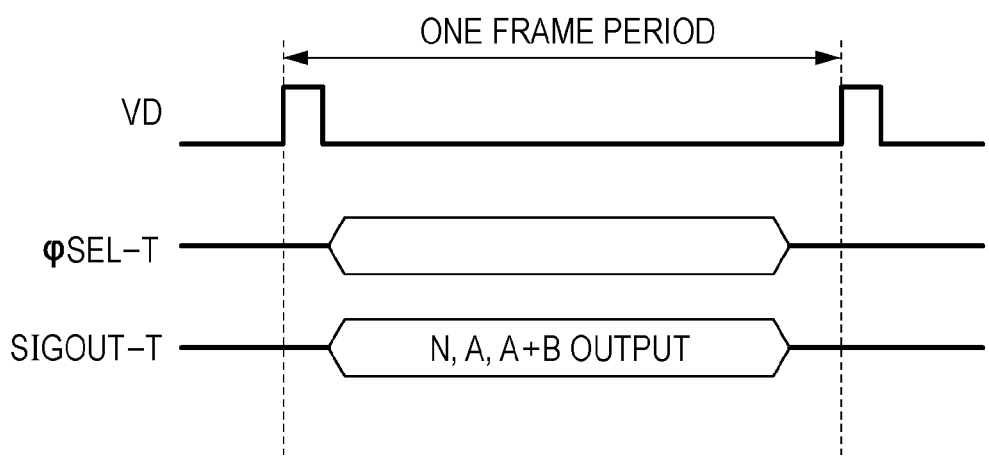
FIG. 7B is a diagram representing operation timing of another example regarding the imaging apparatus.

Next, an example of the configuration of the counter circuit 11 and memory 13 is illustrated in FIG. 5. The counter circuit 11 generates an n-bit count signal CKn based on the clock pulse signal CLK to be supplied from the TG 12, and outputs this to the memory 13. There are provided n count signal transmission lines for transmitting the n-bit count signal, between the counter circuit 11 and the memory 13. The imaging apparatus according to the present embodiment performs correlated double sampling (hereinafter, referred to as CDS), which will be described later. Thus, a signal N which is a noise-level signal of the pixel 100, and a signal S to be output based on the potential of the input node of the amplifier MOS transistor 5 to which signal charge generated by photoelectric conversion of the light-receiving unit has been transferred are output from the pixel 100. The signal S includes, with the present embodiment, the signal A and signal A+B. Accordingly, three signals of the signal N, signal A, and signal A+B are output from the pixel 100 within one frame period. Note that one frame period is a period after a vertical synchronizing signal VD illustrated in a later-described FIG. 7B is changed to H level, until the vertical synchronizing signal VD changes to H level. With the present embodiment, each time each of the signal N, signal A, and signal A+B which are analog signals is output from the pixel 100, operation to convert the analog signal into a digital signal is performed. Therefore, with the memory 13, three memory units to hold a digital signal value are provided corresponding to the signals, respectively. Specifically, a memory unit M1 holds the digital signal N based on the signal N, a memory unit M2 holds the digital signal A based on the signal A, and a memory unit M3 holds the digital signal A+B based on the signal A+B. That is to say, the memory unit M1 is memory N to which a digital signal which is a noise-level signal value is input. Also, the memory unit M2 is memory S1 to hold a signal based on the above-mentioned pixel signal based on a part of photoelectric conversion units of a pixel. Also, the memory unit M3 is memory S2 to hold a signal based on a pixel signal based on multiple photoelectric conversion units of a pixel. A signal line N 15 and a signal line S 16 are electrically connected to the memory 13, the digital signal N is output to the signal line N 15 from the memory M1, the digital signal A and digital signal A+B based on the signal A+B are output to the signal line S 16 from the memory units M2 and M3 respectively in a time-sharing manner.

Figure 6:
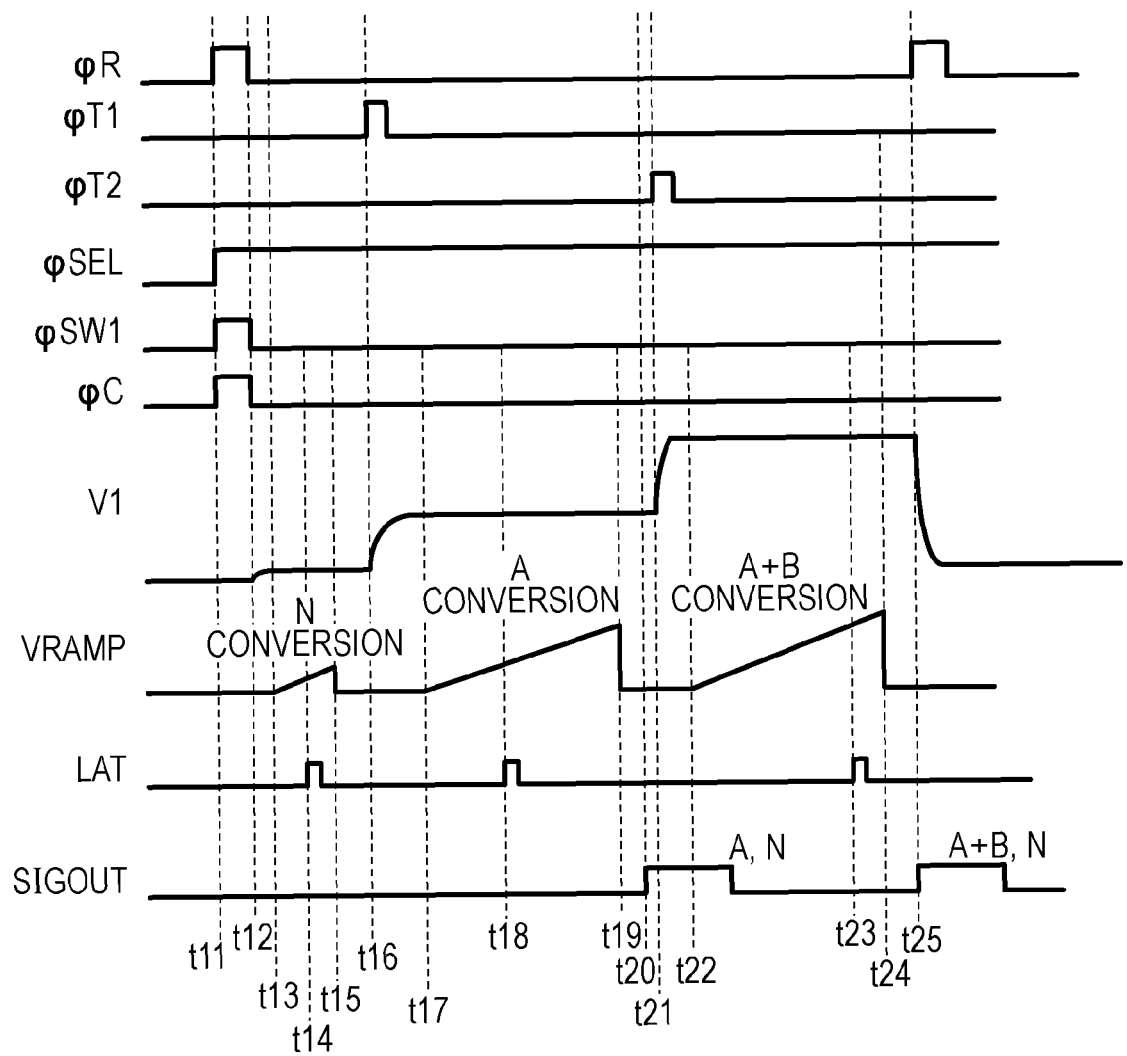
FIG. 6 is a diagram representing operation timing of the imaging apparatus.

Next, operation timing that the pixels 100 in the first row perform of the imaging apparatus exemplified in FIG. 2 is illustrated in FIG. 6. A switch pulse φSW1 is a pulse to switch on/off of the switch SW1, and the switch SW1 is turned on at the time of H level. Reference symbol V1 represents output of the operational amplifier 8. The SIGOUT indicates timing for the horizontal scanning circuit 14 selecting the memory 13 of each column, and outputting the count signal from each memory unit. Hereinafter, let us say that at least one of φSW2 and φSW3 is in a high level, i.e., a signal is amplified with a ratio as to the capacity value of the clamp capacitor C0.

At point-in-time t11, a reset pulse φR is changed to H level, and the input node of the amplifier MOS transistor 5 is taken as reset-level potential. Also, the selection pulse φSEL is changed to H level. Thus, a pixel signal at the time of the input node of the amplifier MOS transistor 5 being in reset-level potential is output to the vertical signal line 7. The switch pulses φSW1 and φC are changed to H level. When the switch pulse φC changes to H level, the switches SW4 and SW5 are turned on. Reset of the operational amplifier 8 is performed by changing the switch pulse φSW1 to H level, and shorting the output terminal and input terminal of the operational amplifier 8. Reset of the clamp capacitor C4 is performed by changing the switch pulse φC to H level. Also, at the point-in-time t11, the selection pulse φSEL is changed to H level, and a pixel signal is output to the vertical signal line 7 based on the potential of the reset level of the input node of the amplifier MOS transistor 5.

At point-in-time t12, the reset pulse φR, and switch pulses φSW1 and φC are changed to L level. Potential when the switch pulses φSW1 and φC are in L level is held at each of the clamp capacitors C0, C3, and C4. When the reset pulse φR is changed from H level to L level, the potential of the input node of the amplifier MOS transistor 5 is changed due to charge injection that occurs at the reset MOS transistor 4. Thus, the signal level of a pixel signal to be output to the vertical signal line 7 is also changed. The pixel signal to be output at this point-in-time t12 will hereinafter be referred to as signal N. Similarly, the pixel signal to be output to the vertical signal line 7 based on the potential of the input node of the amplifier MOS transistor 5 which holds signal charge subjected to photoelectric conversion by the light-receiving unit will hereinafter be referred to as signal S. The operational amplifier 8 amplifies the signal given via the clamp capacitor C0 and outputs this to the clamp capacitor C3. The signal given to the clamp capacitor C3 is a signal obtained by amplifying the signal output from the pixel 100 via the clamp capacitor C0, on which an offset signal Voff of the operational amplifier 8 is superimposed. The signal output from the operational amplifier 8 via the clamp capacitor C3 is given to the comparator circuit 9.

At point-in-time t13, the ramp signal generator circuit 10 starts change of the ramp signal VRAMP. The comparator circuit 9 starts comparison operation between the signal output from the operational amplifier 8 via the clamp capacitor C3, and the ramp signal VRAMP to be supplied from the ramp signal generator circuit 10. Also, the counter circuit 11 starts counting of the clock pulse signal CLK at the same time as the ramp signal generator circuit 10 starts change of the ramp signal VRAMP, and outputs the count signal which is a counting result to the memory 13.

For example, let us say that the magnitude relation between the signal output from the operational amplifier 8 via the clamp capacitor C3, and the ramp signal VRAMP is reversed at point-in-time t14. In response to this, the comparator circuit 9 outputs the latch signal LAT. The counter circuit 11 to which this latch signal LAT has been output stops output of the count signal to the memory 13. The memory 13 holds the count signal at this point-in-time t14. At point-in-time t15, the ramp signal generator circuit 10 ends changing of the ramp signal VRAMP. As compared to a later-described case where the signal S is converted into a digital signal, time for changing the ramp signal VRAMP is reduced in the event of converting the signal N into a digital signal. This is generally because the signal N has a noise component and an offset component as principal components, and accordingly, the signal range of the signal N is narrower than the signal range of the signal S. Accordingly, time for changing the ramp signal VRAMP may be reduced. Thus, time used for conversion operation of pixel signals that pixels at one row output may be reduced.

According to the operations of the comparator circuit 9, counter circuit 11, and memory 13 to be performed from the point-in-time t13 to point-in-time t15, an analog signal output from the operational amplifier 8 via the clamp capacitor C3 is converted into a digital signal. Hereinafter, the operations that the comparator circuit 9, counter circuit 11, and memory 13 perform from the point-in-time t13 to point-in-time t15 will collectively be referred to as N conversion. The digital signal held at the memory 13 by this N conversion is the digital signal N.

At point-in-time t16, the transfer pulse φT1 is changed to H level. Thus, signal charge generated by photoelectric conversion at the photodiode 1 is transferred to the input node of the amplifier MOS transistor 5. Thus, the signal A which is one of the signal S is output (with the present embodiment, the signal A and signal A+B are output in a time-sharing manner as the signal S). After the signal A is output from the pixel 100 to the clamp capacitor C0, the transfer pulse φT1 is turned to L level. The operational amplifier 8 amplifies the signal A output from the pixel 100 via the clamp capacitor C0, and outputs this to the comparator circuit 9 via the clamp capacitor C3.

At point-in-time t17, the ramp signal generator circuit 10 starts changing of the ramp signal VRAMP. Further, the comparator circuit 9 starts comparison operation between the signal output from the operational amplifier 8 via the clamp capacitor C3 and the ramp signal VRAMP. Further, the counter circuit 11 also starts, as with the previous case of the signal N, counting of the clock pulse signal CLK at the same time as the ramp signal VRAMP starts changing of the signal level.

For example, at point-in-time t18, let us say that the magnitude relation between the signal A output from the operational amplifier 8 via the clamp capacitor C3 and the ramp signal VRAMP is reversed. In response to this, the comparator circuit 9 outputs the latch signal LAT to the counter circuit 11. The counter circuit 11 to which the latch signal LAT has been output stops output of the count signal to the memory 13. The memory 13 holds the count signal at the point-in-time t14. The ramp signal generator circuit 10 ends changing of the ramp signal VRAMP at point-in-time t19.

According to the operations of the comparator circuit 9, counter circuit 11, and memory 13 to be performed from the point-in-time t17 to point-in-time t19, an analog signal output from the operational amplifier 8 via the clamp capacitor C3 is converted into a digital signal. Hereinafter, the operations that the comparator circuit 9, counter circuit 11, and memory 13 perform from the point-in-time t17 to point-in-time t19 will collectively be referred to as A conversion. The digital signal held at the memory 13 by this A conversion is the digital signal A.

Next, at point-in-time t20, the digital signal N in the signal line N 15, and the digital signal A in the signal line S 16 are transferred from the memory 13 to the outside of the imaging apparatus. "Outside of the imaging apparatus" means, for example, a later-described digital signal processing circuit. With the present embodiment, though transfer of the digital signal N and digital signal A to the outside of the imaging apparatus is performed at this point-in-time t20, the order of this may be before or after the transfer pulse φT2 at the point-in-time t21. It is desirable that transfer of the digital signal A and digital signal N is ended by time point-in-time t24 when later-described A+B conversion is ended. Thus, later-described transfer of the digital signal A+B and digital signal N may be performed immediately after end of A+B conversion.

Next, at point-in-time t21, the transfer pulse φT2 is changed to H level. Thus, signal charge generated by photoelectric conversion at the photodiode 51 is transferred to the input node of the amplifier MOS transistor 5. The signal charge from the photodiode 1 has already been held at the input node of the amplifier MOS transistor 5. Accordingly, signal charge from both of the photodiodes 1 and 51 is held at an FD area by changing the transfer pulse φT2 to H level. With the vertical signal line 7, a signal based on the potential of the input node of the amplifier MOS transistor 5 to which the signal charge of both of the photodiodes 1 and 51 has been transferred, i.e., the signal A+B is output. Accordingly, the operational amplifier 8 amplifies the signal A+B output from the pixel 100 via the clamp capacitor C0, and outputs this to the comparator circuit 9 via the clamp capacitor C3.

At point-in-time t22, the ramp signal generator circuit 10 starts changing of the ramp signal VRAMP. Further, the comparator circuit 9 starts comparison operation between the signal output from the operational amplifier 8 via the clamp capacitor C3 and the ramp signal VRAMP. Further, the counter circuit 11 also starts, as with the previous case of the signal N, counting of the clock pulse signal CLK at the same time as the ramp signal VRAMP starts changing of the signal level.

For example, at point-in-time t23, let us say that the magnitude relation between the signal output from the operational amplifier 8 via the clamp capacitor C3 and the ramp signal VRAMP is reversed. In response to this, the comparator circuit 9 outputs the latch signal LAT to the counter circuit 11. The counter circuit 11 to which the latch signal LAT has been output stops output of the count signal to the memory 13. The memory 13 holds the count signal at the point-in-time t23. The ramp signal generator circuit 10 ends changing of the ramp signal VRAMP at point-in-time t24.

According to the operations of the comparator circuit 9, counter circuit 11, and memory 13 to be performed from the point-in-time t22 to point-in-time t24, an analog signal output from the operational amplifier 8 via the clamp capacitor C3 is converted into a digital signal. Hereinafter, the operations that the comparator circuit 9, counter circuit 11, and memory 13 perform from the point-in-time t22 to point-in-time t24 will collectively be referred to as A+B conversion. The digital signal held at the memory 13 by this A+B conversion is the digital signal A+B.

Next, at point-in-time t25, the digital signal N in the signal line N 15 obtained by N conversion, and the digital signal A+B in the signal line S 16 obtained by A+B conversion are transferred from the memory 13 to the outside of the imaging apparatus. The outside of the imaging apparatus is a digital signal processing circuit which is an example of an output signal processing unit 155 of the imaging system exemplified in FIG. 16, for example. This digital signal processing circuit performs processing to obtain difference between the digital signal A and the digital signal N, and to obtain difference between the digital signal A+B and the digital signal N, or processing to obtain the digital signal B by computing difference between the digital signal A+B and the digital signal A, or the like. The digital signal B is a digital signal assumed to be obtained by converting the signal B to be output when the input node of the amplifier MOS transistor 5 holds signal charge held at the photodiode 51 alone without matching between the signal charge at the photodiode 1 and the signal charge at the photodiode 51 at the input node of the amplifier MOS transistor 5, into a digital signal as with A conversion. The digital signal processing circuit may perform focal-point detection according to the phase difference detecting method using the digital signal A and digital signal B. Also, an image may be formed using the digital signal A+B obtained by converting the signal A+B output from each pixel by A+B conversion. Also, a noise-level signal generated from the pixel 100 or operational amplifier 8 or the like superimposed on the digital signal A and digital signal A+B may be reduced by the digital signal processing circuit subtracting the digital signal N from each of the digital signal A and digital signal A+B.

Though description has been made so far regarding the operation to read out pixel signals of the pixels 100 in the first row of the imaging apparatus illustrated in FIG. 2, the same operation may also be applied to the pixels in the second row.

Next, description will be made regarding operation to read out pixel signals of the pixels 100 in the third row of the imaging apparatus illustrated in FIG. 2, with reference to FIG. 7A.

In the event of reading out the pixel signals of the pixels 100 in the third row as well, the operation according to N conversion may be taken as the same as described with readout operation of the pixel signals of the pixels 100 in the first row. Specifically, the operation at each of the point-in-time t31, t32, t33, t34, and t35 in the event of reading out the pixel signals of the pixels 100 in the third row may be taken as with the operation at each of the point-in-time t11, t12, t13, t14, and t15 in the event of reading out the pixel signals in the first row.

The pixels 100 in the third row do not perform transfer operation of the signal A at the point-in-time t16, and operation of A conversion at the point-in-time t17 to the point-in-time t19, which have been described in the readout operation of the pixel signals of the pixels 100 in the first row. Also, A conversion is not performed, and accordingly, operation to transfer the digital signal A and digital signal N at the point-in-time t20 is also not performed.

With regard to the pixels 100 in the third row, operation is performed wherein the pixels 100 output the signal A+B, and the digital signal A+B is obtained at the signal processing circuit 101.

With operation wherein the pixels 100 in the third row output the signal A+B, first, at pint-in-time t36, the transfer pulses φT1 and φT2 are both changed to H level. Thus, signal charge generated by photoelectric conversion at the photodiodes 1 and 51 is transferred to the input node of the amplifier MOS transistor 5. Thus, a signal based on the potential of the input node of the amplifier MOS transistor 5 which holds signal charge transferred from the photodiodes 1 and 51, i.e., the signal A+B is output from the pixels 100 to the vertical signal line 7. Hereinafter, the operation relating to A+B conversion to convert the signal A+B into a digital signal may be taken as the same operation as the operation to perform A+B conversion in the event of reading out the pixel signals of the pixels 100 in the first row. Specifically, the operation at point-in-time t37, t38, and t39 in the event of performing A+B conversion on the pixel signals of the pixels 100 in the third row may be taken as same operation as the operation at the point-in-time t22, t23, and t24 in the event of performing A+B conversion on the pixel signals of the pixels 100 in the first row.

Operation to transfer the digital signal A+B obtained by A+B conversion from the memory 13 to be performed at point-in-time t40 may also be taken as the same operation as the operation at the point-in-time t25 in the event of reading out the pixel signals from the pixels 100 in the first row.

In this manner, in the event of reading out the pixel signals of the pixels 100 in the third row, operation to read out the signal A+B alone is performed without performing operation to read out the signal A. Accordingly, the operation to read out the signal A, and the operation to perform A conversion are not performed, and accordingly, time used for these operations may be reduced. Specifically, in the event of reading out the pixel signals of the pixels 100 in the third row, the period from the point-in-time t16 to point-in-time t19 in the event of reading out the pixel signals of the pixels 100 in the first row may be reduced. Accordingly, as compared to the case of performing operation to read out the signal A and signal A+B at the pixels 100 at all of the rows of the imaging apparatus, the pixels 100 not performing output of the signal A are included, and accordingly, the period relating to the analog-to-digital conversion operation may be reduced. Also, the pixels 100 not to perform output of the signal A are included, and accordingly, the number of times for the memory 13 of the multiple columns outputting the digital signal A within one frame period is reduced. Thus, time for reading out the digital signals from the imaging apparatus may be reduced.

FIG. 7B is a timing chart representing a vertical synchronizing signal VD, φSEL-T which is a total period of selection pulses φSEL to be given to each row of the pixel unit, and SIGOUT-T which is a period when signals are output from the memory 13 of multiple columns. After changing the vertical synchronizing signal VD to H level, the vertical scanning circuit 2 sequentially changes the selection pulse φSEL corresponding to the pixels 100 at each row to H level. The horizontal scanning circuit 14 sequentially outputs a digital signal from the signal processing circuit 101 of each column. As described above, one frame is a period after the vertical synchronizing signal VD is changed to H level, until the vertical synchronizing signal VD changes to H level next. Within this one frame period, the digital signal N, digital signal A, and digital signal A+B which are signals based on pixel signals from the imaging apparatus are output.

In the event of reading out the signal A and signal B, after the pixel 100 performs output of the signal A, the reset pulse φR has to be changed to H level once and then changed to L level, and the transfer pulse φT2 has to be changed to H level after resetting the potential of the input node of the amplifier MOS transistor 5. Specifically, with the operation timing chart described in FIG. 6, the reset pulse φR has to be kept in H level from the point-in-time t19 to point-in-time t21, and further has to be returned to L level. With the present embodiment, the period from the point-in-time t11 to point-in-time t12 may be taken as the period to keep the reset pulse φR in H level, and accordingly, output operation of pixel signals may be performed at higher speed.

With the present embodiment, after outputting the signal N, signal A, and signal A+B from the pixels 100 in the first row, the signal N, signal A, and signal A+B from the pixels 100 in the second row are output. Now, comparison will be made between this mode and a mode wherein the signal N and signal A are output from the pixels 100 in the first and second rows, and then the signal A+B is sequentially output from the pixels 100 in the first row to the fourth row (hereinafter, this mode will be referred to as a reference mode). With the reference mode, there is a period to read out the signals A in the first and second rows until the signals A+B of the pixels 100 in the first row after outputting the signals N from the pixels 100 in the first row. Accordingly, as compared to the mode according to the present embodiment, with the reference mode, the period until the signals A+B in the first row are output after reading out the signals N in the first row is longer. Thus, difference between the noise level when the pixels 100 in the first row output the signal N and the noise level when the pixels 100 in the first row output the signal A+B is readily caused. That is to say, influence of random noise as to the signals A+B increases. Accordingly, the reference mode is readily deteriorated in image quality and distance measurement precision as compared to the mode according to the present embodiment. With the mode according to the present embodiment, for example, after outputting the signals N of the pixels 100 in the first row, the signals A+B from the pixels 100 in the first row are obtained before changing to the readout operation from the pixels 100 at other rows. Therefore, influence of random noise as to the signals A+B may be suppressed and image quality and distance measurement precision may be improved as compared to the reference mode. Also, with the reference mode, a row including the pixels 100 to output the signal A in addition to the signal A+B performs vertical scanning twice of output for the signals A and output for the signals A+B. With the present embodiment, output of signal A and signals A+B is performed with pixels 100 of one row in one vertical scan. Thus, with the mode according to the present embodiment, time relating to vertical scanning may be reduced as compared to the reference mode.

With the present embodiment, in the event of reading out the pixel signals in the first row, description has been made regarding an example wherein time relating to transfer of the digital signals A and digital signals N is shorter than time when the ramp signal VRAMP in A+B conversion changes. However, a mode may be employed wherein time relating to transfer of the digital signals A and digital signals N is longer than time when the ramp signal VRAMP in A+B conversion changes, by time T. With this mode, at the time of reading out pixel signals in the third row, in addition to the period relating to readout operation of the signals A and operation to perform A conversion, the period of this time T may also be reduced.

Figure 8:
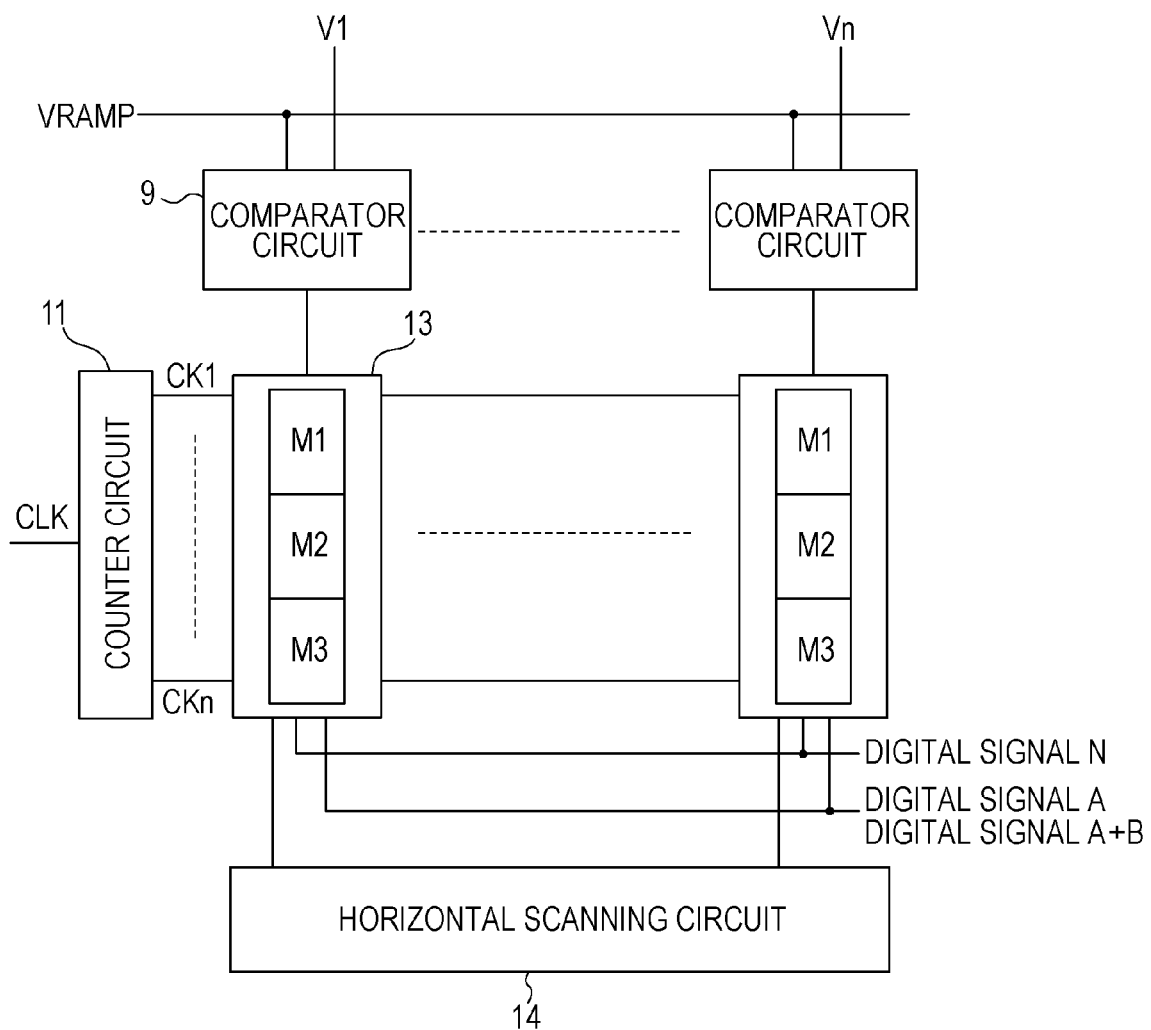
FIG. 8 is a schematic diagram illustrating another example of the analog-to-digital conversion circuit of the imaging apparatus.

The present embodiment illustrates a mode wherein the counter circuit 11 is included in each of the signal processing circuits 101. As another mode, a so-called common-counter-type analog-to-digital conversion circuit may be employed wherein the counter circuit 11 is provided separately from the signal processing circuits 101, and the count signal CKn is output common to the signal processing circuit 101 at each column. The clock signal CLK is supplied from the TG 12 to the counter circuit 11. The counter circuit 11 generates an n-bit count signal CKn based on the clock pulse signal CLK. FIG. 8 illustrates an example of a common-counter-type analog-to-digital conversion circuit. The counter pulse circuit 11 outputs the count signal CKn common to the memory 13 at each column. The memory 13 performs acquisition of the count signal CKn output from the counter circuit 11 when the latch signal LAT is output from the comparator circuit 9. This acquired count signal CKn is a digital signal held at the memory 13. With such a common-counter-type analog-to-digital conversion circuit as well, the present embodiment may suitably be implemented.

Also, with the present embodiment, description has been made based on the mode wherein the pixels 100 output the signal A+B based on two photoelectric conversion units and the signal A which is a signal based on one photoelectric conversion unit. The present embodiment is not restricted to this mode. Specifically, a mode may suitably be implemented wherein each of multiple pixels outputs a first pixel signal base on m (m is an integer) photoelectric conversion units which each of the multiple pixels includes, and a part of pixels of the multiple pixels which output this first pixel signal further output a second pixel signal based on n (n is an integer smaller than m) photoelectric conversion units. According to this mode, as compared to a case of performing operation to read out the first pixel signal and second pixel signal at all of the pixels, there are pixels not performing output of the first pixel signal, and accordingly, a period relating to analog-to-digital conversion operation may be reduced. Also, the number of times for the memory 13 at multiple columns outputting a digital signal based on the first pixel signal within one frame period is reduced. Accordingly, time to read out digital signals from the imaging apparatus may be reduced. Also, with the m photoelectric conversion units, the m may be a number smaller than the number of photoelectric conversion units which the one pixel 100 includes. Specifically, with the imaging apparatus according to the present embodiment, if we say that the number of photoelectric conversion units which the one pixel 100 includes is j (j is an integer), a mode having a relation of j≥m>n is desirable.

Also, with the present embodiment, as illustrated in FIG. 7B, a mode has been described wherein one frame period is a period after the vertical synchronizing signal VD is changed to H level once, until the vertical synchronizing signal VD changes to H level next. As another mode, for example, a mode may be employed wherein one frame period has a field to output pixel signals from the pixels 100 in the even rows, and a field to output pixel signals from the pixels 100 in the odd rows, as with interlaced signal output, for example. That is to say, a mode may be employed wherein the vertical scanning circuit 2 performs selection of the multiple pixels 100 by dividing the pixels 100 into multiple fields. For that matter, the pixels 100 do not have to be divided into fields of even rows and odd rows, and a mode may be employed wherein pixel signals are output with a first field regarding a certain row, and pixel signals are output with a second field regarding the other rows.

Second Embodiment

One of the present embodiment is a mode wherein with the imaging apparatus exemplified in the first embodiment, as illustrated in FIG. 1B, each of a pixel 100 to output the signal A and signal A+B, and a pixel 100 to output the signal A+B alone is included in all of the rows in the pixel unit.

The horizontal scanning circuit 14 according to the present embodiment is a decoder which enables digital signals to be transferred by selecting the memory 13 to transfer digital signals from the memory 13 in multiple columns, other than operation to sequentially scan the memory 13 in each row.

Figure 9A:
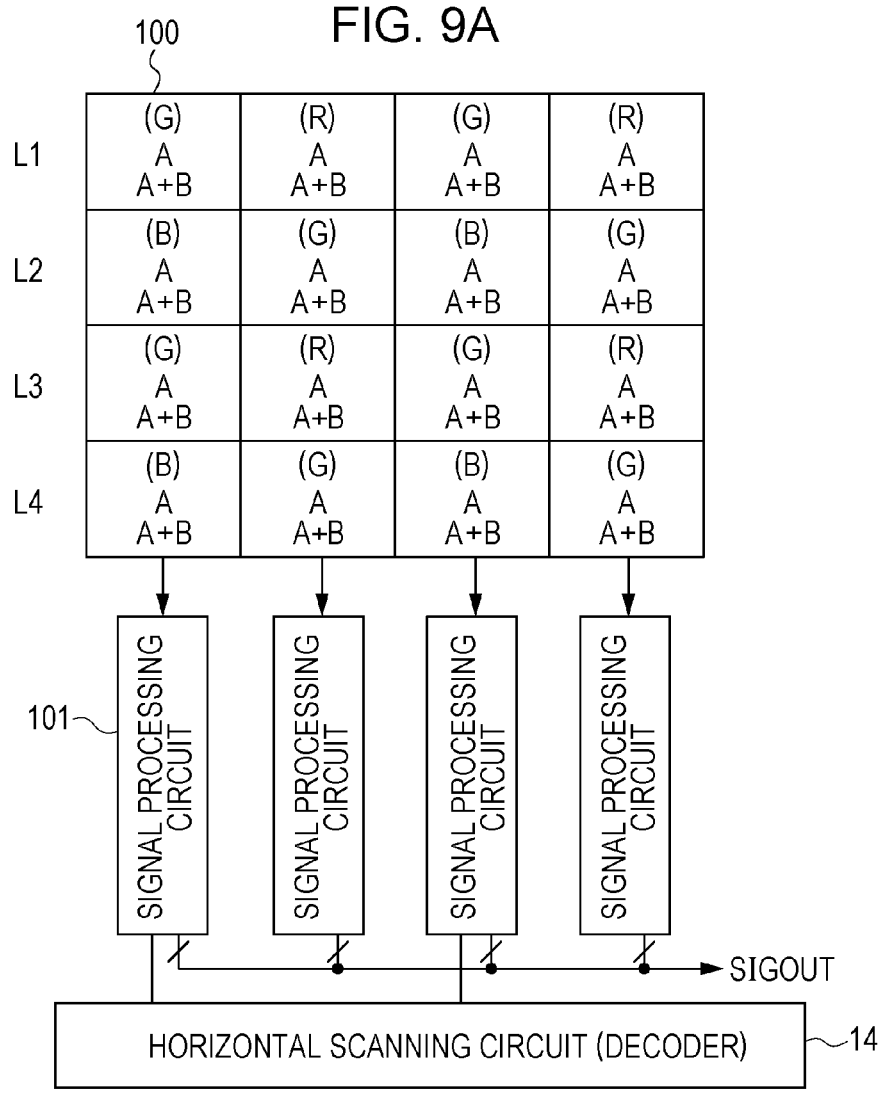
FIG. 9A is a schematic diagram exemplifying a pixel unit and a signal processing circuit regarding an imaging apparatus according to another example.

FIG. 9A schematically illustrates a part of the pixels 100 of the imaging apparatus exemplified in FIG. 1B by extraction. The signal A and signal A+B are output from all of the pixels illustrated in FIG. 9A. However, with both of the first and second rows, the signals A and signals A+B which the pixels in the second and third columns output are used, and the signals A+B alone other than the signals A which the pixels in the first and fourth columns output are used.

Operation to read out pixel signals from the pixels 100 in the first row will be described primarily with regard to points different from the first embodiment. The operations of the pixels 100 and signal processing circuits 101 according to the present embodiment may be the same as the operations the first row of the imaging apparatus exemplified in FIG. 2, i.e., the operations exemplified in FIG. 6, described in the first embodiment. According to such operations, with the imaging apparatus according to the present embodiment, the signals N, signals A, and signals A+B are held in all of the memory 13 to which pixel signals are transferred from the pixels 100.

Figure 9B:
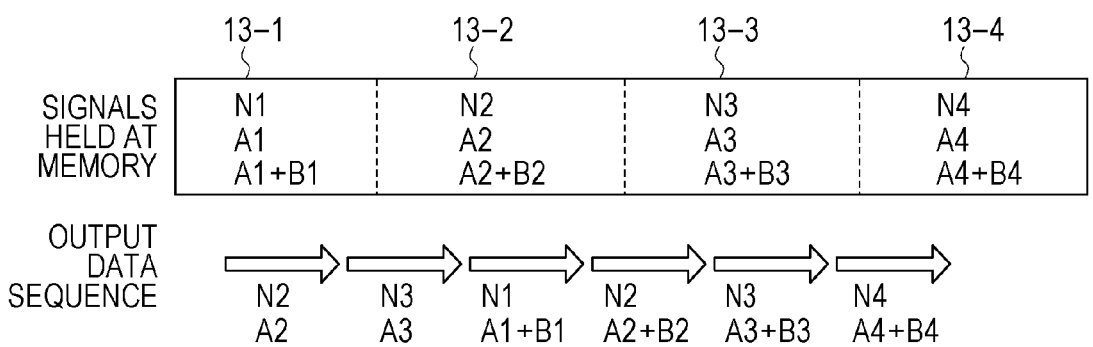
FIG. 9B is a schematic diagram illustrating an example of operation of the signal processing circuit and a horizontal scanning circuit.

FIG. 9B schematically illustrates signals which the decoder 14 which is the horizontal scanning circuit according to the present embodiment transfers. Digital signals based on the pixel signals of the pixels 100 in each of the first to fourth columns of the imaging apparatus exemplified in FIG. 9A are held in each of the memory 13-1 to memory 13-4. Hereinafter, with regard to the digital signals which the memory 13-1 in the first column holds, the digital signals will be referred to as N1, the digital signals A will be referred to as A1, and the digital signals A+B will be referred to as A1+B1, by appending a column number counted from the left in the drawing to each digital signal. This is true regarding the second to fourth columns.

The decoder 14 first selects the memory 13-2 in the second column, and causes the digital signal processing circuit to output N2 and A2 from the memory 13-2. The digital signal processing circuit obtains (A2−N2) which is a difference signal between the output N2 and A2. Next, the decoder 14 selects the memory 13-3 in the third column, and causes the digital signal processing circuit to output N3 and A3 from the memory 13-3. The digital signal processing circuit obtains, in the same way as with the case of the memory 13-2 in the second column, (A3−N3) which is a difference signal between the N3 and A3.

Next, the decoder 14 sequentially selects the memory 13-1 to memory 13-4 in each column, and causes the digital signal processing circuit to output the digital signals A+B. Specifically, the decoder 14 selects the memory 13-1 in the first column, and causes the digital signal processing circuit to output N1 and A1+B1 from the memory 13-1. The digital signal processing circuit obtains (A1+B1−N1) which is a difference signal between the N1 and A1+B1. Also, the decoder 14 performs the same operation regarding the memory 13-2 to memory 13-4 in the second to fourth columns. Also, the digital signal processing circuit also performs the same operation as with the case where N1 and A1 are output from the memory 13-1 in the first column. Thus, the digital signal processing circuit obtains difference signals (A2+B2−N2), (A3+B3−N3), and (A4+B4−N4), respectively.

Next, the digital signal processing circuit obtains difference between the difference signal (A2−N2) obtained by outputting N2 and A2 from the memory 13-2 in the second column, and the difference signal (A2+B2−N2) obtained by outputting N2 and A2+B2. Specifically, the digital signal processing circuit performs processing of (A2+B2−N2)−(A2−N2) to obtain B2. The digital processing circuit performs the same processing regarding the memory 13-3 in the third column to obtain B3. Thus, based on the pixel signals that the pixels 100 in the second column and third column of the first row output, A2 and B2, and A3 and B3 may be obtained. Focal-point detection according to the phase difference detecting method may be performed using these A2 and B2, and A3 and B3. Though description has been made so far regarding the pixels 100 in the first row, the same operation may also be applied to the pixels 100 in the second row.

With the present embodiment, operation to output N1 and A1, and N4 and A4 from the memory 13-1 and memory 13-4 in the first and fourth columns has not been performed. Accordingly, with the present embodiment, time used for outputting the N1 and A1, and N4 and A4 may be reduced. Accordingly, operation to obtain the signals A while obtaining the signals A+B may be performed at high speed.

Next, the imaging apparatus exemplified in FIG. 1C which is another one of the present embodiment, will be described. This is a mode wherein of pixels in multiple rows and multiple column of the imaging apparatus, pixels included in a part of area output the signals A and signals A+B. Specifically, this is a mode where a row not outputting the signals A is included in the imaging apparatus exemplified in FIG. 1B.

With regard to the imaging apparatus exemplified in FIG. 1C, operation to read out pixel signals from the pixels 100 in a row which outputs no signal A may be the same operation as the operation descried with reference to FIG. 7 in the first embodiment, and N conversion and A+B conversion may be performed.

Also, operation to read out pixel signals from the pixels 100 in a row which outputs the signals A may be the same operation described so far in the present embodiment. Specifically, N conversion, A conversion, and A+B conversion are performed according to the operation described with reference to FIG. 6 in the first embodiment. Further, as described with reference to FIG. 9B, the decoder 14 causes the digital signal processing circuit to output the digital signals from the memory 13 which holds the digital signals A and digital signals N based on the pixel signals from the pixels 100 which also output the signal A. Thereafter, the decoder 14 causes the digital signal processing circuit to output the digital signals N and digital signals A+B from the memory 13 which holds the digital signals A+B. Thus, the digital signal processing circuit performs focal-point detection according to the phase difference detecting method by obtaining the digital signals B regarding a row which output the digital signals A, and also performs image formation using the digital signals A+B.

In the event of the imaging apparatus exemplified in FIG. 1C, with operation to read out pixel signals of the pixels 100 in a row which outputs no signal A, A conversion is not performed, and accordingly, time relating to A conversion may be reduced. Also, a row which also outputs the signals A also includes, in the same way as with the imaging apparatus exemplified in FIG. 1B, a column which does not perform output of the signals A to the digital signal processing circuit. Thus, time relating to output of the digital signals A from the memory 13 to the digital signal processing circuit may be reduced. Accordingly, operation to obtain the signals A while obtaining the signals A+B may be performed at high speed.

With the present embodiment, a mode has been described as with FIGS. 1B and 1C wherein operation is performed so as to output the signals A and signals A+B. However, the present embodiment is not restricted to this, e.g., the pixels 100 to output the signals A may be selected according to the color the color filter 22. For example, with the imaging apparatus exemplified in FIG. 2, in the event that the pixels 100 including a G (Green)-color filter 22 are pixels to output the signals A, the pixels 100 in the first and third columns regarding the first and third rows, and in the second and fourth columns regarding the second and fourth rows output the signals A. This output operation of the signals A may be performed based on the operation described with reference to FIG. 6 in the present embodiment and the first embodiment. Also, readout of digital signals held at the memory may be operated as described with reference to FIG. 9B in the present embodiment. According to such operation, when selecting the pixels 100 to output the signals A according to the color of the color filter 22 as well, operation to obtain the signals A while obtaining the signals A+B may be performed at high speed.

Also, array of the pixels 100 to output the signals A in FIGS. 1A to 1C described in the first and second embodiments may variably be set using the TG 12. As another mode, array of the pixels 100 to output the signals A may be set based on setting information to be supplied to the imaging apparatus by serial communication from the outside of the imaging apparatus, or the like. Examples of the outside of the imaging apparatus include the overall control and computing unit 1510 of the imaging system exemplified in a later-described FIG. 16. Also, array of the pixels 100 to output the signals A may be set based on optical base length or a distance measurement point to be used, for example.

Also, with the present embodiment, description has been made based on the mode wherein the pixels 100 output the signals A+B which are signals based on two photoelectric conversion units, and the signals A which are signals based on one photoelectric conversion unit. The present embodiment is not restricted to this mode. Specifically, each of the multiple pixels outputs a second signal within one frame period based on the signal charge of the m (m is an integer) photoelectric conversion units which each of the multiple pixels includes. Each of at least a part of pixels of the multiple pixels further outputs a first signal based on the signal charge of n (n is an integer smaller than m) photoelectric conversion units which each of the pixels includes. The imaging apparatus outputs signals based on the second signals of the multiple pixels, and further outputs signals based on the first signals of the part of pixels of the multiple pixels within one frame period. This mode may suitably be implemented. According to this mode, as compared to a case where the imaging apparatus outputs signals based on the second signal and signals based on the first signal from all of the pixels, a period relating to output of signals based on the first signal may be reduced. Thus, readout time of digital signals from the imaging apparatus may be reduced.

Figure 10:
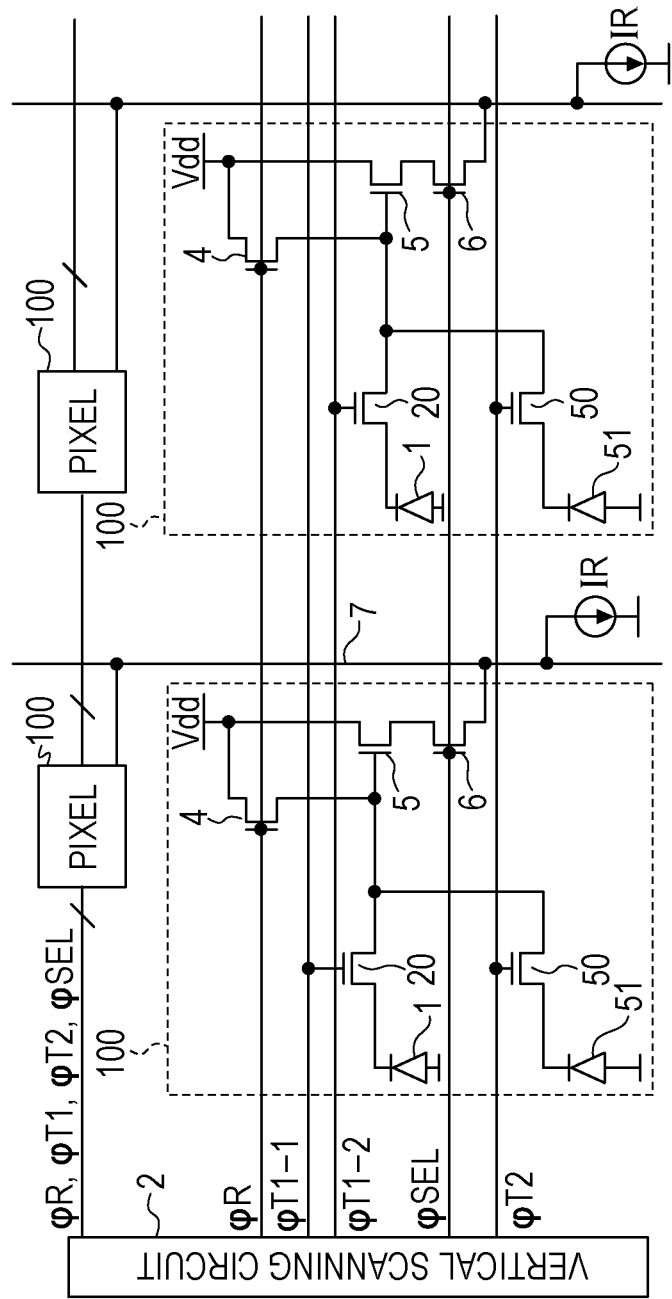
FIG. 10 is a schematic diagram exemplifying a pixel unit regarding an imaging apparatus of another example.

Also, with the present embodiment, a mode has been described wherein the horizontal scanning circuit 14 is a decoder, and the signals A are output from part of the memory 13. As another mode, an arrangement may be made wherein, as exemplified in FIG. 10, multiple transfer pulses φT1-1 and φT1-2 are provided from the vertical scanning circuit 2 to the photodiodes 1 with respect to the pixels 100 in one row. Specifically, of the pixels 100 in one row, the transfer pulse φT1-1 is changed to H level regarding the pixels 100 to output the signal A and signal A+B, and thereafter, the transfer pulse φT2 is changed to H level. On the other hand, with regard to the pixels 100 to output the signal A+B alone, the transfer pulse φT1-2 has to be changed to H level while the transfer pulse φT2 is in H level without changing the transfer pulse φT1-1 to H level. Also, another mode may be made wherein instead of providing the multiple transfer pulses φT1, as the selection pulse φSEL to select pixels in one row, one of multiple selection pulses φSEL1 and φSEL2 is given to the pixels 100 in one row. Specifically, a mode may be made wherein, with regard to pixels to output the signal A and signal A+B, the selection pulse φSEL-1 to change to H level while the transfer pulses φT1 and φT2 are in H level is given. With regard to pixels 100 to output the signals A+B alone, the selection pulse φSEL-2 which is in L level during the transfer pulse φT1, and changes to H level when the transfer pulse φT2 is in H level is given. These modes include a vertical scanning circuit which causes, during a period while signals based on signal charge of the m photoelectric conversion units, and signals based on signal charge of n (less than m) photoelectric conversion units are output from the pixels 100 in a certain row, another pixel in the same row not outputting the signals based on the signal charge of the n photoelectric conversion units but to output the signals based on the signal charge of the m photoelectric conversion units.

Third Embodiment

Figure 11:
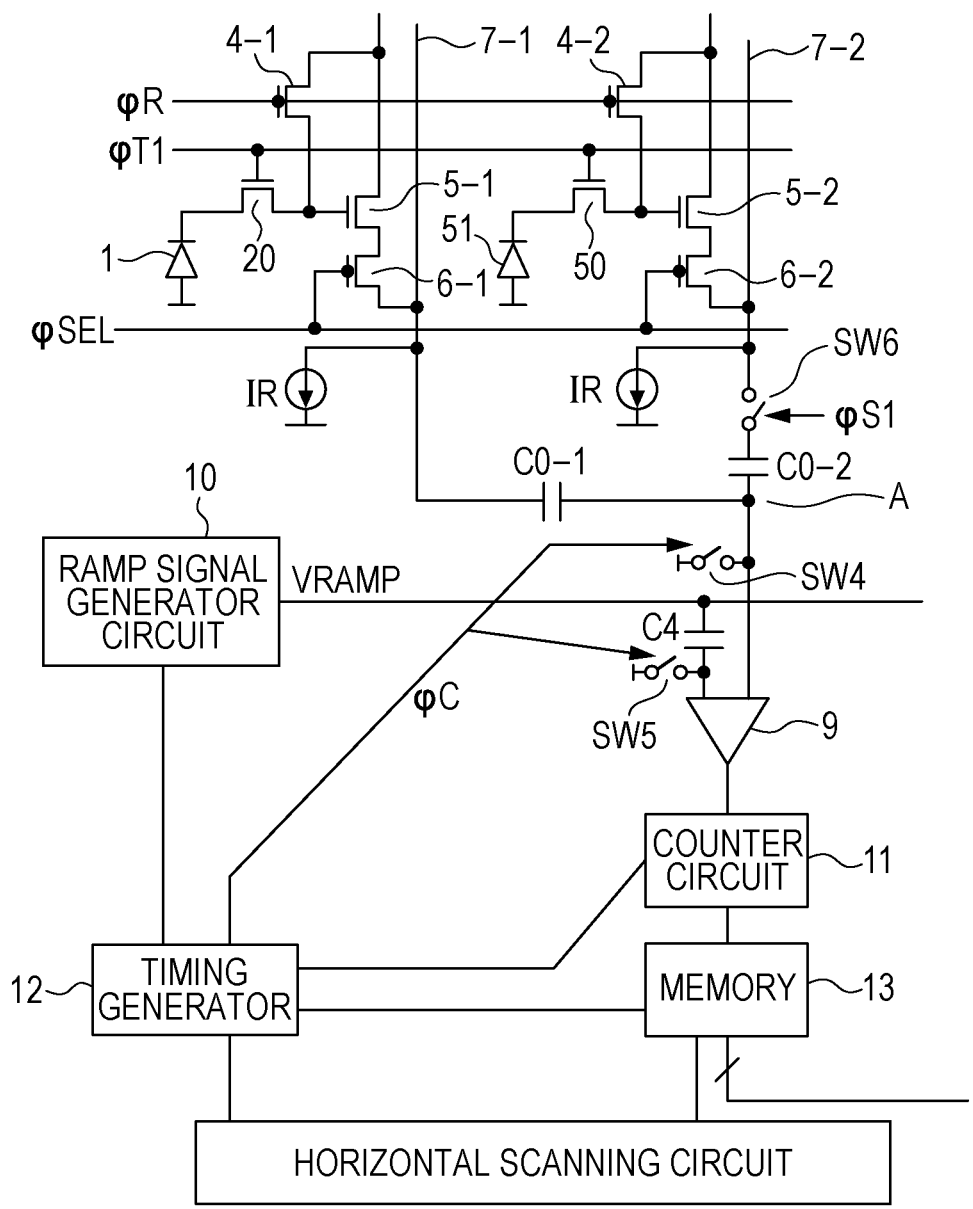
FIG. 11 is a schematic diagram regarding an imaging apparatus according to another example.

An equivalent circuit of the imaging apparatus according to the present embodiment is exemplified in FIG. 11. The imaging apparatus according to the present embodiment has a mode wherein the photodiodes 1 and 51 included in the pixels 100 transfer signal charge to the input nodes of different amplifier MOS transistors 5-1 and 5-2, respectively. With the pixels according to the first embodiment, the two photodiodes are electrically connected to the input node of the single amplifier MOS transistor 5, and pixel signals are output to the vertical signal line 7 by the single amplifier MOS transistor 5. On the other hand, with the present embodiment, there are provided pixels to output the signals A to the vertical signal line (hereinafter, also referred to as pixels A) and pixels to output the signals B thereto (hereinafter, also referred to as pixels B). Specifically, the two photodiodes which receive light transmitted from the same micro lens output pixel signals to mutually different vertical signal lines via mutually different amplifier MOS transistors. Vertical signal lines 7-1 and 7-2 electrically connected to each of a pixel A and a pixel B are electrically connected with a node A. One pixel to output the signal A+B is configured of a pixel A and a pixel B which output pixel signals to the vertical signal lines electrically connected by this node A.

Further, the present embodiment is a mode wherein the operational amplifier 8 included in the imaging apparatus exemplified in the first embodiment is not provided. With the present embodiment as well, in the event of amplifying pixels signals to be output from the pixels 100, the operational amplifier 8 may be provided upstream of the comparator circuit 9 in the same way as with the imaging apparatus described in the first embodiment.

Hereinafter, description will be made with reference to FIG. 11. Note that a component having the same function as with a component illustrated in the imaging apparatus exemplified in FIG. 4 is denoted in FIG. 11 with the same reference symbol as the reference symbol denoted in FIG. 4. Also, in the event that the pixels A and pixels B each have a component having the same function, a branch number is appended thereto. For example, the amplifier MOS transistor is denoted as 5-1 regarding the pixels A, and is denoted as 5-2 regarding the pixels B. Hereinafter, this is true for the reset MOS transistor 4, selection MOS transistor 6, vertical signal line 7, and clamp capacitor C0. The common reset pulse φR is supplied to the reset MOS transistors 4-1 and 4-2. Also, the common transfer pulse φT1 is also supplied to the transfer MOS transistors 20 and 50. Also, the common selection pulse φSEL is also supplied to the selection MOS transistors 6-1 and 6-2.

The selection MOS transistors 6-1 and 6-2 which the pixels A and pixels B include respectively are electrically connected to the vertical signal lines 7-1 and 7-2, respectively. The vertical signal lines 7-1 and 7-2 are electrically connected with the node A. Also, a switch SW6 is provided to the vertical signal line 7-2. This switch SW6 is a switch to switch whether to perform output to the comparator circuit 9 of the signals B of the pixels B via the clamp capacitor C0-2. Specifically, when the switch SW6 is on, the signals B are output to the comparator circuits 9 via the clamp capacitor C0-2, and when the switch SW6 is off, the signals B are not output to the comparator circuit 9. Note that, with the present embodiment, a signal line from the node A to the comparator circuit 9 will be referred to as vertical signal line 7, and is distinguished from the vertical signal lines 7-1 and 7-2 electrically connected to the pixels A and pixels B respectively.

Hereinafter, as with the first embodiment describe with reference to FIG. 1A, a mode will be described wherein all of the pixels in a part of rows output the signal A and signal A+B. Also, in FIG. 1A, a pixel included in an area where A and A+B are described together outputs the signal A, and then outputs the signal A+B. In FIG. 1A, a pixel included in an area where A+B alone is described does not output the signal A but output the signal A+B.

Figure 12A:
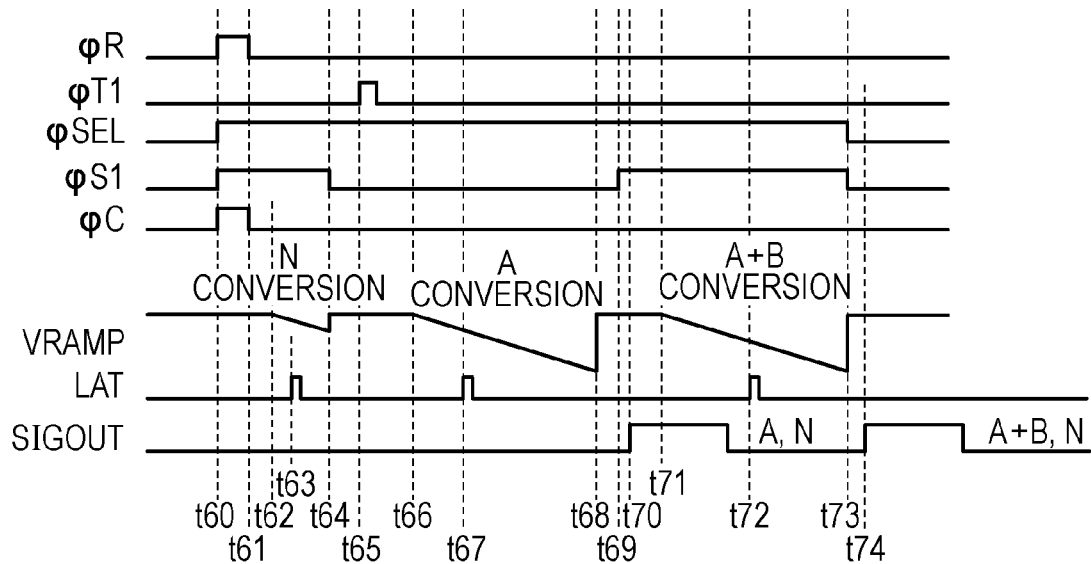
FIG. 12A is a diagram representing operation timing regarding the imaging apparatus according to another example.

Next, FIG. 12A illustrates, of the imaging apparatus exemplified in FIG. 11, an example of operation timing of a row to output the signal A and signal A+B. A switch pulse φS1 illustrated in FIG. 12A is a pulse signal to switch on/off of the switch SW6 exemplified in FIG. 11. When the φS1 is in H level, the switch SW6 is on, and when the φS1 is in L level, the switch SW6 is off.

At point-in-time t60, the reset pulse φR is changed to H level. Also, at the point-in-time t60, the selection pulse φSEL, switch pulses φC and φS1 are changed to H level. According to this operation, the charge of the input nodes of the amplifier MOS transistors 5-1 and 5-2, and the clamp capacitors C0-1, C0-2, and C4 are reset.

At point-in-time t61, the reset pulse φR and switch pulse φC are changed to L level. The switch pulse φS1 is still in H level.

At point-in-time t62, N conversion is started. The ramp signal generator circuit 10 starts changing of the ramp signal VRAMP. The comparator circuit 9 starts comparison operation between the signal N given to the vertical signal line 7 via the clamp capacitors C0-1 and C0-2 and the ramp signal VRAMP supplied from the ramp signal generator circuit 10. Also, the counter circuit 11 starts counting of the clock pulse signal CLK at the same time as the ramp signal generator circuit 10 starts changing of the ramp signal VRAMP, and outputs the count signal which is a counting result to the memory 13.

For example, let us say that a magnitude relation between the signal N output to the node A and the ramp signal VRAMP was reversed at point-in-time t63. In response to this, the latch signal LAT that the comparator circuit 9 outputs is changed. Upon this latch signal LAT being changed, the counter circuit 11 stops output of the count signal to the memory 13. The memory 13 holds the count signal at this point-in-time t63. The ramp signal generator circuit 10 ends changing of the ramp signal VRAMP at point-in-time t64. Also, the switch pulse φS1 is changed to L level at point-in-time t64.

At point-in-time t65, the transfer pulse φT1 is changed to H level. Signal charge is transferred to the input node of the amplifier MOS transistor 5-1 from the photodiode 1, and is transferred to the input node of the amplifier MOS transistor 5-2 from the photodiode 51. Thus, the signal A is output to the vertical signal line 7-1, and the signal B is output to the vertical signal line 7-2. The switch pulse φS1 is in L level, and accordingly, the signal A is output to the node A.

At point-in-time t66, A conversion is started. The ramp signal generator circuit 10 starts changing of the ramp signal VRAMP. The comparator circuit 9 starts comparison operation between the signal A output to the vertical signal line 7 and the ramp signal VRAMP. Further, the counter circuit 11 starts, in the same way as with the previous case of the signals N, counting of the clock pulse signal CLK at the same time as the ramp signal generator circuit 10 starts changing of the signal level of the ramp signal VRAMP.

For example, let us say that a magnitude relation between the signal A output to the node A and the ramp signal VRAMP was reversed at point-in-time t67. In response to this, the latch signal LAT that the comparator circuit 9 outputs is changed. Upon this latch signal LAT being changed, the counter circuit 11 stops output of the count signal to the memory 13. The memory 13 holds the count signal at this point-in-time t67. The ramp signal generator circuit 10 ends changing of the ramp signal VRAMP at point-in-time t68.

After changing of the ramp signal VRAMP is ended at the point-in-time t68, the digital signal N and digital signal A obtained by the previous N conversion and A conversion are transferred to the digital signal processing unit. With the present embodiment, though transfer of the digital signal N and digital signal A to the digital signal processing unit is performed at point-in-time t70, the order of this may be before or after the switch pulse φS1 at the point-in-time t69. It is desirable that transfer of the digital signal A and digital signal N is ended by time point-in-time t73 when later-described A+B conversion is ended. Thus, later-described transfer of the digital signal A+B and digital signal N may be performed immediately after end of A+B conversion.

At point-in-time t69, the switch pulse φS1 is changed to H level. Thus, the signal A+B is output to the node A.

At point-in-time t71, A+B conversion is started. The ramp signal generator circuit 10 starts changing of the ramp signal VRAMP. Further, the comparator circuit 9 starts comparison operation between the signal A+B output to the vertical signal line 7 and the ramp signal VRAMP. Further, the counter circuit 11 starts, in the same way as with the previous case of the signals N, counting of the clock pulse signal CLK at the same time as the ramp signal VRAMP starts change in the signal level.

For example, let us say that a magnitude relation between the signal A+B output to the vertical signal line 7 and the ramp signal VRAMP was reversed at point-in-time t72. In response to this, the latch signal LAT is output from the comparator circuit 9 to the counter circuit 11. The counter circuit 11 to which this latch signal LAT has been output stops output of the count signal to the memory 13. The memory 13 holds the count signal at this point-in-time t72. The ramp signal generator circuit 10 ends changing of the ramp signal VRAMP at point-in-time t73.

At point-in-time t74, the digital signal A+B and digital signal N are transferred to the digital signal processing circuit.

Figure 12B:
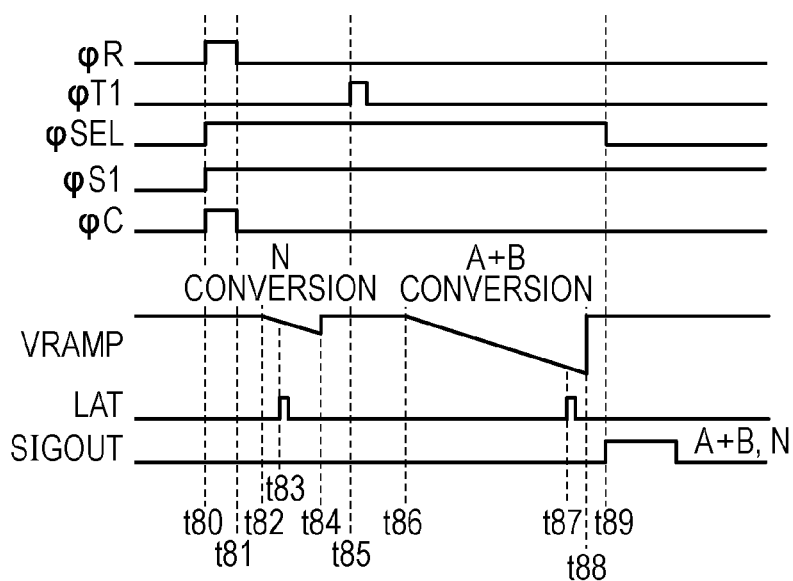
FIG. 12B is a diagram representing operation timing regarding the imaging apparatus according to another example.

Next, an example of operation timing of a row not outputting the signal A of the imaging apparatus exemplified in FIG. 11 is exemplified in FIG. 12B. Operation at point-in-time t80, t81, t82, and t83 may be the same operation at the point-in-time t60, t61, t62, and t63 described in the operation timing of a row to output the signal A and signal A+B, respectively.

At point-in-time t84, changing of the ramp signal VRAMP due to N conversion is ended. Though, with the previous operation of a row to output the signal A and signal A+B, the switch pulse φS1 is changed to L level here, the switch pulse φS1 is still in H level regarding a row not outputting the signal A.

Operation at point-in-time t85 is the same as the operation at the point-in-time t65 in the previous operation timing of a row to output the signal A and signal A+B. The transfer pulse φT1 is changed to H level, and accordingly, signal charge from the photodiodes 1 and 51 is transferred to the input nodes of the amplifier MOS transistors 5-1 and 5-2, respectively. The switch pulse φS1 is in H level, and accordingly, the signal A+B is output to the vertical signal line 7.

Operation at point-in-time t86, t87, t88, and t89 may be the same operation at the point-in-time t71, t72, t73, and t74 described in the previous operation timing of a row to output the signal A and signal A+B, respectively.

With regard to operation of a row not outputting the signal A, in the same way as described in the first embodiment, time to perform operation relating to A conversion, i.e., time of the point-in-time t66 to t68 of the operation timing of a row including a pixel to output the signal A may be reduced.

The imaging apparatus according to the present embodiment includes the pixels 100 not outputting the signal A. Thus, as compared to the case of the pixels 100 in all of the rows of the imaging apparatus performing operation to output the signal A and signal A+B, time to output digital signals from the imaging apparatus within one frame period may be reduced.

With the present embodiment, as with FIG. 1A, a mode has been described wherein all of the pixels in a part of rows output the signal A and signal A+B. The present embodiment is not restricted to the readout method in FIG. 1A, and the modes exemplified in FIGS. 1B and 1C may be implemented using a decoder as the horizontal scanning circuit 14. At this time, the operation timing of a row to output the signal A and signal A+B described in the present embodiment is applied to all of the rows in the imaging apparatus exemplified in FIGS. 1B and 1C. The digital signal N, digital signal A, and digital signal A+B held at the memory 13 have to be read out with the same operation as with the second embodiment.

With the imaging apparatus according to the present embodiment as well, operation to obtain the signal A while obtaining the signal A+B may be performed at high speed.

Fourth Embodiment

The present embodiment is a mode wherein each of the vertical signal lines 7 does not include the comparator circuit 9 and counter circuit 11, and the memory 13 holds a voltage value which is not a digital signal but an analog signal based on a pixel signal to be output from the pixels 100.

Figure 13:
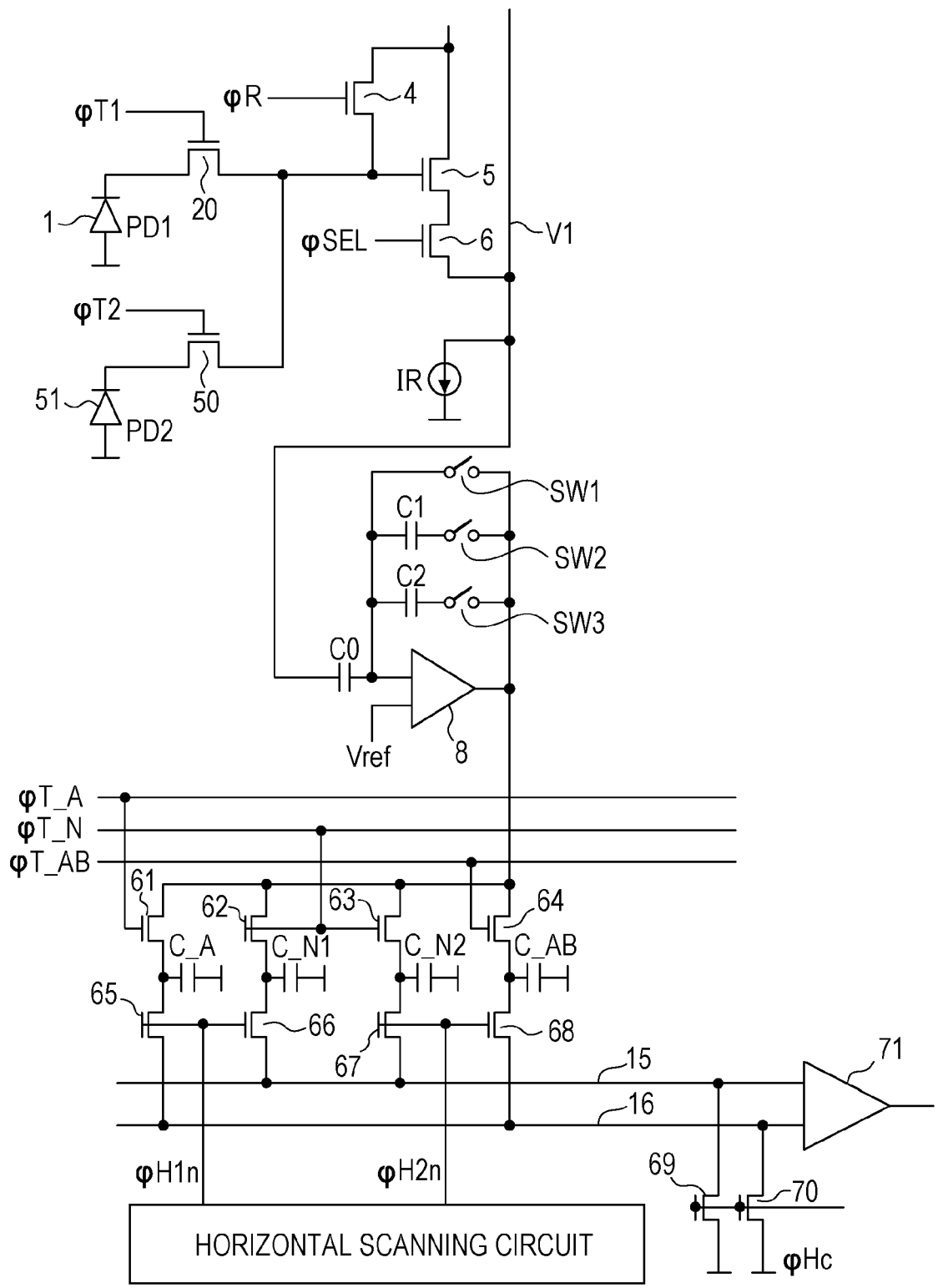
FIG. 13 is a schematic diagram regarding an imaging apparatus according to another example.

FIG. 13 illustrates an example of the configuration of an imaging apparatus relating to the present embodiment. Note that a component having the same function as with the imaging apparatus exemplified in FIG. 4 is also denoted in FIG. 13 with the same reference symbol as the reference symbol denoted in FIG. 4.

With regard to the pixels 100 and operational amplifier 8 according to the present embodiment, the same pixels 100 and operational amplifier 8 as with the first embodiment may be employed.

Capacitors C_N1 and C_N2 are both signal holding capacitors to hold a signal VN obtained by the operational amplifier 8 amplifying and outputting the signal N. Also, capacitors C_A and C_AB are signal holding capacitors to hold signals VA and VAB obtained by the operational amplifier 8 amplifying the signal A and signal A+B, respectively. The signal holding portions according to the present embodiment are the signal holding capacitors C_A, C_N1, C_N2, and C_AB. An offset signal Voff which the operational amplifier 8 has is superimposed on each of signals VA, VN, and VAB.

With the signal holding capacitors C_A, C_N1, C_N2, and C_AB, the signals are output from the operational amplifier 8 via the switches 61, 62, 63, and 64, respectively. Signal writing signals φT_A and φT_AB are supplied to the gates of the switches 61 and 64 from the TG 12, respectively. Also, a signal writing signal φT_N is supplied to the gates of the switches 62 and 63 from the TG 12. The switches 61, 62, 63, and 64 are turned on when a signal writing signal to be supplied the corresponding switch is in H level. That is to say, when the switches 61, 62, 63, and 64 are on, the signals are written in the signal holding capacitors C_A, C_N1, C_N2, and C_AB, respectively. The signal holding capacitors C_N1 and C_N2 are memory N in which a noise-level signal which each pixel has is held. The memory N is first memory in which a noise-level signal which a pixel has is held. Also, the signal holding capacitor C_A is memory S1 in which a signal based on a pixel signal based on a part of photoelectric conversion units of a pixel is held. The memory S1 is second memory in which a focal-point detection signal is held. Also, the signal holding capacitor C_AB is memory S2 in which a signal based on a pixel signal based on multiple photoelectric conversion units of a pixel is held. The memory S2 is third memory in which an image obtaining signal is held.

Further, the signal holding capacitors C_N1 and C_N2 are electrically connected to the signal line N 15 via switches 66 and 67, respectively. Also, the signal holding capacitors C_A and C_AB are electrically connected to the signal line S 16 via switches 65 and 68, respectively. A horizontal selection signal φH1n is supplied to the gates of the switches 65 and 66 from the horizontal scanning circuit 14. A horizontal selection signal φH2n is supplied to the gates of the switches 67 and 68 from the horizontal scanning circuit 14. When the horizontal selection signal φH1n changes to H level, the switches 65 and 66 are turned on, the signal VA is output to the signal line S 16 from the signal holding capacitor C_A, and the signal VN is output to the signal line N 15 from the signal holding capacitor C_N1. The switches 65 and 66 are both turned on by the horizontal selection signal φH1n being turned on, and accordingly, the signals VA and VN are synchronized, and output to the signal line S 16 and signal line N 15, respectively. Similarly, when the horizontal selection signal φH2n changes to H level, the switches 67 and 68 are turned on, the signal VA is output to the signal line N 15 from the signal holding capacitor C_N2, and the signal VAB is output to the signal line S 16 from the signal holding capacitor C_AB. The switches 67 and 68 are both turned on by the horizontal selection signal φH2n being turned on, and accordingly, the signals VN and VAB are synchronized, and output to the signal line N 15 and signal line S 16, respectively.

The signal line N 15 and signal line S 16 are electrically connected to a differential amplifier 71. The differential amplifier 71 outputs difference between signals that the signal line N 15 and signal line S 16 transmit respectively. Specifically, in the event that the horizontal selection signal φH1n changes to H level, and the signal VA is output to the signal line S 16, and the signal VN is output to the signal line N 15, the differential amplifier 71 outputs a signal obtained by subtracting the signal VN from the signal VA, i.e., VA−VN. Similarly, in the event that the horizontal selection signal φH2n changes to H level, and the signal VAB is output to the signal line S 16, and the signal VN is output to the signal line N 15, the differential amplifier 71 outputs a signal obtained by subtracting the signal VN from the signal VAB, i.e., VAB−VN. The focal-point detection signal according to the present embodiment is VA, and the image obtaining signal is VAB. That is to say, signals obtained by subtracting the signal VN from each of the focal-point detection signal and image obtaining signal are output from the imaging apparatus according to the present embodiment within one frame period.

Reset switches 69 and 70 are electrically connected to the signal line N 15 and signal line S 16, respectively. A horizontal rest pulse φHc is supplied to the reset switches 69 and 70 from the TG 12. Drain voltage Vdd is supplied to the drains of the reset switches 69 and 70. After each of the signal line N 15 and signal line S 16 outputs a signal to the differential amplifier 71, the horizontal rest pulse φHc is changed to H level to turn on the reset switches 69 and 70, and to reset the potentials of the signal line N 15 and signal line S 16. Note that, though drawing is omitted in FIG. 13, capacitors are electrically connected to the signal line N 15 and signal line S 16, respectively. Let us say that the capacity value of a capacitor electrically connected to the signal line N 15 is CH1. For example, with regard to a signal held at the signal holding capacitor C_N1, a signal obtained by multiplying the signal value held at the signal holding capacitor C_N1 by C_N1/(C_N1+CH1) is output to the differential amplifier 71. Let us say that the capacity value of a capacitor electrically connected to the signal line S 16 is CH2. For example, with regard to a signal held at the signal holding capacitor C_A, a signal obtained by multiplying the signal value held at the signal holding capacitor C_A by C_A/(C_A+CH1) is output to the differential amplifier 71. In the event that the horizontal reset pulse φHc is changed to H level to turn on the reset switches 69 and 70, the charge of the capacitors CH1 and CH2 are reset.

Figure 14:
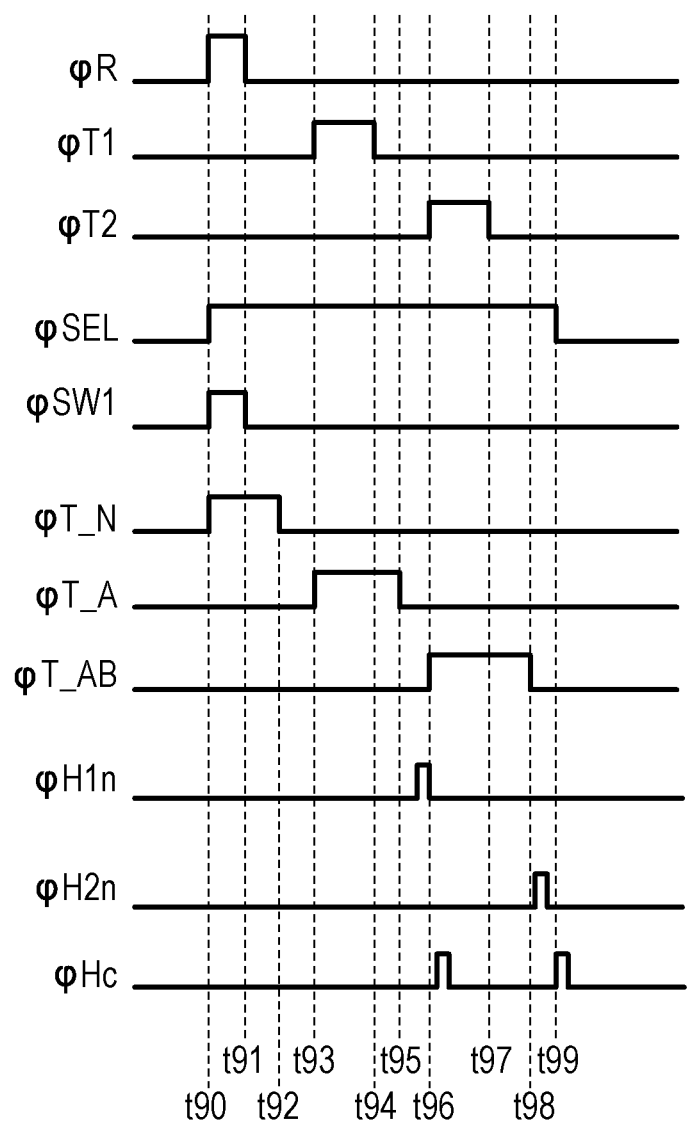
FIG. 14 is a diagram representing operation timing regarding the imaging apparatus according to another example.

Next, FIG. 14 illustrates, with the imaging apparatus exemplified in FIG. 13, an example of operation timing of a row including a pixel to output the signal A. Pixels to output the signal A according to the present embodiment are arrayed as with FIG. 1A.

At point-in-time t90, the reset pulse φR is changed to H level. Also, the selection pulse φSEL is changed to H level. Thus, the signal N is output to the vertical signal line 7. Also, the switch pulse φSW1 is changed to H level. Thus, the signal N is held at the clamp capacitor C0. Also, a signal based on the signal N is amplified, and further, a signal VN on which the offset signal Voff of the operational amplifier 8 is superimposed is output. The signal wiring signal φT_N is also changed to H level. Thus, writing of the signal VN is performed on the signal holding capacitors C_N1 and C_N2. At point-in-time t91, the reset pulse φR and switch pulse φSW1 are changed to L level.

At point-in-time t92, the signal readout switch φT_N is changed to L level. It is desirable to change the signal readout switch φT_N to L level after the reset pulse φR is changed to L level. This is because the reset pulse φR is changed to L level, and accordingly, the potential of the input node of the amplifier MOS transistor 5 is changed due to charge injection generated at the reset MOS transistor. It is desirable to hold a signal based on the potential of the input node of the amplifier MOS transistor 5 after this change at the signal holding capacitors C_N1 and C_N2. The signal VN output from the operational amplifier 8 at this point-in-time t92 is held at the signal holding capacitors C_N1 and C_N2.

At point-in-time t93, the transfer pulse φT1 is changed to H level. Thus, signal charge held at the photodiode 1 is transferred to the input node of the amplifier MOS transistor 5, and the signal A is output from the pixel 100. Also, a signal writing signal φT_A is changed to H level. Thus, the signal VA amplified and output by the operational amplifier 8 is written in the signal holding capacitor C_A based on the signal A output via the clamp capacitor C0.

At point-in-time t94, the transfer pulse φT1 is changed to L level.

At point-in-time t95, the signal writing signal φT_A is changed to L level, and the signal VA is held at the signal holding capacitor C_A. After the signal writing signal φT_A is changed to L level, the horizontal selection signal φH1n is changed to H level, and the signals VA and VN are output to the signal line S 16 and signal line N 15 from the signal holding capacitors C_A and C_N1 respectively. After output of the signals VA and VN from the signal holding capacitors C_A and C_N1 is ended respectively, the horizontal selection signal φH1n is changed to L level. Also, after the horizontal selection signal φH1n is changed to L level, in order to reset the potentials of the signal line N 15 and signal line S 16, the horizontal reset pulse φHc is changed to H level. After resetting the potentials of the signal line N 15 and signal line S 16, the horizontal reset pulse φHc is changed to L level. Note that, though not illustrated in the operation timing chart in FIG. 14, in order to output the signals VA and VN from the signal holding capacitors C_A and C_N1 in multiple columns, the horizontal reset pulse φHc is changed to L level. Next, the horizontal selection signal φH1n of a row to output the signals VA and VN is changed to H level, and signals are sequentially output to the signal line S 16 and signal line N 15. Similarly, each time output of the signals N and S of the signals VN and VS in one row is ended, in order to reset the potentials of the signal line N 15 and signal line S 16, the horizontal reset pulse φHc is changed to H level. Upon the potentials of the signal line N 15 and signal line S 16 being reset, the horizontal reset pulse φHc is changed to L level. Hereinafter, with regard to the signal holding capacitors C_A and C_N1 to which a signal is output from a focal-point detecting pixel, similarly, supply operation of the horizontal selection signal φH1n and horizontal reset pulse φHc is sequentially repeated to output the signals VA and VN.

At point-in-time t96, the transfer pulse φT2 is changed to H level. Thus, the signal A+B is output from the pixel 100. Also, the signal writing signal φT_AB is changed to H level. Thus, based on the signal A+B output via the clamp capacitor C0, the signal VAB is written in the signal holding capacitor C_AB amplified and output by the operational amplifier 8.

At point-in-time t97, the transfer pulse φT2 is changed to L level.

At point-in-time t98, the signal writing signal φT_AB is changed to L level, and the signal VAB is held at the signal hold capacitor C_AB. After the signal writing signal φT_AB is changed to L level, the horizontal selection signal φH2n is changed to H level to output the signals VAB and VN to the signal line S 16 and signal line N 15 from the signal holding capacitors C_AB and C_N2 respectively. After output of the signals VAB and VN from the signal holding capacitors C_AB and C_N2 is ended respectively, the horizontal selection signal φH2n is changed to L level. Also, after the horizontal selection signal φH2n is changed to L level, in order to reset the potentials of the signal line N 15 and signal line S 16, the horizontal reset pulse φHc is changed to H level. After resetting the potentials of the signal line N 15 and signal line S 16, the horizontal reset pulse φHc is changed to L level. Note that, though not illustrated in the operation timing chart in FIG. 14, in order to output the signals VAB and VN from the signal holding capacitors C_AB and C_N2 in multiple columns, the horizontal reset pulse φHc is changed to L level. Next, the horizontal selection signal φH2n of a row to output the signals VAB and VN is changed to H level to sequentially output signals to the signal line N 15 and signal line S 16. Similarly, each time output of the signals N and S of the signals VN and VAB in one row is ended, in order to reset the potentials of the signal line N 15 and signal line S 16, the horizontal reset pulse φHc is changed to H level. Upon the potentials of the signal line N 15 and signal line S 16 being reset, the horizontal reset pulse φHc is changed to L level. Hereinafter, with regard to the signal holding capacitors C_AB and C_N2 to which a signal is output from each row of pixels, similarly, supply operation of the horizontal selection signal φH2n and horizontal reset pulse φHc is sequentially repeated to output the signals VAB and VN.

At point-in-time t99, the selection pulse φSEL is changed to L level.

The operation timing of a row including a pixel to output the signal A has been described so far. Next, timing operation of a row not including a pixel to output the signal A will be described.

Figure 15:
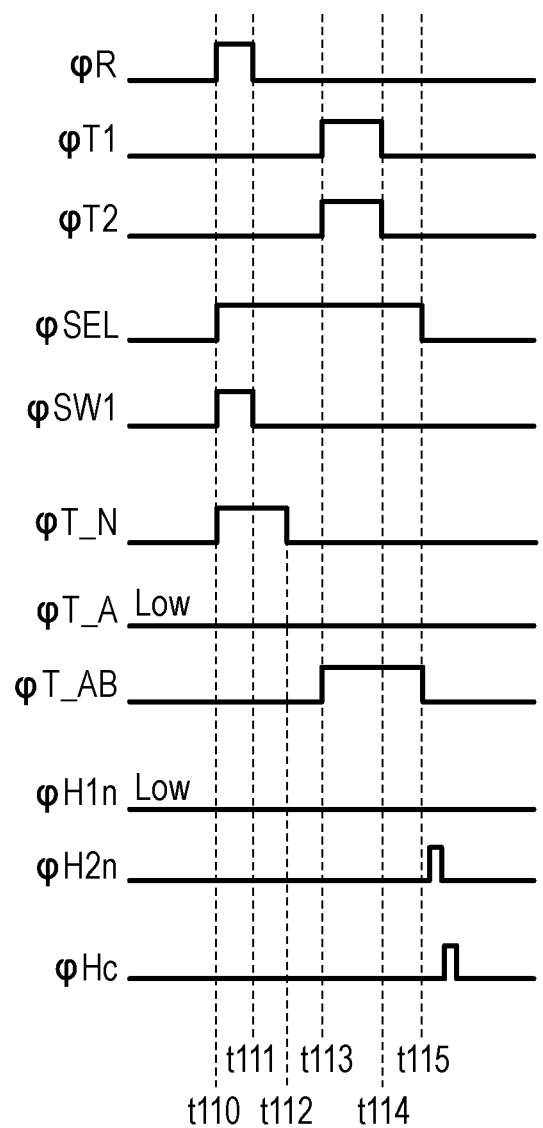
FIG. 15 is a diagram representing operation timing regarding the imaging apparatus according to another example.

FIG. 15 illustrates an example of operation timing of a row not including a pixel to output the signal A. Operation at point-in-time t110, t111, and t112 may be the same as operation at the point-in-time t90, t91, and t92 in the operation timing of a row including a pixel to output the signal A.

At point-in-time t113, the transfer pulses φT1 and φT2 are changed to H level. Thus, the signal A+B is output to the vertical signal line 7 from the pixel 100. Also, the signal writing signal φT_AB is changed to H level. Thus, based on the signal A+B output via the clamp capacitor C0, the signal VAB amplified and output by the operational amplifier 8 is written in the signal holding capacitor C_AB.

At point-in-time t114, the transfer pulses φT1 and φT2 are changed to L level.

At point-in-time t115, the signal writing signal φT_AB is changed to L level. Thus, the signal VAB is held at the signal holding capacitor C_AB. After changing the signal writing signal φT_AB to L level, the horizontal selection signal φH2n is changed to H level. At point-in-time t112, in the same way as the point-in-time t92 at the operation timing of a row including a pixel to output the signal A described in FIG. 14, the signal VN is held at the signal holding capacitor C_N2. Accordingly, the signal VN is output to the signal line N 15, and the signal VAB is output to the signal line S 16, respectively. After outputting the signals VN and VAB to the signal line N 15 and signal line S 16 respectively, the horizontal selection signal φH2n is changed to L level, and thereafter, the horizontal reset pulse φHc is changed to H level to reset the potentials of the signal line N 15 and signal line S 16. Note that, though not illustrated in the operation timing in FIG. 15, in order to output the signals VAB and VN from the signal holding capacitors C_AB and C_N2 in multiple columns, the horizontal rest pulse φHc is changed to L level. Next, the horizontal selection signal φH2n of a row to output the signals VAB and VN is changed to H level to sequentially output the signals to the signal line N 15 and signal line S 16. Similarly, each time output of the signals N and S of the signals VN and VAB in one row is ended, in order to reset the potentials of the signal line N 15 and signal line S 16, the horizontal reset pulse φHc is changed to H level. Upon the potentials of the signal line N 15 and signal line S 16 being reset, the horizontal reset pulse φHc is changed to L level. Hereinafter, with regard to the signal holding capacitors C_AB and C_N2 to which a signal is output from each row of pixels, similarly, supply operation of the horizontal selection signal φH2n and horizontal reset pulse φHc is sequentially repeated to output the signals VAB and VN.

AS described above, with the operation of a row not including a pixel to output the signal A, of the operation of a row including a pixel to output the signal A, the operation to output the signal A from the pixels 100, and the operation to hold the signal VA at the signal holding capacitor C_A may be omitted. Specifically, the period of the point-in-time t93 to t95 of the operation at a row including a pixel to output the signal A may be reduced. As compared to the case of performing operation to read out the signal A and signal A+B at the pixels 100 in all of the rows of the imaging apparatus, there are pixels 100 not outputting output of the signal A, and accordingly, time to read out signals from the imaging apparatus within one frame period may be reduced. Accordingly, operation to obtain the signal A while obtaining the signal A+B may be performed at high speed.

Description has been made so far based on the mode wherein pixels to output the signal A are located as with FIG. 1A. With the present embodiment, with regard to a mode wherein pixels to output the signal A are arrayed as with FIG. 1B as well, a decoder is employed as the horizontal scanning circuit 14, and accordingly, as with the second embodiment, time to read out signals from the imaging apparatus within one frame period may be reduced. With a mode where pixels to output the signal A are arrayed as with FIG. 1B, there may be performed the same operation as operation described with reference to FIG. 14 in the present embodiment except for the operation of the horizontal selection signal φH1n. The horizontal selection signal φH1n is changed to H level regarding only a column including a pixel serving as a pixel to output the signal A, and is in L level regarding the other columns. With solid-state imaging according to the present embodiment, there is a column not outputting the signals VA and VN from the signal holding capacitors C_A and C_N1. Thus, as compared to the case of outputting the signals VA and VN from the signal holding capacitors C_A and C_N1 of all of the columns, time for outputting the signals to the signal line S 16 and signal line N 15 within one frame period may be reduced.

Accordingly, operation to obtain the signal A while obtaining the signal A+B may be performed at high speed.

Also, with regard to a mode wherein pixels to output the signal A are arrayed as with FIG. 1C as well, a decoder is employed as the horizontal scanning circuit 14, and accordingly, time to read out signals from the imaging apparatus within one frame period may be reduced, in the same way as described with the second embodiment. With regard to a row including a pixel to output the signal A, there may be performed the same operation as operation described with reference to FIG. 14 in the present embodiment except for the operation of the horizontal selection signal φH1n. Also, with regard to a row not including a pixel to output the signal A, there may be performed the same operation as operation described with reference to FIG. 15 in the present embodiment. With a row including a pixel to output the signal A, in the same way as described with reference to FIG. 1B above in the present embodiment, the horizontal selection signal φH1n is changed to H level regarding only a column including a pixel serving as a pixel to output the signal A, and is in L level regarding the other columns. Accordingly, there is a column not outputting the signals VA and VN from the signal holding capacitors C_A and C_N1.

Thus, as compared to the case of outputting the signals VA and VN from the signal holding capacitors C_A and C_N1 of all of the columns, time for outputting the signals to the signal line S 16 and signal line N 15 per one row of pixels may be reduced. Also, the imaging apparatus in FIG. 1C includes a row not including a pixel to output the signal A. Accordingly, as described with reference to the previous FIG. 1A in the present embodiment, of the operation of a row including a pixel to output the signal A, the operation to output the signal A from the pixels 100, and the operation to hold the signal VA at the signal holding capacitor C_A may be omitted. Accordingly, even with a mode wherein pixels to output the signal A are arrayed as with FIG. 1C, in the same way as with the second embodiment, time to read out signals from the imaging apparatus within one frame period may be reduced. Accordingly, operation to obtain the signal A while obtaining the signal A+B may be performed at high speed.

With the present embodiment, a mode has been described wherein the areas of the photodiodes 1 and 51 differ as an example of the pixels 100. The present embodiment is not restricted to this mode, and the areas of the photodiodes 1 and 51 may be the same.

Fifth Embodiment

Description has been made so far regarding the imaging apparatus which outputs a focal-point detection signal. The present embodiment is another mode of the imaging apparatus.

Equivalent circuits of the pixels 100, vertical scanning circuit 2, and the signal processing circuit 101 may be the same as with FIG. 4 described in the first embodiment. In the event that the pixels 100 to output the signal A are arrayed as with FIGS. 1B and 1C, the horizontal scanning circuit 14 may be employed as a decoder as with the second embodiment. In the event that the pixels 100 to output the signal A are arrayed as with FIG. 1A, the horizontal scanning circuit 14 may be the same as with the first embodiment.

With the imaging apparatus according to the first embodiment, the one micro lens 23 is allocated so as to condense light into the light-receiving unit of the one pixel 100. The present embodiment is not restricted to the layout of the micro lens 23. For example, the one micro lens 23 may be allocated so as to condense light into the light-receiving units of the multiple pixels 100. Also, there may be a mode wherein the imaging apparatus does not include the micro lens 23.

With the present embodiment as well, the signal A+B is output from the multiple pixels 100 within one frame period, and further, the signals A of a part of pixels 100 of the multiple pixels 100 which have output the signal A+B are used. The layout of the pixels 100 which output the signal A may be a layout exemplified in FIGS. 1A to 1C in the same way as described so far in the first to fourth embodiments. In the event of arraying the pixels 100 which use the signal A in the layout in FIG. 1A, the same operation may be performed as with the operation timing chart described with reference to FIGS. 6 and 7 in the first embodiment. In the event of arraying the pixels 100 which use the signals A in the layout in FIGS. 1B and 1C, operation timing may be the same as described with reference to FIGS. 6, 9A, and 9B in the second embodiment.

In the same way as described in the first and second embodiments, the digital signals A+B based on the signals A+B from the multiple pixels 100, and the digital signals A based on the signals A of a part of pixels 100 of the multiple pixels 100 which have output the signal A+B are output from the imaging apparatus according to the present embodiment. The digital signals A and digital signals A+B output from the imaging apparatus are output to a digital signal processing circuit which is an example of the output signal processing unit 155 of the imaging system exemplified in FIG. 16, for example. The digital signal processing circuit performs processing for calculating difference between the digital signal A+B and digital signal A to obtain the digital signal B, or the like.

With an image obtained from one frame signal output of the imaging apparatus according to the present embodiment, an area where the pixels 100 which uses the signal A are arrayed may be expressed with high resolution as compared to the other areas. With regard to the area of the pixels 100 which use the signal A, the digital signals A are output from the imaging apparatus, and difference processing between the digital signal A+B and digital signal A is performed at the digital signal processing circuit to obtain the digital signal B. Accordingly, with the area where the pixels 100 which use the signal A are arrayed, the digital signals A and digital signals B are obtained. Accordingly, with an area using the signal A (area using each of the digital signal A and digital signal B), high resolution is realized for the worth of obtaining the digital signals A and digital signals B as compared to an area not using the signal A (area using the digital signal A+B).

Pixels 100 arrayed in an area intended to be expressed with high resolution in an image obtained by one frame imaging operation output the signal A and signal A+B, and pixels 100 in the other areas output the signal A+B. Operation relating to signal output of the imaging apparatus is the same as with the first or second embodiment, and accordingly, as compared to a mode using the signals A and signals A+B of all of the pixels, with the imaging apparatus according to the present embodiment, time used for signal readout from the imaging apparatus within one frame period may be reduced.

With the present embodiment, the pixels 100 which output the signal A and signal A+B as photoelectric conversion signals have been described. The present embodiment is not restricted to this mode, and may have pixels 100 further including another photodiode, and outputting a signal C based on signal charge generated at this photodiode. With this mode, a signal to be output from the pixels 100 has to be changed according to desired resolution. For example, there is a mode wherein the signal A+B is output from all of the pixels, and further the signal C is output from a part of pixels 100 included in an area intended to be displayed with high resolution. Also, a mode may be employed wherein the signal A+B+C is output from all of the pixels, and one of the signal A, signal B, signal A+B, signal B+C, and signal A+C is output from a part of pixels 100 included in an area intended to be displayed with high resolution. Even with such a mode, as compared to a mode wherein two photoelectric conversion signals are output from all of the pixels, as long as a mode wherein one photoelectric conversion signal is output from all of the pixels, and another photoelectric conversion signal is output from a part of pixels, time used for signal readout from the imaging apparatus within one frame period may be reduced.

Sixth Embodiment

Figure 16:
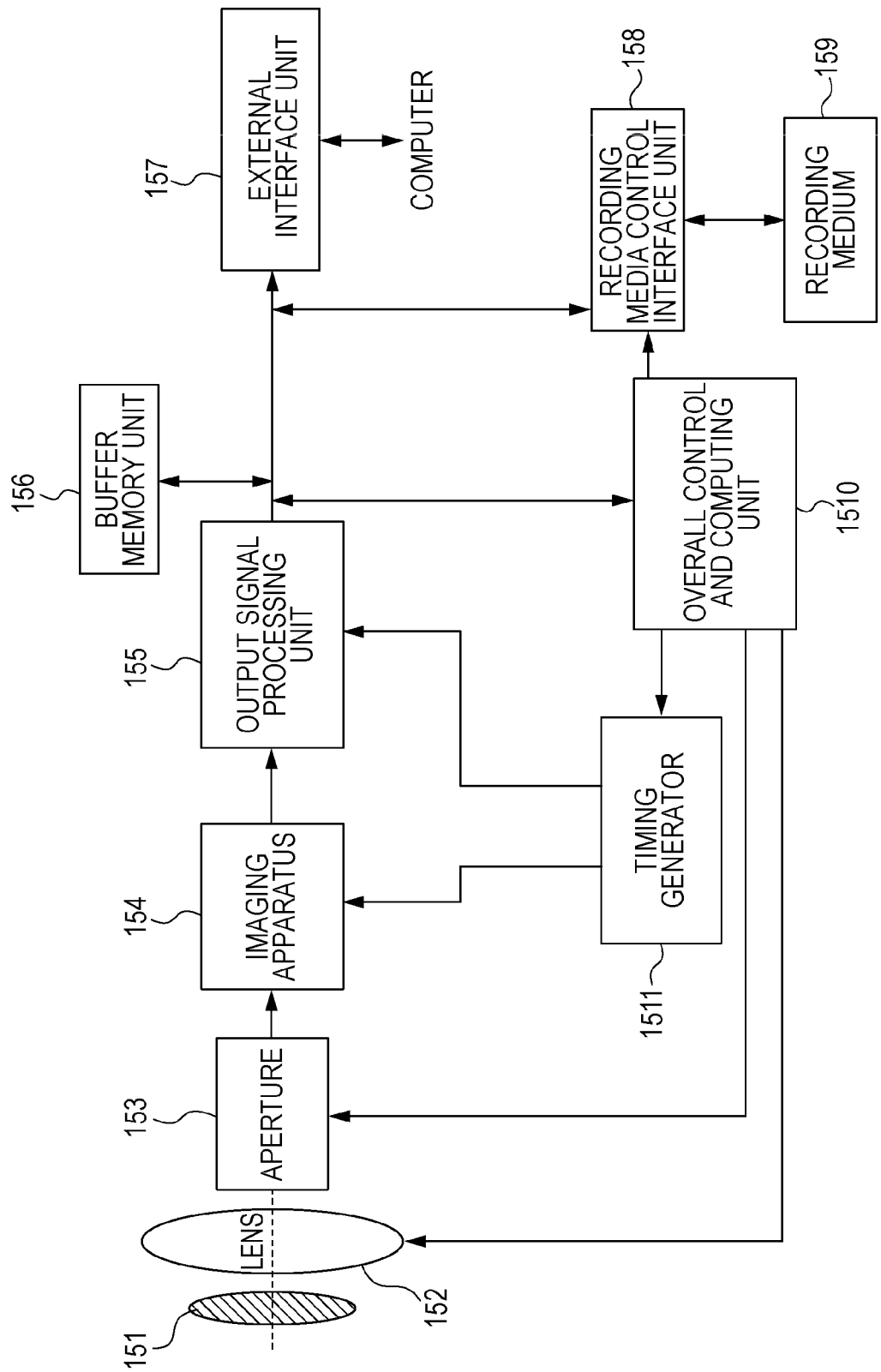
FIG. 16 is a schematic diagram regarding an imaging system.

An embodiment in the event of having applied the imaging apparatus thus described to an imaging system will be described. Examples of the imaging system include digital still cameras, digital camcorders, and monitoring cameras. FIG. 16 illustrates a schematic diagram in the event of having applied the imaging apparatus to a digital still camera as an example of the imaging system.

In FIG. 16, reference numeral 151 is a barrier for protection of a lens, 152 is a lens to form an optical image of a subject on an imaging apparatus 154, and 153 is an aperture for varying light intensity passed through the lens 152. The lens 152, and aperture 153 make up an optical system to guide light to the imaging apparatus 154. Reference numeral 155 is an output signal processing unit to perform processing of an output signal output from the imaging apparatus 154.

In the event that the output signal from the imaging apparatus 154 is an analog signal as with the fourth embodiment, a mode is employed wherein the output signal processing unit 155 includes an analog signal processing unit, analog-to-digital conversion unit, and a digital signal processing unit. The analog signal processing unit performs various types of correction on the output signal from the imaging apparatus 154 to output the signal to the analog-to-digital conversion unit. The analog-to-digital conversion unit converts the signal output from the analog signal processing unit into a digital signal, and outputs this to the digital signal processing unit. The digital signal processing unit performs various types of correction and compression on the signal as appropriate, and then outputs the signal. Note that, with the imaging apparatus 154 according to the fourth embodiment, a case has been exemplified where a part of pixels output the signal A+B but do not output the signal A. Accordingly, the amount of data of focal-point detection signals output from the imaging apparatus 154 within one frame period is smaller as compared to a case where all of the pixels output the signal A. Accordingly, the output signal processing unit 155 also has an advantage wherein processing time for analog-to-digital conversion is reduced, thereby increasing the speed of signal processing.

On the other hand, in the event that the imaging apparatus 154 outputs a digital signal as with the first to third embodiments described earlier, the output signal processing unit 155 includes a digital signal processing unit. The digital processing unit performs difference processing for subtracting the digital signal N from each of the digital signal A and digital signal A+B output from the imaging apparatus 154, and difference processing for subtracting the digital signal A from the digital signal A+B to obtain the digital signal B. Also, the output signal processing unit 155 additionally performs operation to perform various types of correction and compression as appropriate to output the signal. Note that the imaging apparatuses 154 according to the first to third embodiments include a pixel which outputs the signal A+B but does output the signal A. Accordingly, the amount of data of focal-point detection signals output from the imaging apparatus 154 within one frame period is smaller as compared to a case where all of the pixels output the signal A. Accordingly, even when the imaging apparatus 154 outputs digital signals, the image apparatus 154 has an advantage wherein the amount of data to be processed at the signal processing is reduced, thereby increasing the speed of the signal processing.

In FIG. 16, reference numeral 156 is a buffer memory unit for temporarily store image data, 158 is an interface unit for performing recording or readout on a recoding medium, and 159 is a detachable recoding medium such as semiconductor memory or the like for performing recording or readout of imaged data. Reference numeral 157 is an interface unit for communicating with an external computer or the like. Reference numeral 1510 is an overall control and computing unit for controlling the overall of the digital still camera and performing various types of computing, and 1511 is a timing generator unit for outputting various timing signals to the imaging apparatus 154 and output signal processing unit 155. Here, a timing signal or the like may externally be input, and the imaging system has to include at least the imaging apparatus 154 and the output signal processing unit 155 which processes the output signal output from the imaging apparatus 154.

The processing to subtract the digital signal A from the digital signal A+B, or the processing to subtract the signal VA-VN from the signal VAB-VN which the output signal processing unit 155 performs are performed between signals both output from the same pixel. Specifically, difference processing is performed between the focal-point detection signal based on the signal A that a pixel outputs, and the image obtaining signal based on the signal A+B that the same pixel as the pixel which output the signal A output. Thus, a signal based on the signal B of a pixel is obtained, and signal values of this signal and a signal based on the signal A are compared, and accordingly, focal-point detection according to the phase difference detecting method is performed.

As described above, the imaging system according to the present embodiment may perform imaging operation by applying the imaging apparatus 154. Focal-point detection operation according to the phase difference detecting method based on the focal-point detection signal output from the imaging apparatus 154, and image formation based on the image obtaining signal may be performed by applying the imaging apparatuses exemplified in the first to fourth embodiments to the imaging system according to the present embodiment.

Seventh Embodiment

Figure 17:
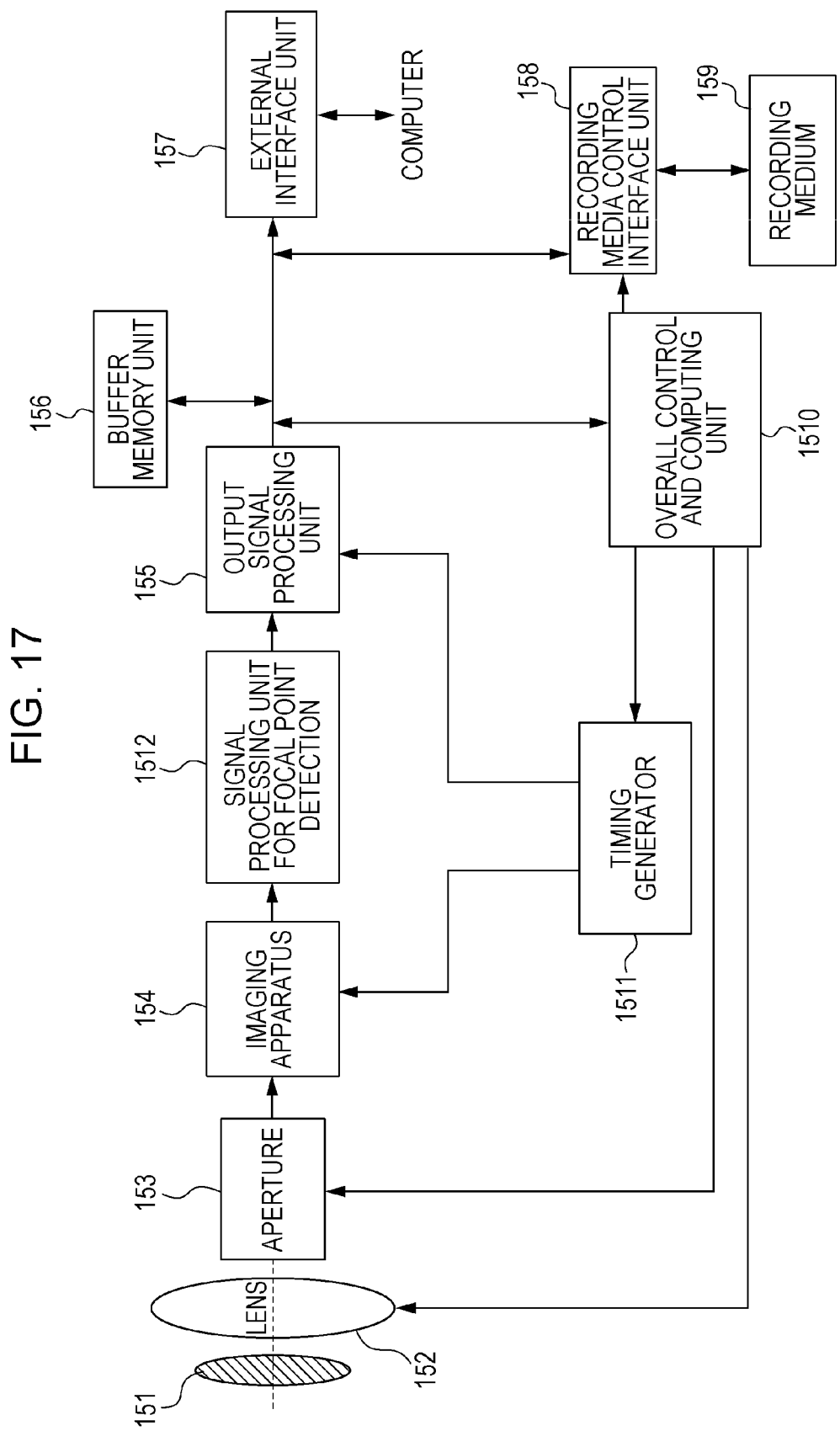
FIG. 17 is a schematic diagram regarding an imaging system according to another example.

The imaging system according to the present embodiment will be described with reference to FIG. 17. Description will be made primarily with regard to points different from the imaging system described in the sixth embodiment. With the imaging system exemplified in FIG. 17, a focal-point detection signal processing unit 1512 which processes the focal-point detection signal output from the imaging apparatus 154 is provided to the imaging system described in the sixth embodiment. This is a mode wherein signals are output from the focal-point detection signal processing unit 1512 to the output signal processing unit 155.

With the imaging apparatus 154 according to the present embodiment, all of the pixels serve as pixels to output the signal A. Specifically, each of the signal A and signal A+B is output from all of the pixels of the imaging apparatus 154. Accordingly, the focal-point detection signals and image obtaining signals based on pixel signals from all of the pixels are output from the imaging apparatus 154. In the event that the imaging apparatus 154 includes the analog-to-digital conversion circuit, and outputs digital signals, the focal-point detection signals are the digital signals A, and the image obtaining signals are the digital signals A+B. The circuit configuration in the event that the focal-point detection signal and image obtaining signal which are digital signals are output from the imaging apparatus 154 may be the configuration as with FIG. 4 exemplified in the first embodiment, but is not restricted to this configuration. Specifically, a mode is desirable wherein the pixels 100 output the signal A and signal A+B in a time-sharing manner, the digital signals A and digital signals A+B based on these signals are held at the memory 13, and also the digital signals are sequentially output from each memory 13 by the horizontal scanning circuit 14. In the event that analog signals are output from the imaging apparatus 154, the focal-point detection signals are the signals VA, and the image obtaining signals are the signals VAB. The circuit configuration in the event that the focal-point-detection signal and image obtaining signal which are analog signals are output from the imaging apparatus 154 may be a circuit configuration as with FIG. 13 exemplified in the sixth embodiment, but is not restricted to this configuration. Specifically, a mode is desirable wherein the pixels 100 output the signal A and signal A+B in a time-sharing manner, the signals VA and VAB based on these signals are held at the signal holding capacitors, and the signals VA and VAB are output from each signal holding capacitor by the horizontal scanning circuit 14. With the mode wherein analog signals are output from the imaging apparatus 154, the output signal processing unit 155 includes the analog signal processing unit, analog-to-digital conversion unit, and digital signal processing unit. The analog signal processing unit performs various types of correction on the output signal from the imaging apparatus 154 to output the signal to the analog-to-digital conversion unit. The analog-to-digital conversion unit converts the signal output from the analog signal processing unit into a digital signal, and outputs this to the digital signal processing unit. The digital signal processing unit performs various types of correction and compression on the signal as appropriate, and then outputs the signal. The focal-point detection signal processing unit 1512 outputs the focal-point detection signals based on the signals A from a part of pixels of the focal-point detection signals based on the signals A of all of the pixels output from the imaging apparatus 154, to the output signal processing unit 155. Also, the focal-point detection signal processing unit 1512 also performs processing to discard the focal-point detection signals based on the signals A from another part of pixels.

On the other hand, the image obtaining signals output from the imaging apparatus 154 are not processed at the focal-point detection signal processing unit 1512, and are output to the output signal processing unit 155 without change.

The focal-point detection signals based on the signals A from a part of pixels, and the image obtaining signals based on the signals A+B from all of the pixels of the imaging apparatus 154 are input to the output signal processing unit 155. As compared to a case where the focal-point detection signals based on the signals A from all of the pixels are input to the output signal processing unit 155, the focal-point detection signal processing unit 1512 outputs the focal-point detection signals based on the signals A alone from a part of pixels to the output signal processing unit 155, and accordingly, the amount of data of the focal-point detection signals to be input to the output signal processing unit 155 is reduced. Accordingly, the output signal processing unit 155 may perform signal processing at high speed as compared to a case where the focal-point detection signals based on the signals A of all of the pixels are input.

Accordingly, the imaging system according to the present embodiment has the focal-point detection signal processing unit which outputs to the output signal processing unit 155, of the focal-point detection signals output from the imaging apparatus 154, the focal-point detection signals based on the signals A from a part of pixels, thereby enabling the signal processing to be performed at high speed.

Eighth Embodiment

Figure 18A:
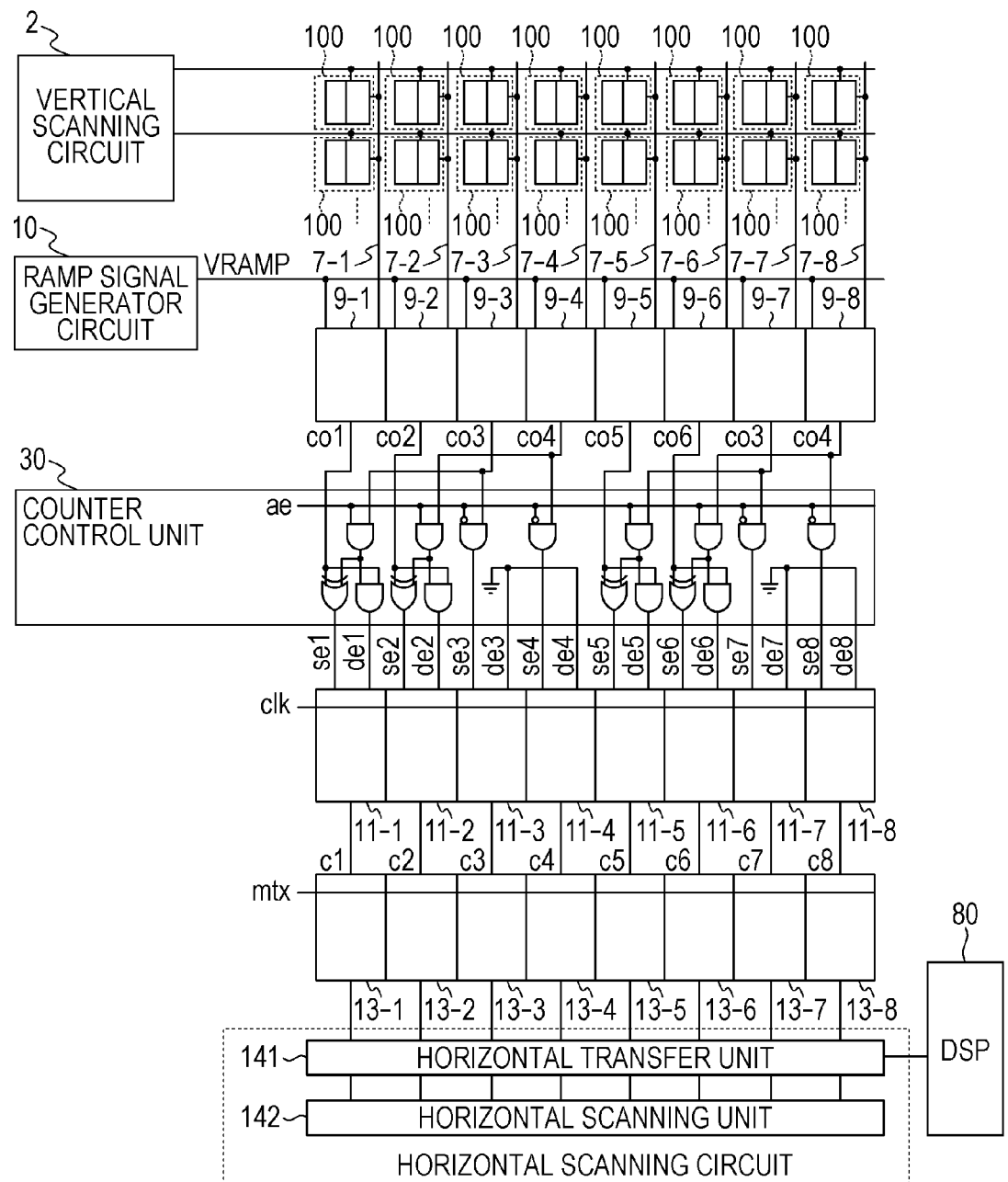
FIG. 18A is a schematic diagram regarding an imaging apparatus according to another example.

An imaging apparatus according to the present embodiment will be described with reference to the drawings. FIG. 18A is a schematic diagram illustrating an example of the configuration of the imaging apparatus according to the present embodiment.

In FIG. 18A, two photoelectric conversion units 1 and 51 which the pixels 100 have are schematically represented with two rectangles. Also, in FIG. 18A, a member having the same function as with FIG. 4 is also denoted with the same reference numeral as the reference numeral denoted in FIG. 4. Also, in FIG. 18, the vertical signal line 7, comparator circuit 9, counter circuit 11, and memory 13 are denoted with a branch number that represents what row from the left in the drawing the corresponding component is allocated in. The horizontal scanning circuit 14 includes a horizontal transfer unit 141 and a horizontal scanning unit 142. Also, the imaging apparatus described in FIG. 18A includes a counter control unit 30. A signal mtx is given to the memory 13 from the TG.

Figure 18B:
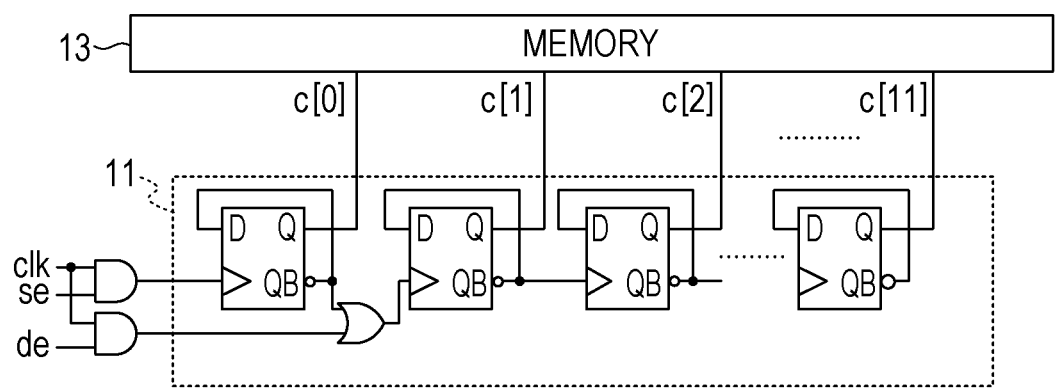
FIG. 18B is a schematic diagram illustrating an example of a counter circuit.

FIG. 18B is a diagram illustrating the configuration of the counter circuit 11 and memory 13 in one row according to the present embodiment. The counter circuit 11 is illustrated as a mode to output a 12-bit digital signal of bit signals c[0] to c[11]. With a period while a signal de is in H level, and also a signal se is in L level, which the counter control unit 30 outputs, the signal values of the bit signals c[1] to c[11] are changed according to the clock signal clk. On the other hand, with a period while the signal de is in L level, and also the signal se is in H level, the signal values of the bit signals c[0] to c[11] are changed according to the clock signal clk. In the event that the signal value of the c[0] has changed, the bit signal c[1] changes to a signal obtained by dividing the bit signal c[0] by two. Accordingly, the number of counts per unit time of the counter circuit 11 in the event that the signal de is in H level and the signal se is in L level changes to double in the event that the signal de is in L level and the signal se is in H level. Hereinafter, the count operation of the counter circuit 11 in the event that the signal de is in H level, and the signal se is in L level will be referred to as double count operation, and the count operation of the counter circuit 11 in the event that the signal de is in L level, and the signal se is in H level will be referred to as single count operation.

Next, the operation of the imaging apparatus illustrated in FIG. 18A will be described with reference to FIG. 19. The comparator circuit 9 according to the present embodiment outputs a signal co to the counter control unit 30 as a comparison result signal. The comparator circuit 9 according to the present embodiment outputs, when the potential of the vertical signal line 7 is greater than the potential of the ramp signal VRAMP, a signal in H level, and when the potential of the vertical signal line 7 is smaller than the potential of the ramp signal VRAMP, outputs a signal in L level.

Reference numerals denoted in FIG. 19 correspond to the reference numerals denoted in FIG. 18A. With the present embodiment, let us say that signals de1 and de4 are both in L level within the entire period.

Description will be made regarding an A conversion period. Prior to the A conversion period, signals A are output from pixels 100 of the first row to the comparator circuit 9. First, the counter control unit changes a signal ae to H level.

Thereafter, comparator circuits 9-1, 9-2, 9-3, and 9-4 start comparison operation between the ramp signal VRAMP and the potentials of vertical signal lines 7-1, 7-2, 7-3, and 7-4, respectively. When comparison signals co1 and co3 of the comparator circuits 9-1 and 9-3 are both in H level, a signal se1 is in L level, and a signal de1 is in H level, which the counter control unit 30 outputs. At this time, a counter circuit 11-1 counts the clock signal clk using the double count operation. Also, when comparison result signals co2 and co4 of the comparator circuits 9-2 and 9-4 are both in H level, a signal se2 is in L level, and a signal de2 is in H level, which the counter control unit 30 outputs. At this time, the counter circuit 11-2 counts the clock signal clk using the double count operation. Also, regardless of the signal levels of the comparison result signals co3 and co4 of the comparator circuits 9-3 and 9-4, the signal sea is in L level while the signal ae is in H level. The signal de3 is also in L level, and accordingly, the counter circuit 11-3 does not perform count operation of the clock signal clk. Also, regardless of the signal level of the comparison result signal co4 of the comparator circuit 9-4, while the signal ae is in H level, the signal se4 is in L level. The signal de4 is also in L level, and accordingly, the counter circuit 11-4 does not perform count operation of the clock signal clk.

Next, let us say that the comparison result signal co2 of the comparator circuit 9-2 is changed from H level to L level. Thus, the signal se2 is changed from L level to H level, and the signal de2 is changed from H level to L level. Accordingly, the counter circuit 11-2 proceeds from the double count operation to the single count operation, and counts the clock signal clk.

Next, let us say that the comparison result signal co3 of the comparator circuit 9-3 is changed from H level to L level. Thus, the signal de1 is changed from H level to L level, and the signal se1 is changed from L level to H level. Accordingly, the counter circuit 11-1 proceeds from the double count operation to the single count operation, and counts the clock signal clk.

Next, let us say that the comparison result signal co4 of the comparator circuit 9-4 is changed from H level to L level. Thus, the signal se2 is changed from H level to L level, and accordingly, the counter circuit 11-2 stops the count operation of the clock signal clk, and holds the count signal value at this time.

Next, let us say that the comparison result signal co1 of the comparator circuit 9-1 is changed from H level to L level. Thus, the signal se1 is changed from H level to L level, and accordingly, the counter circuit 11-1 stops the count operation of the clock signal clk, and holds the count signal value at this time.

The count signal value held at the counter circuit 11-1 is a digital signal based on a signal obtained by adding the signals A of the pixels 100 in the first column and the signals A of the pixels 100 in the third column. This digital signal is referred to as digital signal A1+A3. The count signal held at the counter circuit 11-2 is a digital signal based on a signal obtained by adding the signals A of the pixels 100 in the second column and the signals A of the pixels 100 in the fourth column. This digital signal is referred to as digital signal A2+A4.

Next, the TG changes the signal mtx to H level. Thus, the memory 13 holds the count signal held at the counter circuit 11. The memory 13-1 holds the digital signal A1+A3. The memory 13-2 holds the digital signal A2+A4. The memory 13-3 and 13-4 hold a signal value of 0. The horizontal transfer unit 141 outputs the digital signal held at the memory 13 in each column to the DSP 80 based on the signal from the horizontal scanning unit 142. Another mode may be made wherein, with the output operation of the digital signal from this memory 13 to the DSP 80, the horizontal transfer unit 141 skips the memory 13 holding a signal value of 0, and then outputs a digital signal from the memory 13 alone which holds a digital signal based on a signal obtained by adding the multiple signals A.

Next, the A+B conversion period will be described. the signals A+B are output from the pixels 100 in the first row to the comparator circuit 9 prior to the A+B conversion period.

First, let us say that the signal ae is in L level without change. Also, the count signals of the counter circuits 11-1, 11-2, 11-3, and 11-4 are reset to initial values.

Thereafter, the comparator circuits 9-1, 9-2, 9-3, and 9-4 start comparison operation between the ramp signal VRAMP and the potentials of the vertical signal lines 7-1, 7-2, 7-3, and 7-4, respectively. With the A+B conversion period, the signal ae is in L level, and accordingly, the signals de1 and de2 are in L level during the A+B conversion period. Thus, the counter circuit 11-1 counts the clock signal clk using the single count operation until the comparison result signal changes from H level to L level. This is true regarding counter circuits 11-2, 11-3, and 11-4, which count the clock signal clk using the single count operation until the comparison result signals co2, co3, and co4 are changed from H level to L level, respectively. Thus, the counter circuit 11-1 holds the digital signals (A+B) 1 based on the signals A+B which the pixels 100 in the first column output. Similarly, the counter circuits 11-2, 11-3, and 11-4 hold the digital signal (A+B) 2, digital signal (A+B) 3, and digital signal (A+B), respectively. Thereafter, the TG changes the signal mtx to H level, the memory 13-1, 13-2, 13-3, and 13-4 hold the digital signal (A+B) 1, digital signal (A+B) 2, digital signal (A+B) 3, and digital signal (A+B) 4, respectively. The horizontal transfer unit 141 sequentially outputs the digital signals held at the memory 13 in each column to the DSP 80 based on the signal from the horizontal scanning unit 142.

The digital signals A held at the memory 13 according to the present embodiment are digital signals based on signals obtained by adding the signals A in multiple columns. Accordingly, as compared to the digital signals A+B, the number of memory 13 which holds the digital signals A is reduced, and accordingly, the amount of the digital signals A to be output to the DSP 80 is smaller than the digital signals A+B. Accordingly, with the imaging apparatus according to the present embodiment as well, the amount of the digital signals A to be output within one frame period is smaller than the amount of the digital signals A+B. Thus, as compared to the mode where the memory 13 in all of the columns hold the digital signals A, a period while the digital signals A are output from all of the memory 13 which hold the digital signals A to the DSP 80 may be reduced. Also, the amount of the digital signals A is reduced, and accordingly, load of the signal processing of the DSP 80 may be reduced.

As a mode of the present embodiment, as illustrated in FIGS. 3A and 3B, a case where the signals A are employed as focal-point detection signals will be described. The signals A which are focal-point detection signals may be low in signal precision to be expected as compared to the signals A+B which are image obtaining signals. In such a case, as with the present embodiment, a mode may suitably be implemented wherein digital signals A based on signals obtained by adding the signals A in multiple columns are obtained.

Ninth Embodiment

Description will be made regarding an imaging apparatus according to the present embodiment primarily with regard to points different from the eighth embodiment, with reference to the drawings. The present embodiment is a mode wherein the signal A and signal B are output to different vertical signal lines 7 from the pixels 100.

Figure 20A:
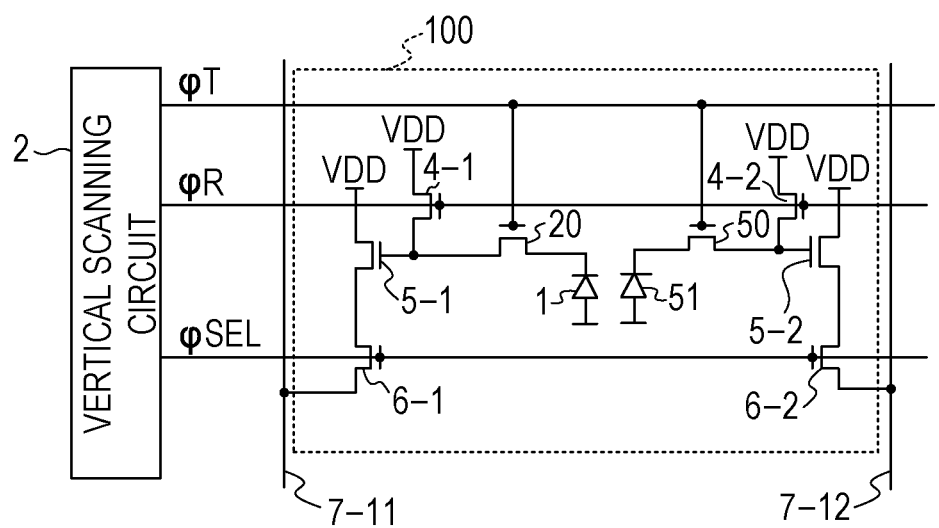
FIG. 20A is a schematic diagram of a pixel unit according to another example.

FIG. 20A is an example of the configuration of the pixels according to the present embodiment. In FIG. 20A, a member having the same function as with FIG. 4 is also denoted with the same reference numeral as the reference numeral denoted in FIG. 4. With the pixels illustrated in FIG. 4, a mode has been illustrated wherein the transfer MOS transistor 20 is controlled with the transfer pulse φT1, and the transfer MOS transistor 50 is controlled with the transfer pulse φT2. In FIG. 20A, a mode has been illustrated wherein the transfer MOS transistors 20 and 50 are both controlled with the same transfer pulse φT. Also, in FIG. 4, a mode has been illustrated wherein signal charge generated at each of the photodiodes 1 and 51 is transferred to the amplifier MOS transistor 5. In FIG. 20A, the signal charge generated at the photodiode 1 is transferred to the amplifier MOS transistor 5-1 via the transfer MOS transistor 20. Also, signal charge generated at the photodiode 51 is transferred to the amplifier MOS transistor 5-2 via the transfer MOS transistor 50. The amplifier MOS transistors 5-1 and 5-2 output a signal based on signal charge transferred to the corresponding input node to vertical signal lines 7-11 and 7-12 via selection MOS transistors 6-1 and 6-2, respectively. Signals to be output to the vertical signal line 7-11 based on signal charge generated at the photodiode 1 are the signals A. Also, signals to be output the vertical signal line 7-12 based on signal charge generated at the photodiode 51 are the signals B.

Figure 20B:
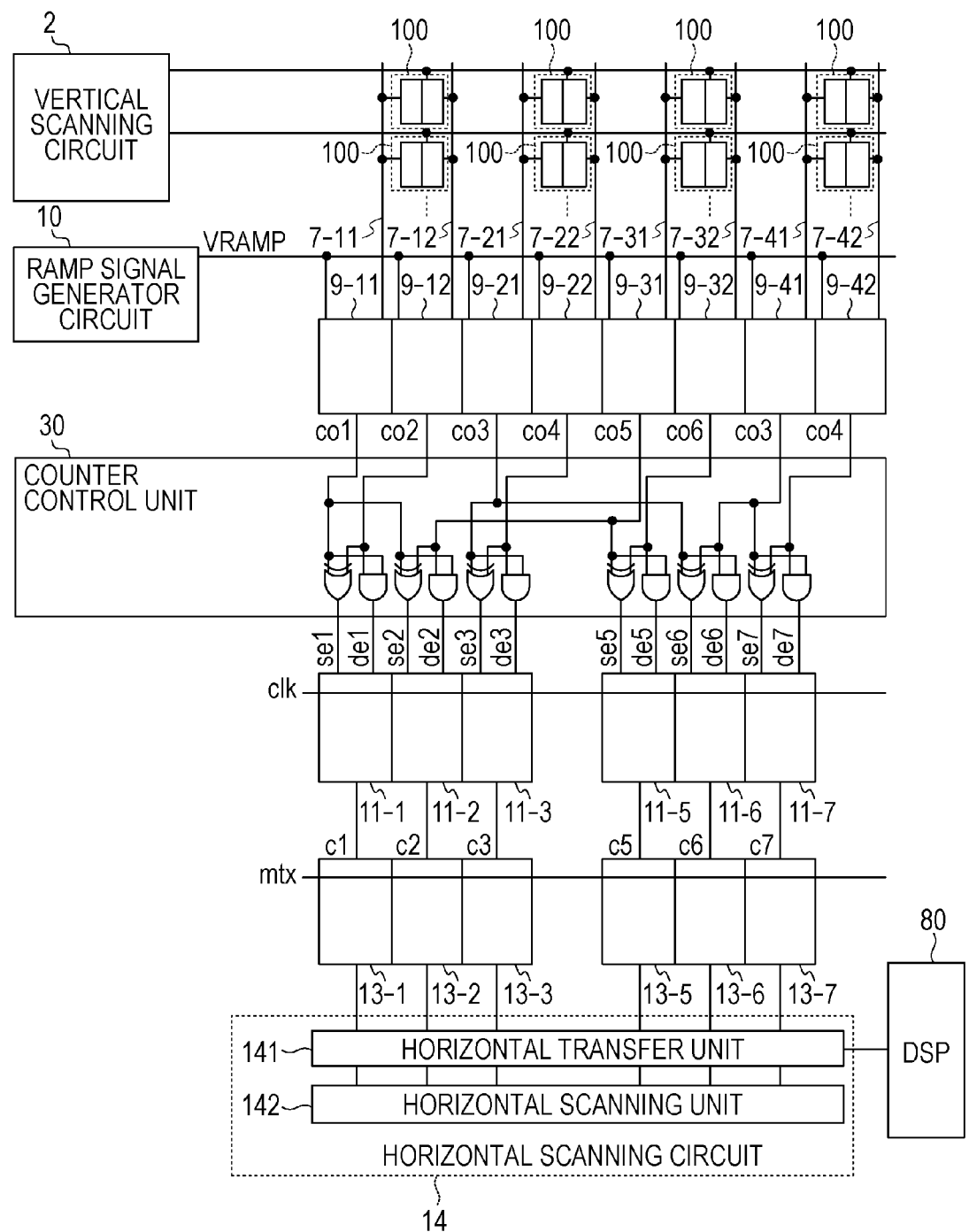
FIG. 20B is a schematic diagram of an imaging apparatus according to another example.

FIG. 20B is a diagram illustrating an example of the configuration of the imaging apparatus according to the present embodiment. In FIG. 20B, a member having the same function as a member illustrated in FIG. 18A is represented by being denoted with the same reference numeral as the reference numeral denoted in FIG. 18A. The signals A (hereinafter, signals A1) output to the vertical signal line 7-11 from the pixels 100 in the first column are output to a comparator circuit 9-11. Similarly, the signals B (hereinafter, signals B1) output to the vertical signal line 7-12 are output to a comparator circuit 9-12. The signals A (hereinafter, signals A2) output to a vertical signal line 7-21 from the pixels 100 in the second column are output to a comparator circuit 9-21. Also, the signals B (hereinafter, signals B2) output to a vertical signal line 7-22 from the pixels 100 in the second column are output to a comparator circuit 9-22. The signals A (hereinafter, signals A3) output to a vertical signal line 7-31 from the pixels 100 in the third column are output to a comparator circuit 9-31. Also, the signals B (hereinafter, signals B3) output to a vertical signal line 7-32 from the pixels 100 in the third column are output to a comparator circuit 9-32. The comparator circuits 9 output comparison result signals co between the signals output to the vertical signal lines 7 and the ramp signal VRAMP to the counter control unit 30, respectively.

Figure 21:
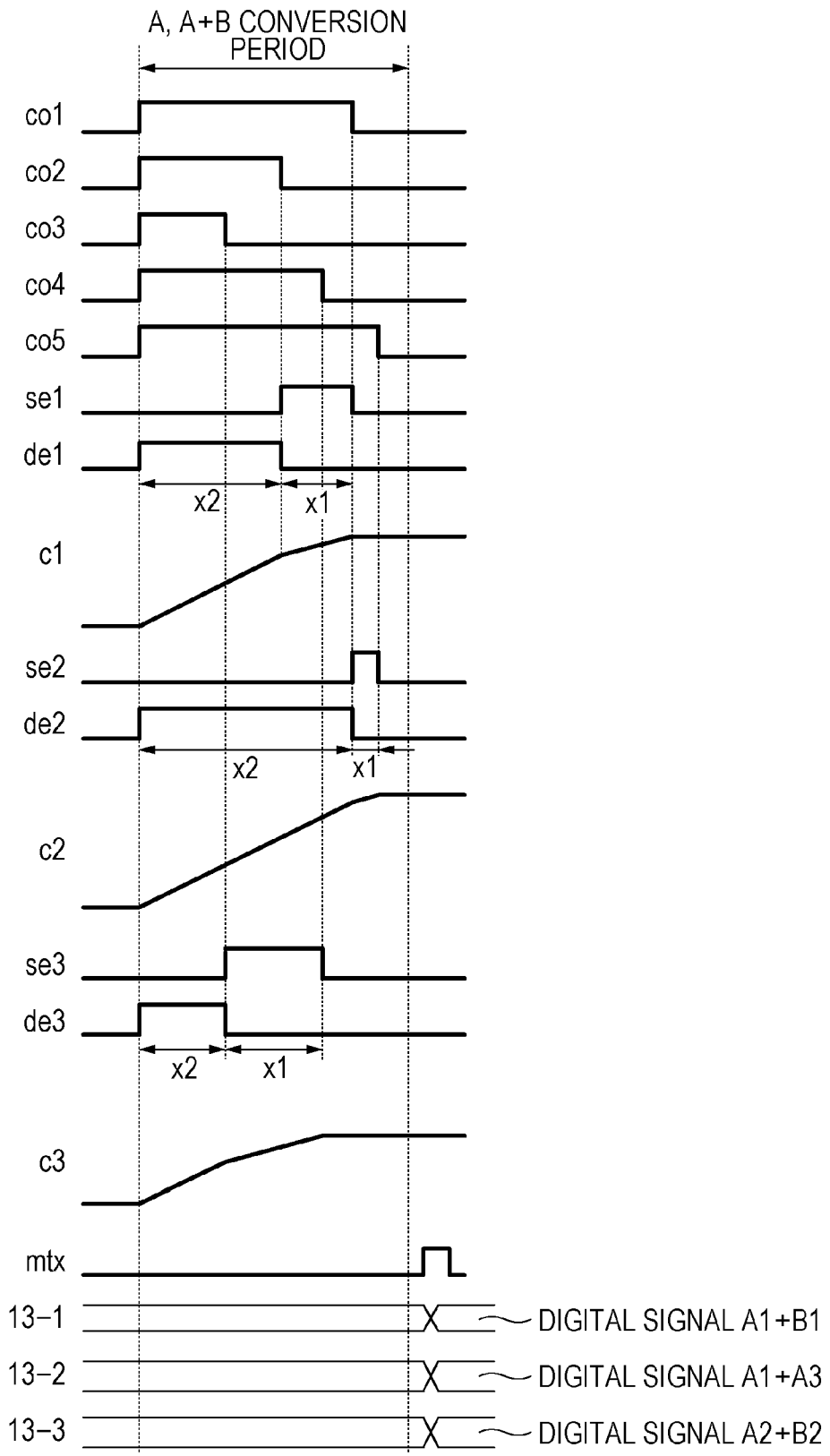
FIG. 21 is a diagram representing operation timing regarding the imaging apparatus according to another example.

Next, operations of the counter circuits 11-1 to 11-3 of the imaging apparatus illustrated in FIG. 20B will be described with reference to FIG. 21. The operations illustrated in FIG. 21 are based on a mode wherein the counter circuit 11-1 generates a signal A1+B1, the counter circuit 11-2 generates a signal A1+A3, and the counter circuit 11-3 generates a signal A2+B2.

First, the comparison result signals co1 to co5 are all in H level. At this time, the signals se1, se2, and se3 are in L level, and the signals de1, de2, and de3 are in H level. Each of the counter circuits 11-1, 11-2, and 11-3 counts the clock signal clk based on the double count operation.

Next, the comparison result signal co3 is changed from H level to L level. Thus, the signal se3 is changed from L level to H level. Also, the signal de3 is changed from H level to L level. Thus, the counter circuit 11-3 counts the clock signal clk based on the single count operation.

Next, the comparison result signal co1 is changed from H level to L level. Thus, the signal se1 is changed from L level to H level. Also, the signal de1 is changed from H level to L level. Thus, the counter circuit 11-1 counts the clock signal clk based on the single count operation.

Next, the comparison result signal co4 is changed from H level to L level. Thus, the signal sea is changed from H level to L level. Accordingly, the counter circuit 11-3 holds the count signal at this time. This held count signal is the digital signal A2+B2 based on the signal A2+B2.

Next, the comparison result signal co1 is changed from H level to L level. Thus, the signal se1 is changed from H level to L level. Accordingly, the counter circuit 11-1 holds the count signal at this time. This held count signal is the digital signal A1+B1 based on the signal A1+B1.

Next, the comparison result signal co5 is changed from H level to L level. Thus, the signal se2 is changed from H level to L level.

Next, the TG changes the signal mtx to H level. Thus, the digital signals held at the counter circuits 11-1, 11-2, and 11-3 are output to the memory 13-1, 13-2, and 13-3, respectively.

The digital signals A held at the memory 13 according to the present embodiment are digital signals based on signals obtained by adding the signals A in multiple columns. Accordingly, as compared to the digital signals A+B, the number of the memory 13 holding the digital signals A is small, and accordingly, the count of the digital signals A to be output to the DSP 80 is smaller than the amount of the digital signals A+B. Accordingly, with the imaging apparatus according to the present embodiment as well, the same advantages as the advantages described in the eighth embodiment may be obtained.

Tenth Embodiment

An imaging apparatus according to the present embodiment will be described with reference to the drawings. The imaging apparatus according to the present embodiment has a mode wherein the DSP 80 adds the digital signals A in multiple columns and outputs the added signals.

Figure 22A:
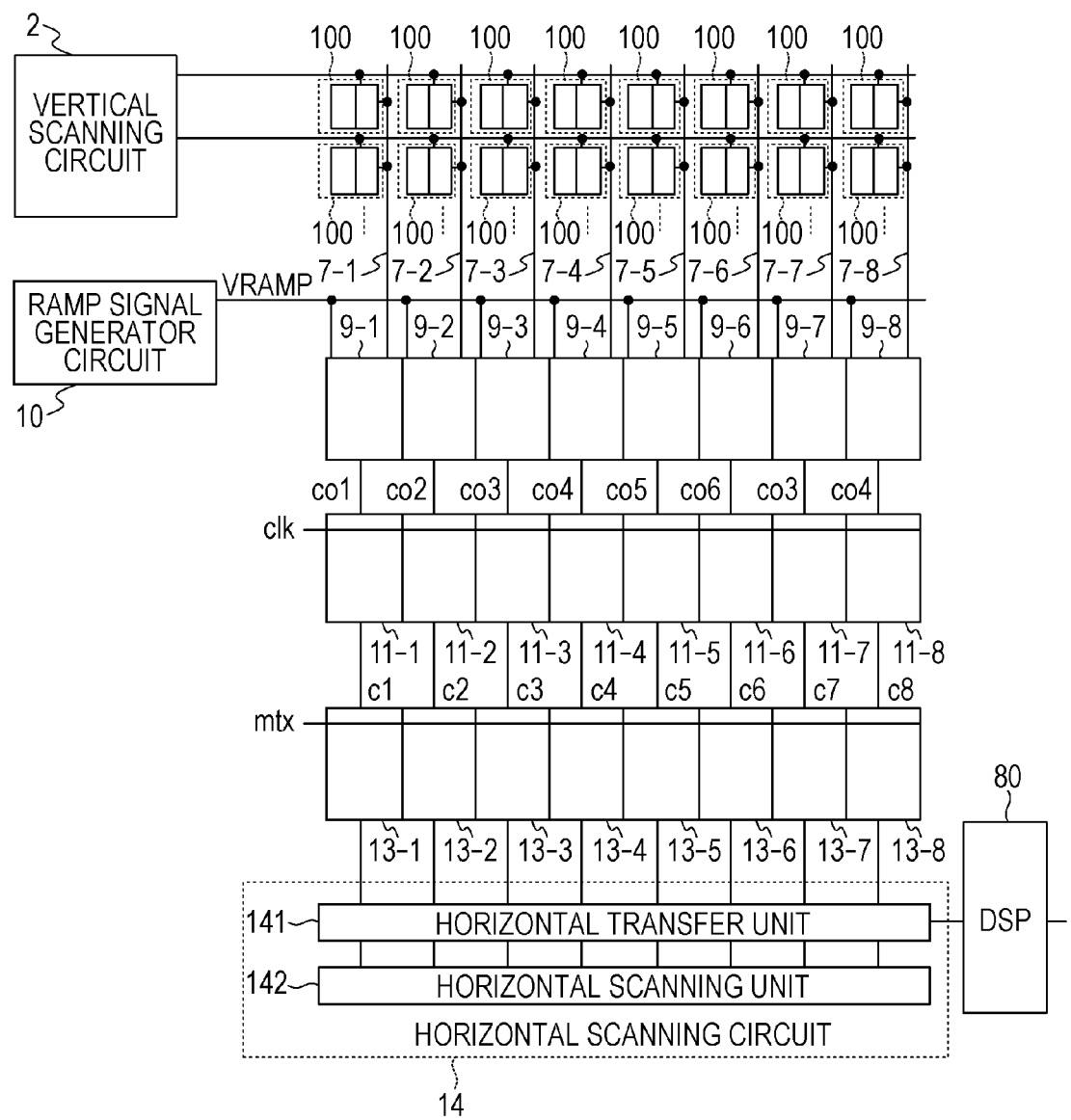
FIG. 22A is a schematic diagram of an imaging apparatus according to another example.

FIG. 22A is a diagram illustrating an example of the configuration of the imaging apparatus according to the present embodiment. The signals A and signals A+B output from the pixels 100 in the first column are each output to the comparator circuit 9-1. The comparator circuit 9-1, counter circuit 11-1, and memory 13-1 generate each of digital signals A and digital signals A+B in an A conversion period and an A+B conversion period, respectively. The signal processing circuit in another column also generates each of the digital signals A and digital signals A+B. The horizontal transfer unit 141 outputs each of the digital signals A and digital signals A+B from the memory 13 in each column to the DSP 80 based on the signals of the horizontal scanning unit 142.

FIG. 22B is a diagram representing signals that the DSP 80 according to the present embodiment outputs. Input signals represent signals to be output from the memory 13 in each column to the DSP 80 by the horizontal transfer unit 141. Output signals are signals that the DSP 80 outputs. First, the digital signals A are sequentially output from each memory 13 to the DSP 80 in order from the first column. The DSP 80 outputs signals obtained by adding the digital signals A in multiple columns. In FIG. 22B, the DSP 80 outputs digital signals obtained by adding the digital signals A held at the memory 13 in the first column and third column. Hereinafter, similarly, the DSP 80 outputs digital signals obtained by adding the digital signals A in the second column and fourth column, and in the fifth column and seventh column, respectively.

After the horizontal transfer unit 141 causes the DSP 80 to output the digital signals A from each memory 13, the horizontal transfer unit 141 causes the DSP 80 to output the digital signals A+B from each memory 13. The DSP 80 sequentially outputs the digital signals A+B output from each column.

With regard to the digital signals A and digital signals A+B based on the signals A and signals A+B of the pixels 100 in the second row as well, the DSP 80 may perform the same processing as with the digital signals A and digital signals A+B based on the signals A and signals A+B of the pixels 100 in the first row.

Thus, the amount of the digital signals A output from the imaging apparatus may be reduced than the amount of the digital signals A+B. Thus, the same advantages as with the imaging apparatus according to the second embodiment may be obtained.

Also, with the present embodiment, a mode has been illustrated wherein the DSP 80 adds the digital signals A in multiple columns. Another mode may be made wherein, as illustrated in FIG. 23A, the DSP 80 adds the digital signals A based on the signals A in multiple rows. In FIG. 23A, the horizontal transfer unit 141 causes the DSP 80 to output the digital signals A based on the signals A of the pixels 100 in the first row from the memory 13 in each column. The DSP 80 holds each of the digital signals A. The horizontal transfer unit 141 then causes the DSP 80 to output the digital signals A+B based on the signals A+B of the pixels 100 in the first row from the memory 13 in each column. The DSP 80 outputs the digital signals A+B in each column. Next, the horizontal transfer unit 141 causes the DSP 80 to output the digital signals A based on the signals A of the pixels 100 in the second row from the memory 13 in each column. The DSP 80 outputs signals obtained by adding the digital signals A based on the signals A of the pixels 100 in the second row and the held digital signals A based on the signals A of the pixels 100 in the first row. Next, the horizontal transfer unit 141 causes the DSP 80 to output the digital signals A+B based on the signals A+B of the pixels 100 in the second row from the memory 13 in each column. The DSP 80 outputs the digital signals A+B in each column.

Figure 23B:
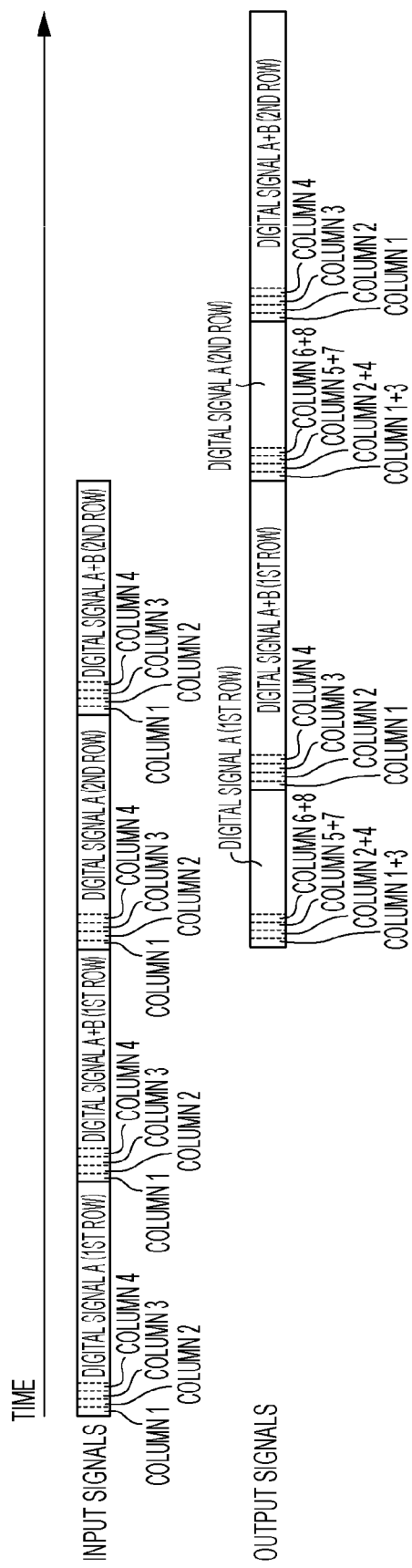
FIG. 23B is a diagram representing operation timing regarding an imaging apparatus according to another example.

Accordingly, with the mode in FIG. 23A as well, the same advantages as with the mode described with FIG. 22B may be obtained. Also, another mode may be employed wherein, as with FIG. 23B, after the digital signals A+B based on the signals A+B of the pixels 100 in the first row are output to the DSP 80, the DSP 80 outputs signals obtained by adding multiple digital signals A.

With the present embodiment, though the mode is employed wherein the imaging apparatus includes the DSP 80, a mode may be made wherein the DSP 80 is an output signal processing unit provided to the outside of the imaging apparatus.

Eleventh Embodiment

Figure 24A:
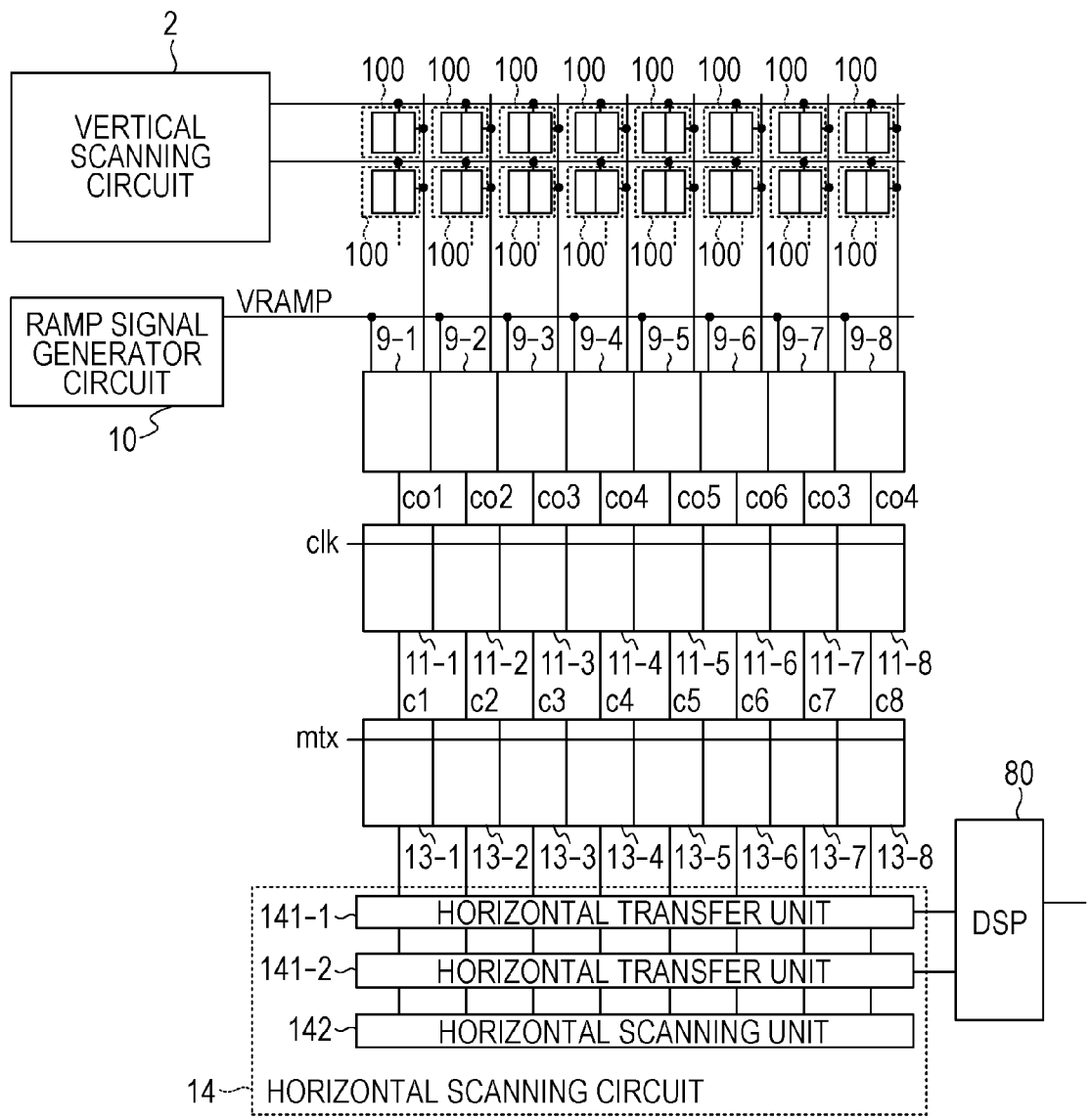
FIG. 24A is a schematic diagram of an imaging apparatus according to another example.

An imaging apparatus according to the present embodiment will be described primarily regarding points different from the tenth embodiment. FIG. 24A is a diagram illustrating an example of the configuration of the imaging apparatus according to the present embodiment. With the present embodiment, a mode is employed wherein there are provided multiple horizontal transfer units 141-1 and 141-2 as the horizontal transfer unit 141, and digital signals are output from the memory 13 in each column to the DSP 80 using multiple channels.

FIG. 24B is a diagram representing, with the imaging apparatus illustrated in FIG. 24A, digital signals to be output to the DSP 80, and digital signals that the DSP 80 outputs.

Input signals 1 illustrated in FIG. 24B represent digital signals to be output to the DSP 80 from the memory 13 in each column by the horizontal transfer unit 141-1. Also, input signals 2 represent digital signals to be output to the DSP 80 from the memory 13 in each column by the horizontal transfer unit 141-2. Output signals represent digital signals that the DSP 80 outputs.

First, the digital signals A based on the signals A of the pixels 100 in the first row are output from the memory 13 in each column to the DSP 80 as the input signals 1 and input signals 2. The DSP 80 outputs signals obtained by adding the digital signals A of the input signals 1 and input signals 2. Next, the digital signals A+B based on the signals A+B of the pixels 100 in the first row are output from the memory 13 in each column to the DSP 80 as input signal 1. The DSP 80 outputs the digital signals A+B. With regard to the digital signals A based on the signals A of the pixels 100 in the second row as well, the DSP 80 outputs signals obtained by adding the digital signals A of the input signals 1 and input signals 2. In FIG. 24B, a mode is illustrated wherein with regard to the digital signals A based on the signals A of the pixels 100 in the second row, after the digital signals A are output from the memory 13 in each column to the DSP 80, the DSP 80 outputs signals obtained by adding multiple digital signals A. Another mode may be made wherein, as with the digital signals A based on the signals A of the pixels 100 in the first row, the DSP 80 outputs signals obtained by adding multiple digital signals A in parallel with the digital signals A being output from the memory 13 in each column to the DSP 80.

With the imaging apparatus according to the present embodiment as well, the same advantages as with the tenth embodiment may be obtained. Also, according to the present embodiment, generally at the same time when the digital signal signals A are output to the DSP 80, the DSP 80 may output signals obtained by adding multiple digital signals A. Accordingly, a period after the digital signals are output from the memory 13 to the DSP 80 until the DSP 80 ends output of the digital signals may be reduced as compared to any mode in FIG. 23A and FIG. 23B according to the tenth embodiment.

With the present embodiment, though the mode has been employed wherein the imaging apparatus includes the DSP 80, a mode may be made wherein the DSP 80 is an output signal processing unit provided to the outside of the imaging apparatus.

Twelfth Embodiment

Figure 25A:
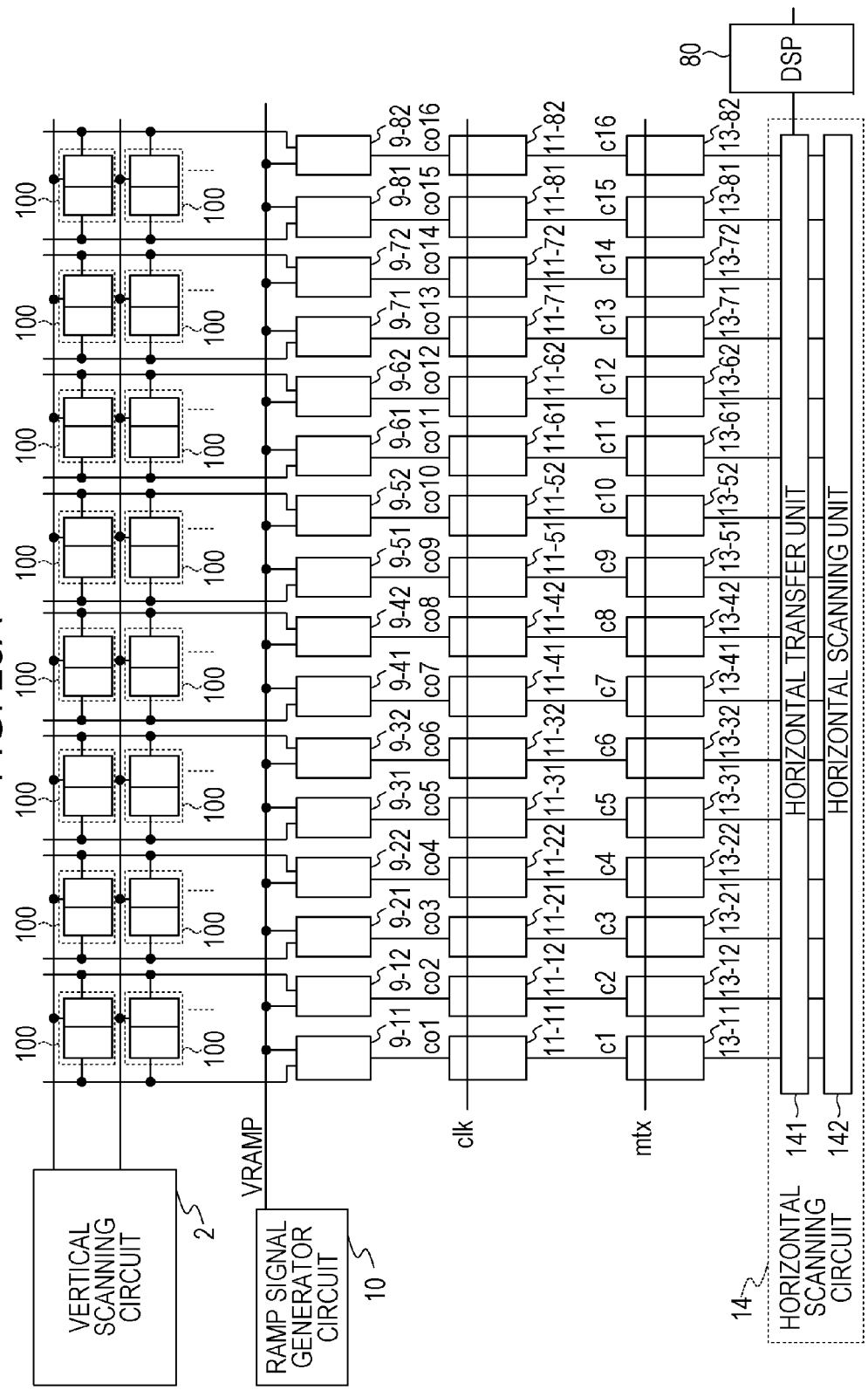
FIG. 25A is a schematic diagram of an imaging apparatus according to another example.

An imaging apparatus according to the present embodiment is illustrated in FIG. 25A. The imaging apparatus according to the present embodiment is, as illustrated in FIG. 20B, a mode wherein the signals A and signals B are output different vertical signal lines 7. With the imaging apparatus illustrated in FIG. 25A, the signals A are output to the comparator circuit 9-11 from the pixels 100 in the first column, and the signals B are output to the comparator circuit 9-12. The comparator circuit 9-11 compares the signals A and ramp signal VRAMP, and the counter circuit 11-11 holds the count signals based on the comparison result signal. The count signals are the digital signals A. Similarly, the comparator circuit 9-12 compares the signals A+B and ramp signal VRAMP, and the counter circuit 11-12 holds the count signals based on the comparison result signal. The count signals are the digital signals B. The memory 13-11 and 13-12 hold the digital signals A and digital signals B held at the counter circuits 11-11 and 11-12, respectively. With regard other columns as well, the memory 13 in odd columns holds the digital signals A, and the memory 13 in even columns holds the digital signals B.

Figure 25B:
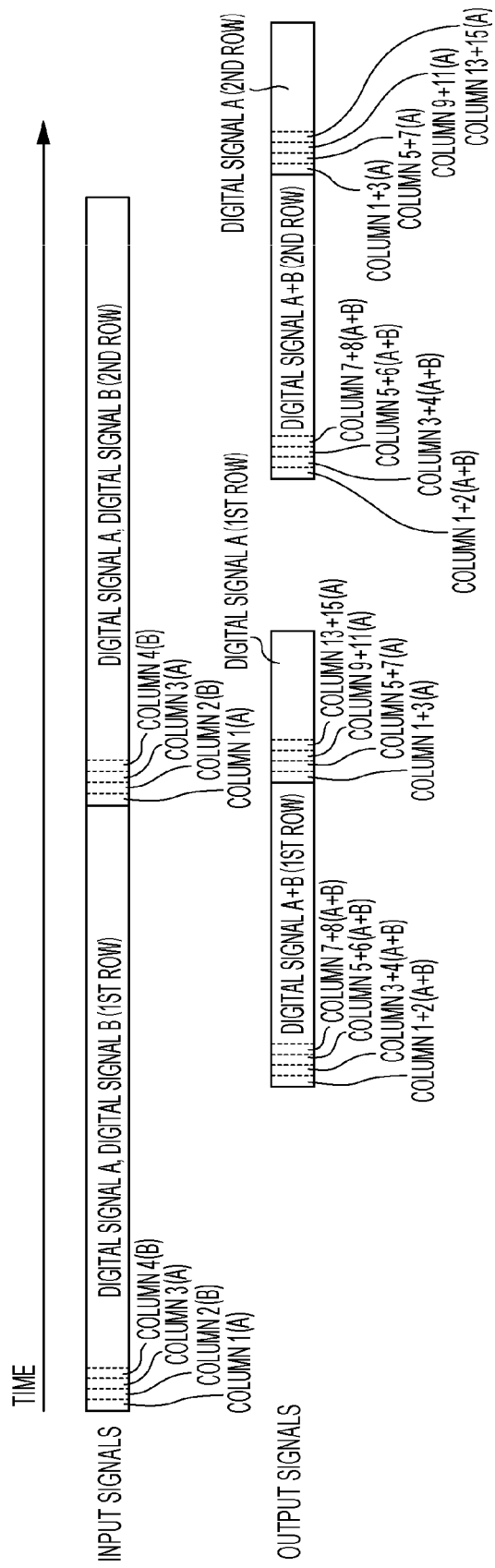
FIG. 25B is a diagram representing operation timing regarding the imaging apparatus according to another example.

FIG. 25B is a diagram representing, with the imaging apparatus illustrated in FIG. 25A, digital signals to be output to the DSP 80, and digital signals that the DSP 80 outputs.

First, the horizontal transfer unit 141 outputs the digital signals A and digital signals B from the memory 13 in each column to the DSP 80. The DSP 80 outputs digital signals A+B obtained by adding the digital signals A and digital signals B based on the same pixels 100.

After the DSP 80 outputs the digital signals A and digital signals B of the pixels 100 in each column, the DSP 80 outputs signals obtained by adding the digital signals A of the memory 13 in multiple columns.

Thus, the amount of the digital signals A to be output from the imaging apparatus may be reduced as compared to the amount of the digital signals A+B. Thus, the same advantages as with the imaging apparatus according to the second embodiment may be obtained.

Figure 26B:
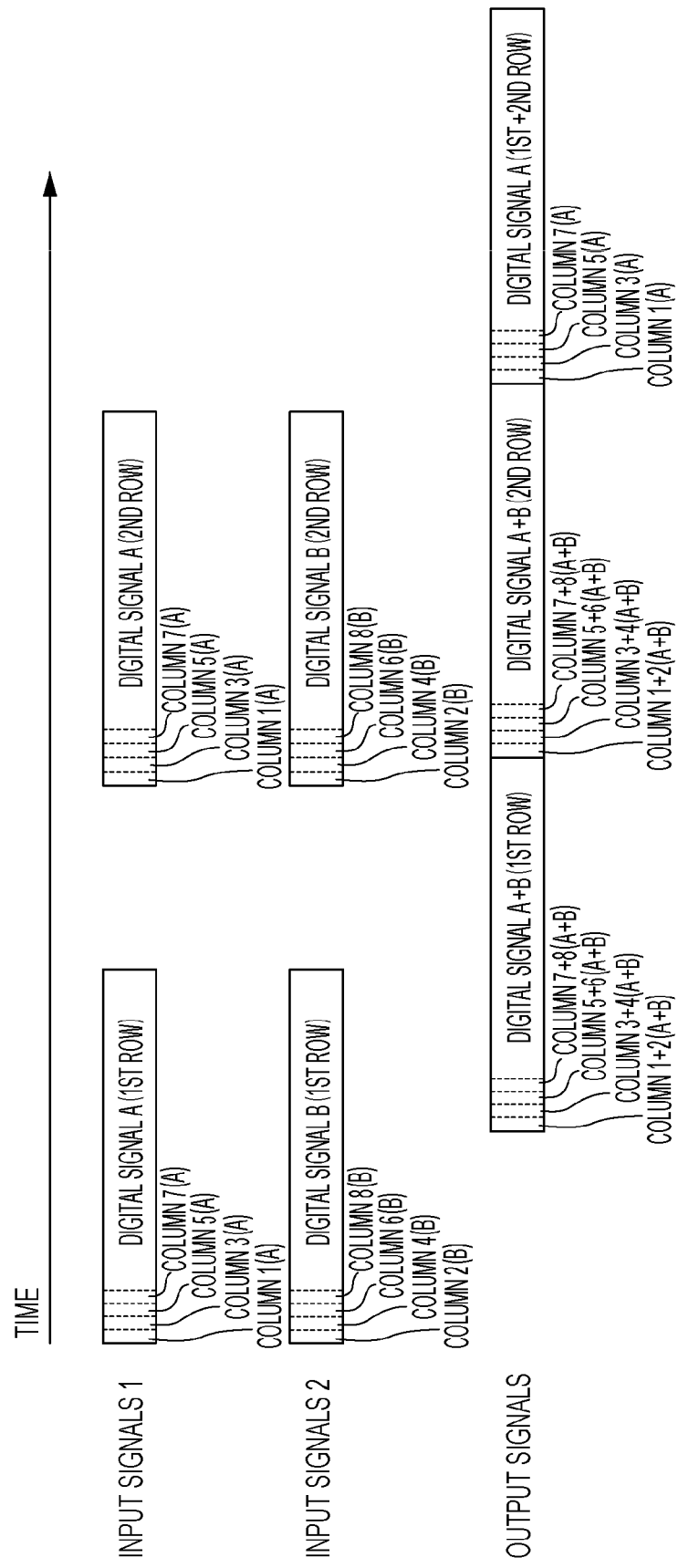
FIG. 26B is a diagram representing operation timing regarding an imaging apparatus according to another example.

Another mode may be made wherein, with the imaging apparatus illustrated in FIG. 25A, the multiple horizontal transfer units 141 are provided as with FIG. 24A. Even in this mode, as illustrated in FIG. 26A, the mode may be changed wherein after the DSP 80 outputs the digital signals A+B, the DSP 80 outputs signals obtained by adding multiple digital signals A. Also, the mode may be changed as with FIG. 26B. Specifically, the DSP 80 outputs the digital signals A+B based on the signals A and signals B of the pixels 100 in the first and second rows, and then outputs signals obtained by adding the digital signals A based on the signals A of the pixels 100 in the first row and the digital signals A based on the signals A of the pixels 100 in the second row. Even with this mode, the same advantages as with the imaging apparatus according to the second embodiment may be obtained.

With the present embodiment, though a mode has been made wherein the imaging apparatus includes the DSP 80, a mode may be made wherein the DSP 80 is an output signal processing unit provided to the outside of the imaging apparatus.

Thirteenth Embodiment

Figure 27A:
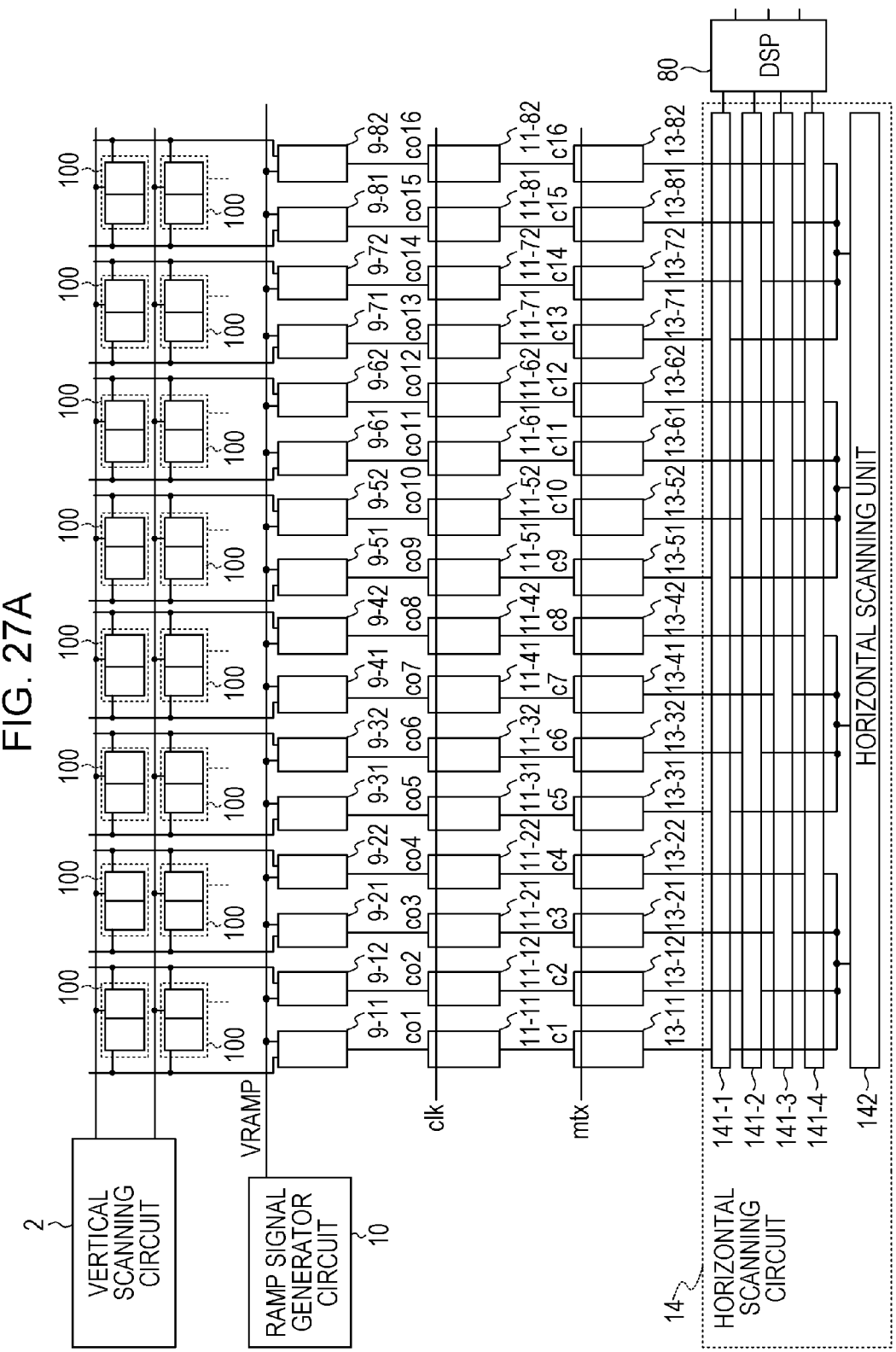
FIG. 27A is a schematic diagram of an imaging apparatus according to another example.

An imaging apparatus according to the present embodiment will be described primarily with regard to points different from the twelfth embodiment. FIG. 27A is a diagram illustrating an example of the configuration of the imaging apparatus according to the present embodiment. The imaging apparatus according to the present embodiment has a configuration wherein the horizontal transfer unit 141 is divided into four of horizontal transfer units 141-1, 141-2, 141-3, and 141-4. The other configuration may be the same as with the imaging apparatus illustrated in FIG. 25A. The imaging apparatus according to the present embodiment has the horizontal transfer units 141-1, 141-2, 141-3, and 141-4, and accordingly, the digital signals may be output to the DSP 80 from memory 13-11, 13-12, 13-21, and 13-22 at the same time. That is to say, the digital signals may be output from the memory 13 to the DSP 80 using the four channels. On the other hand, the DSP 80 according to the present embodiment employs output with the three channels.

Figure 27B:
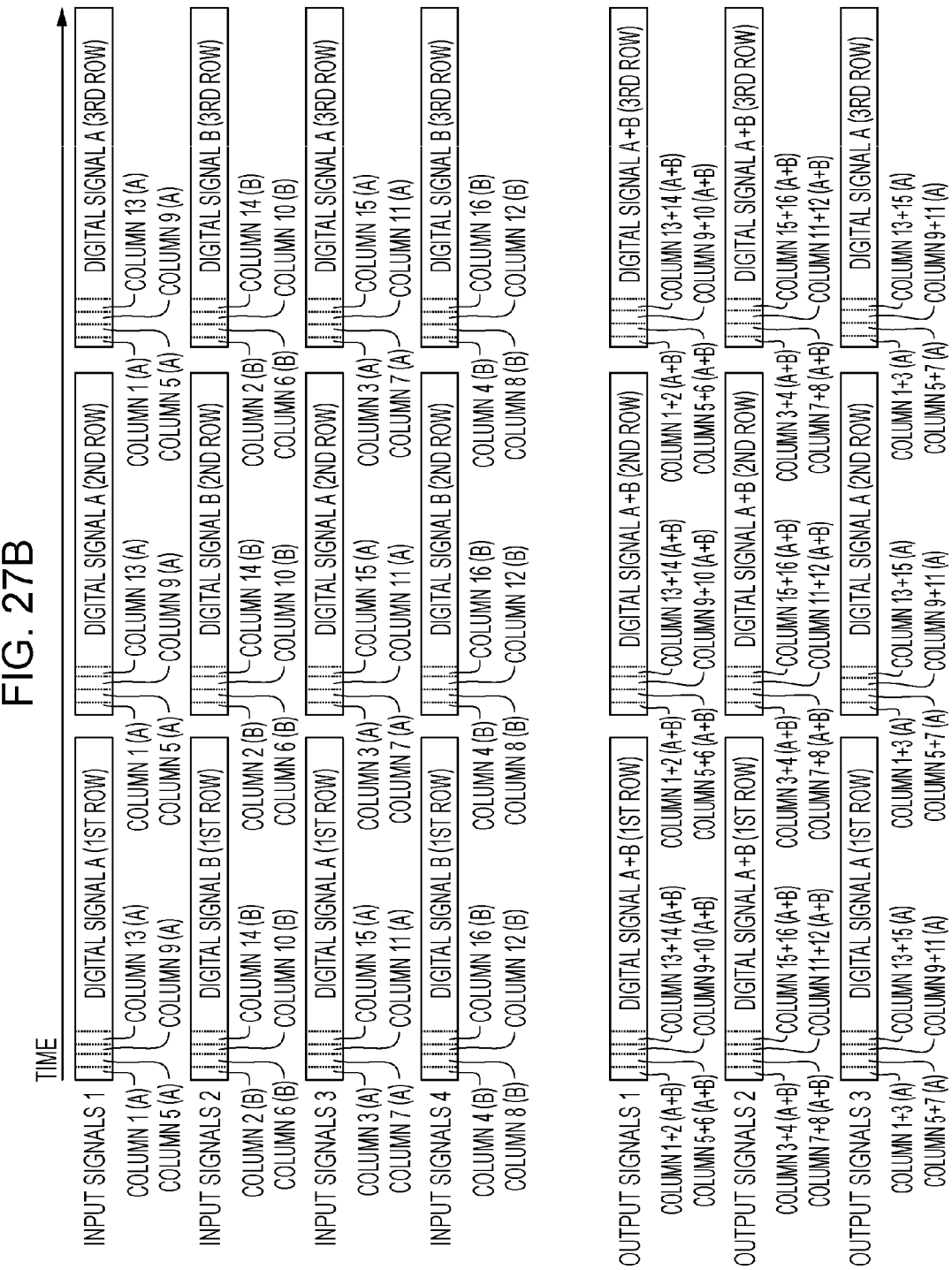
FIG. 27B is a diagram representing operation timing regarding the imaging apparatus according to another example.

Next, an example of operation of the imaging apparatus illustrated in FIG. 27A will be described with reference to FIG. 27B. Input signals 1 to 4 illustrated in FIG. 27B indicate digital signals that the horizontal transfer units 141-1 to 141-4 output from the memory 13 to the DSP 80. Also, output signals 1 to 3 illustrated in FIG. 27B indicate digital signals that the DSP 80 outputs.

First, the digital signals A based on the signals A of the pixels 100 in the first row are output to the DSP 80 as the input signals 1 and input signals 3. Also, the digital signals A+B based on the signals B of the pixels 100 in the first row are output to the DSP 80 as the input signals 2 and input signals 4. The DSP 80 outputs digital signals A+B obtained by adding the digital signals A and digital signals B based on the signals A and signals B of the same pixels 100 in the first row as the output signals 1 and output signals 2. Also, the DSP 80 outputs signals obtained by adding the digital signals A based on the signals A of the pixels 100 as the output signals 3. Hereinafter, with regard to the signals A and signals B of the pixels 100 in the second and third rows as well, the same processing as with the signals A and signals B of the pixels 100 in the first row may be performed.

With the imaging apparatus according to the present embodiment, the amount of the digital signals A to be output from the DSP 80 is smaller as compared to the mode wherein the digital signals A of the memory 13 in all of the columns are output. Accordingly, the same advantages as with the imaging apparatus according to the twelfth embodiment may be obtained. Also, the digital signals A are output from the memory 13 to the DSP 80 using the four channels. Thus, generally at the same time as the digital signals A are output from the memory 13 to the DSP 80, the DSP 80 may output signals obtained by adding the digital signals A in multiple columns. Accordingly, as compared to the mode wherein the digital signals A are output from the memory 13 to the DSP 80 using one channel, the imaging apparatus according to the present embodiment may reduce a period after the digital signals A are output from the memory 13 to the DSP 80, until output of signals obtained by adding multiple digital signals A is ended. Also, the DSP 80 adds and outputs digital signals to be input at the same time, and accordingly, memory to temporarily hold digital signals within the DSP 80 may be reduced as compared to the mode of the twelfth embodiment.

With the present embodiment, though a mode has been made wherein the imaging apparatus includes the DSP 80, a mode may be made wherein the DSP 80 is an output signal processing unit provided to the outside of the imaging apparatus.

Note that, with the eighth to thirteenth embodiments, a mode has been illustrated wherein the signals A, signals B, and signals A+B that the pixels 100 output are output to the comparator circuit 9. The embodiments are not restricted to this mode, and a mode may be made wherein the operational amplifier 8 is provided to an electrical path between the pixels 100 and the comparator circuits 9 as with the first embodiment.

Fourteenth Embodiment

Figure 28A:
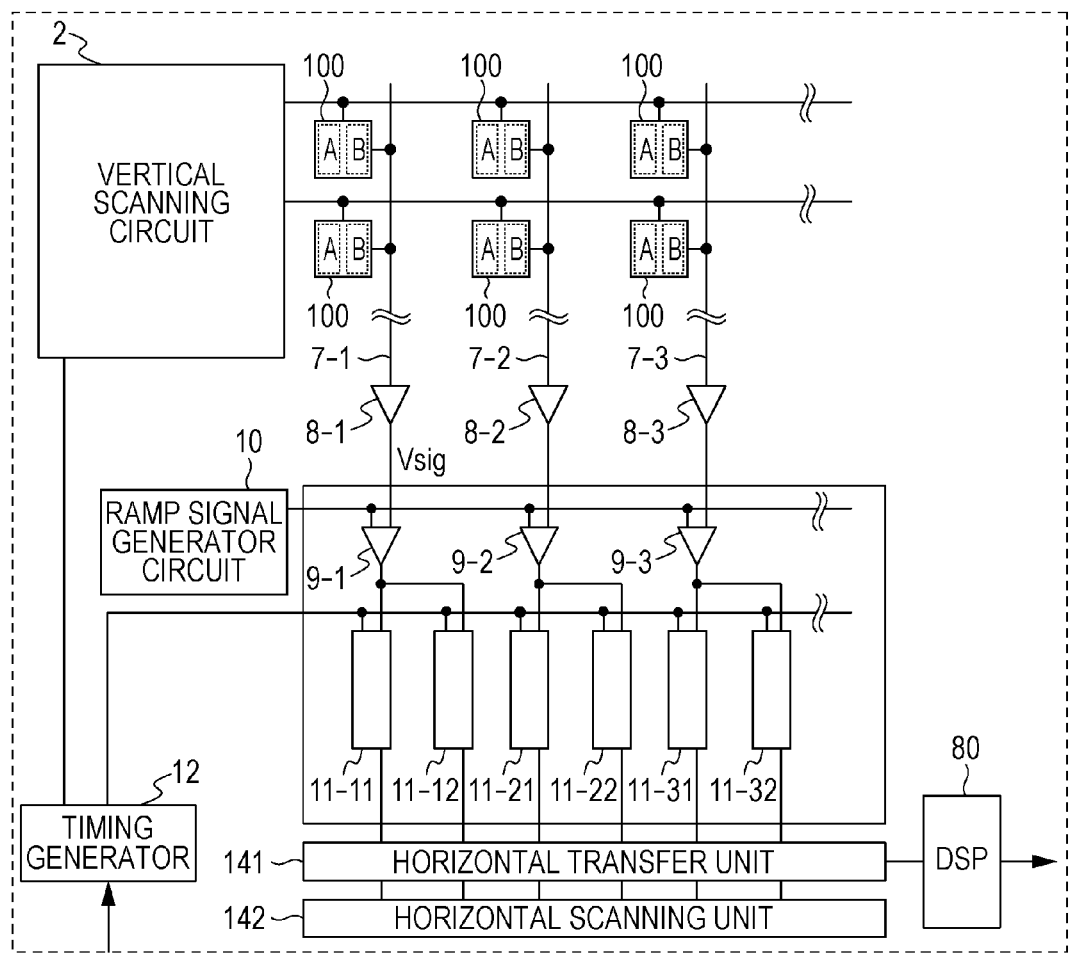
FIG. 28A is a schematic diagram of an imaging apparatus according to another example.

An imaging apparatus according to the present embodiment will be described primarily with regard to points different from the tenth embodiment. FIG. 28A is an example of the configuration of the imaging apparatus according to the present embodiment. The signals A and signals A+B that the pixels 100 output are output to the operational amplifier 8. The operational amplifier 8 amplifies the signals A and signals A+B, and outputs these to the comparator circuit 9.

With the present embodiment, the two counter circuits 11 are provided to each column of the pixels 100. the counter circuits 11-11 and 11-12 are provided corresponding to columns provided to the pixels 100 in the first column. The counter circuit 11-11 is a counter circuit to generate digital signals obtained by adding the digital signals A of the pixels 100 in multiple rows. The counter circuit 11-12 is a counter circuit to generate the digital signals A+B. With the present embodiment, a mode is employed wherein the horizontal transfer unit 141 outputs the digital signals from the counter circuit 11 to the DSP 80.

Description will be made primarily with regard to the operations of the counter circuits 11-11 and 11-12 of the imaging apparatus illustrated in FIG. 28A, with reference to FIG. 28B. With the count operations of the counter circuits 11-11 and 11-12, whether to increase or decrease the count value is controlled by the TG 12.

With N conversion of the pixels 100 in the first row, the counter circuits 11-11 and 11-12 perform count operation so as to decrease the count value from the initial value. With A conversion, the counter circuit 11-11 performs count operation so as to increase the count value held at the N conversion. The digital signals A that the counter circuit 11-11 holds in this A conversion are digital signals based on signals obtained by subtracting the signals N from the signals A.

With A+B conversion, the counter circuit 11-12 performs count operation so as to increase the count value held at the N conversion. The digital signals A+B that the counter circuit 11-12 holds at this A+B conversion are digital signals based on signals obtained by subtracting the signals N from the signals A+B. The horizontal transfer unit 141 causes the DSP 80 to output the digital signals A+B from the counter circuit 11-12. The TG 12 then resets the count value of the counter circuit 11-12.

Next, N conversion of the pixels 100 in the second row is performed. The counter circuit 11-11 perform count operation so as to decrease the count value of the digital signals A based on the signals A of the pixel 100 in the previous first row. The counter circuit 11-12 performs count operation so as to decrease the count value that has been reset.

With A conversion of the pixels 100 in the second row, the counter circuit 11-11 performs count operation so as to increase the count value held at the N conversion of the pixels 100 in the second row. The digital signals A that the counter circuit 11-11 held at this A conversion are digital signals based on signals obtained by adding signals obtained by subtracting the signals N from the signals A of each of the pixels 100 in the first row and the pixels 100 in the second row.

Next, with A+B conversion of the pixels 100 in the second row, the counter circuit 11-12 performs count operation so as to increase the count value held at the N conversion of the pixels 100 in the second row. The digital signals A+B held by the counter circuit 11-12 in this A+B conversion are digital signals based on signals obtained by subtracting the signals N from the signals A+B of the pixels 100 in the second row.

Next, the horizontal transfer unit 141 causes the DSP 80 to output the digital signals from each of the counter circuits 11-11 and 11-12. With the imaging apparatus according to the present embodiment, a mode is employed wherein the counter circuit 11 generates digital signals based on signals obtained by adding the signals A of the pixels 100 in multiple rows. Thus, as compared to a mode where the counter circuit 11 generates the digitals signals A of the pixels 100 in each row, a period for outputting the digital signals A from the counter circuit 11 to the DSP 80 may be reduced. Also, as compared to a mode wherein the counter circuit 11 generates the digital signals A of the pixels 100 in each row, the amount of the digital signals A to be output to the DSP 80 is reduced. Thus, load of the signal processing of the DSP 80 may be reduced.

Fifteenth Embodiment

An imaging apparatus according to the present embodiment will be described with reference to the drawings.

Figure 29A:
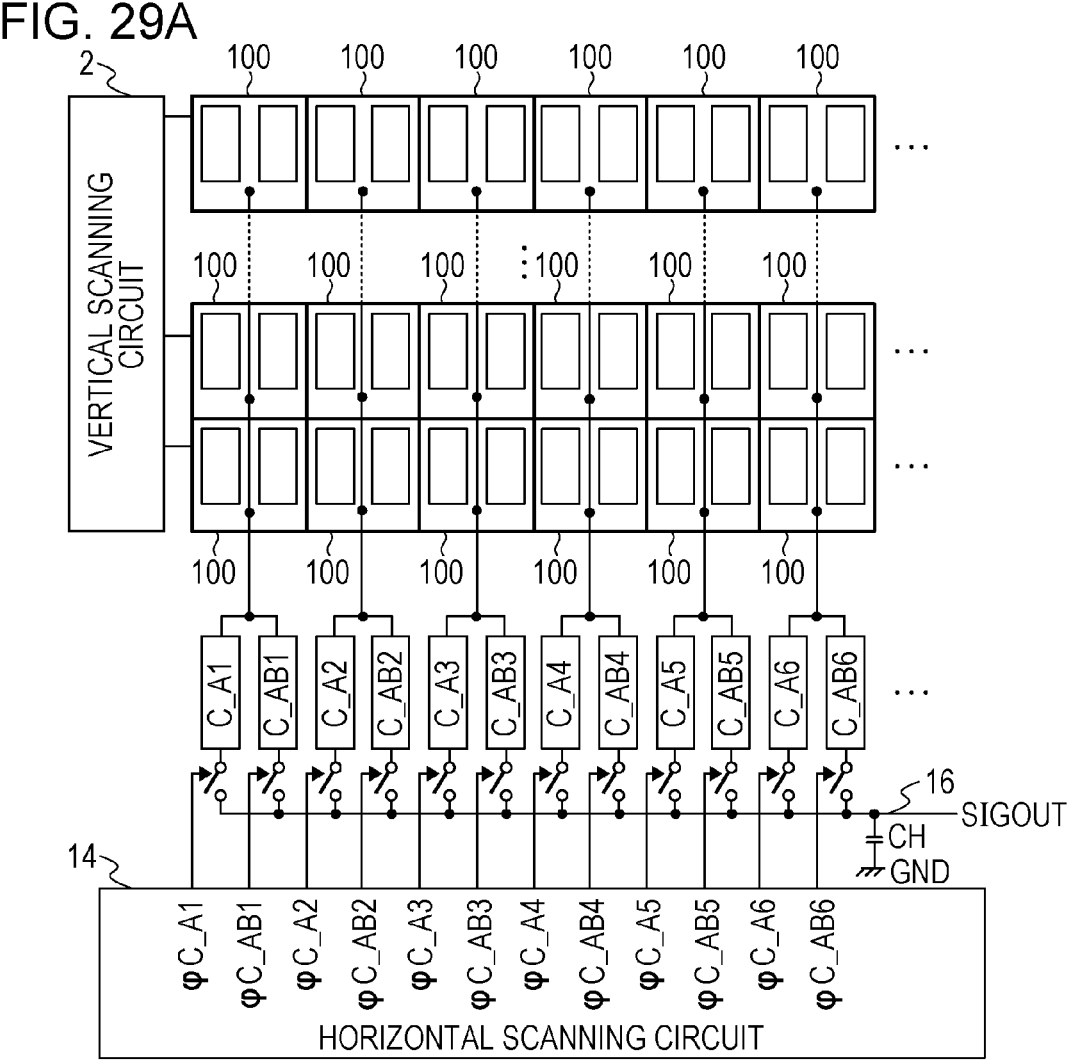
FIG. 29A is a schematic diagram of an imaging apparatus according to another example.

FIG. 29A is a diagram illustrating an example of the configuration of the imaging apparatus according to the present embodiment. The imaging apparatus according to the present embodiment has a mode wherein, as with the imaging apparatus according to the fourth embodiment, the signal processing circuit in each column holds the signals A and signals A+B which are analog signals. As illustrated in FIG. 29A, memory C_A holding the signals A, and memory C_AB holding the signals A+B are provided to each column. When the horizontal scanning circuit 14 changes signals φC_A and φC_AB to H level, the signals A and signals A+B are output from the memory C_A and C_AB to the signal line S 16 as signals SIGOUT. Each memory is configured of a sample-hold circuit made up of a capacitor element and a switch, for example. One of the nodes of the capacitor CH is electrically connected to the signal line S 16, and ground potential GND is given to the other node of the capacitor CH.

Figure 29B:
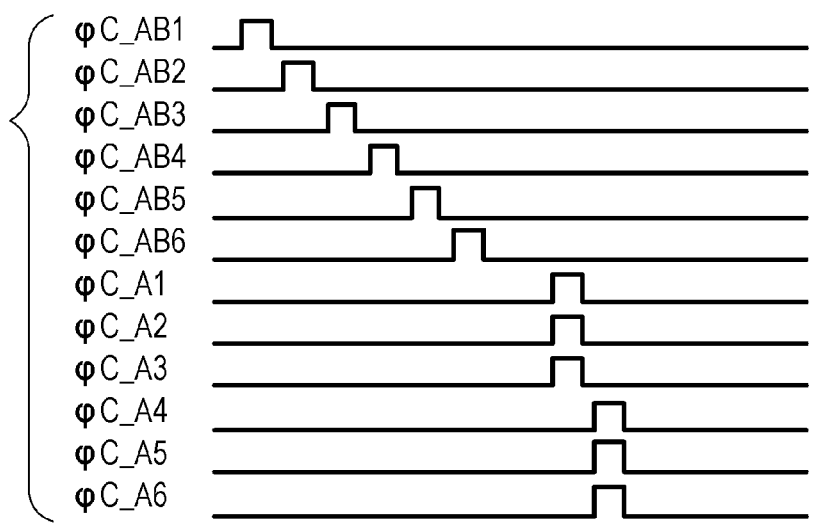
FIG. 29B is a diagram representing operation timing regarding the imaging apparatus according to another example.

FIG. 29B is a diagram illustrating an example of the operation of the imaging apparatus illustrated in FIG. 29A. First, the horizontal scanning circuit 14 sequentially changes signals φC_AB1 TO φC_AB6 TO H level, and sequentially outputs the signals A+B from the memory C_AB in each column.

The horizontal scanning circuit 14 then changes signals φC_A1, φC_A2, and φC_A3 TO H level at the same time. Thus, the signals A held at each of the memory C_A1, C_A2, and C_A3 are simultaneously output to the signal line S 16. Let us say that the capacity values of the capacitor elements of the memory C_A1, C_A2, and C_A3 are C1, C2, and C3, respectively.

The signal SIGOUT becomes a signal of a value obtained by multiplying summation of the signals of the memory C_A1, C_A2, and C_A3 by (C1+C2+C3)/(C1+C2+C3+CH). That is to say, signals based on signals obtained by adding the signals A held at each of the memory C_A1, C_A2, and C_A3 are output.

Next, the horizontal scanning circuit 14 changes signals φC_A4, φC_A5, and φC_A6 TO H level at the same time. Thus, the signals A held at each of the memory C_A4, C_A5, and C_A6 are simultaneously output. Thus, the signals SIGOUT to be output are signals obtained by adding the signals A held at each of the memory C_A4, C_A5, and C_A6.

With the present embodiment, the signals A held at multiple memory C_A are added and output. Thus, as compared to a mode wherein each of the signals A from the memory C_A in each column are output as the signal SIGOUT, a period for outputting the signals A from the memory C_A may be reduced. Also, as compared to a mode wherein each of the signals A from the memory C_A in each column are output as the signal SIGOUT, the amount of the signals A is reduced, and accordingly, load of an AD conversion unit provided to the outside of the imaging apparatus may be reduced.

With the present embodiment, though a mode has been described wherein the signals A of the memory C_A of three columns are added, any mode may be made as long as this is a mode wherein the signals A of the memory C_A in multiple columns are added.

Sixteenth Embodiment

Figure 30A:
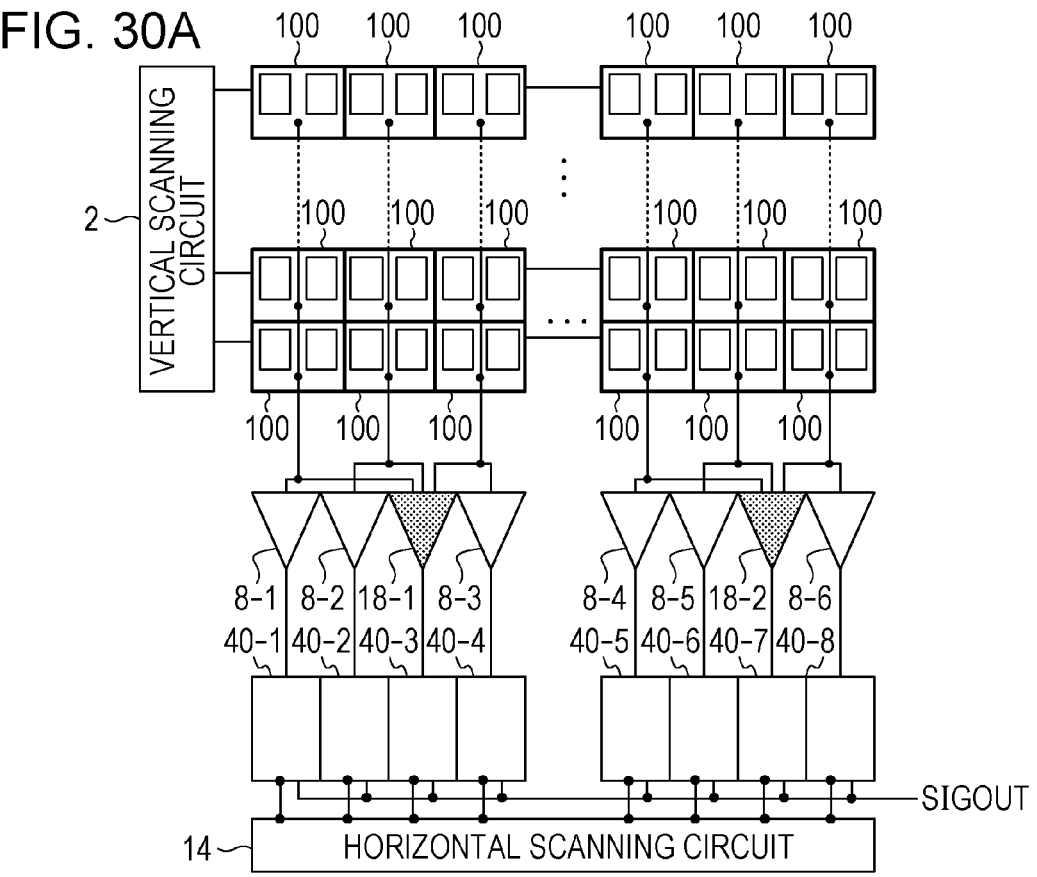
FIG. 30A is a schematic diagram of an imaging apparatus according to another example.

An imaging apparatus according to the present embodiment will be described with reference to the drawings. FIG. 30A is a diagram illustrating an example of the configuration of the imaging apparatus according to the present embodiment. In FIG. 30A, a member having the same function as with FIG. 29A is also denoted with the same reference numeral as the reference numeral denoted in FIG. 29A. The imaging apparatus in FIG. 30A has a mode wherein operational amplifiers 18-1 and 18-2 amplify signals obtained by adding the signals A of the pixels 100 in multiple columns to output these to AD conversion units 40-3 and 40-7, respectively. The configuration of the AD conversion unit 40 may have any mode illustrated in FIGS. 5 and 8.

Each of operational amplifiers 8-1, 8-2, 8-3, 8-4, 8-5, and 8-6 outputs signals obtained by amplifying the signals A+B of the pixels 100 in each column to the AD conversion unit 40.

Figure 30B:
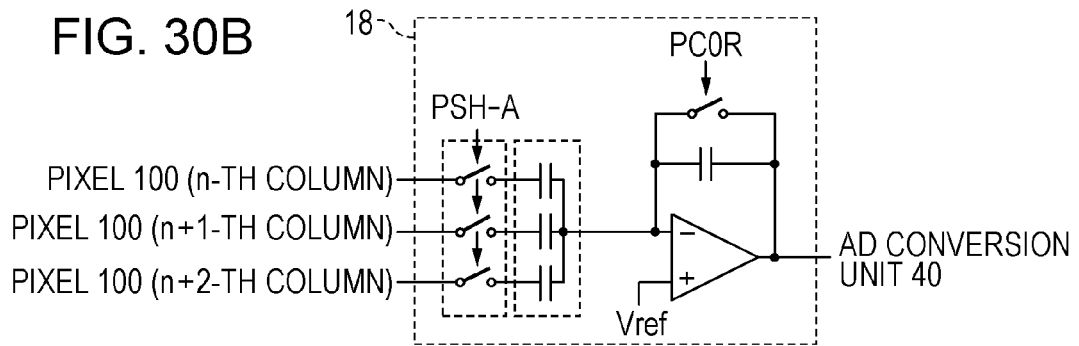
FIG. 30B is a schematic diagram of an amplifying circuit according to another example.

FIG. 30B is a diagram illustrating details regarding an example of the configuration of the operational amplifier 18 illustrated in FIG. 30A. This is a configuration wherein each of the signals A of the pixels 100 in the n'th column, n+1'th column, and n+2'th column is output to a reverse input node of a differential amplifier via a switch which is electrically conducted by changing a signal PSH-A to H level, and a capacitor element. Signals based on signals obtained by adding the signals A of the pixels 100 in three columns are output from the differential amplifier to the AD conversion unit 40.

Figure 30C:
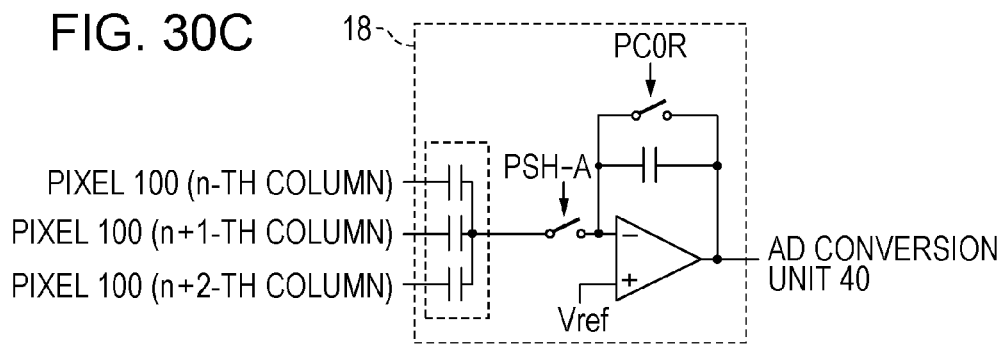
FIG. 30C is a schematic diagram of an amplifying circuit according to another example.

FIG. 30C is a diagram illustrating details regarding another example of the configuration of the operational amplifier 18. This is a configuration wherein each of the signals A of the pixels 100 in the n'th column, n+1'th column, and n+2'th column is output to a reverse input node of a differential amplifier via a capacitor element, and a switch which is electrically conducted by changing a signal PSH-A to H level. Even with the configuration of the operational amplifier 18 illustrated in FIG. 30C, signals based on signals obtained by adding the signals A of the pixels 100 in three columns are output from the differential amplifier to the AD conversion unit 40. With any operational amplifier 18 in FIGS. 30B and 30C, when a signal PC0R is changed to H level, charge of a feedback capacitor is reset. This is referred to as reset of the operational amplifier 18.

FIG. 31 is a diagram primarily illustrating operation of the operational amplifier 18 illustrated in FIG. 30B or 30C. First, the vertical scanning circuit 2 changes the signal φSEL to select the pixels 100 in the first row to H level. Thereafter, in FIG. 30A, the TG 12 not illustrated changes the signal PSH-A to H level. The vertical scanning circuit 2 changes the signal φR of the pixels 100 in the first row to L level. The TG 12 then changes the signal PC0R to L level to release reset of the operational amplifier 18. At this time, the AD conversion unit 40 converts the signals output from the operational amplifier 18 into the digital signals N as N conversion.

Thereafter, the vertical scanning circuit 2 changes the signal φT1 to H level. Thus, the signals A are output from the pixels 100. The signal PSH-A is in H level, and accordingly, the operational amplifier 18 amplifies signals obtained by adding the signals A of the pixels 100 in multiple columns to output to the AD conversion unit 40. The TG 12 then changes the signal PSH-A to L level.

The vertical scanning circuit 2 changes the signals φT1 and pT2 to H level. Thus, the signals A+B are output from each pixel 100 in the first row to the operational amplifier 8.

Next, the AD conversion unit 40 to which the signals have been output from the operational amplifier 18 converts the signals output from the operational amplifier 18 into digital signals A as A conversion.

The AD conversion unit 40 to which the signals have been output from the operational amplifier 8 then converts the signals output from the operational amplifier 8 into digital signals A+B as A+B conversion.

Thereafter, the horizontal scanning circuit 14 sequentially outputs the generated digital signals from the AD conversion unit 40 in each column as SIGOUT.

With the imaging apparatus according to the present embodiment, signals based on signals obtained by adding the signals A in multiple columns are output to the AD conversion unit 40. Thus, as compared to a mode wherein the AD conversion unit 40 converts signals based on the signals A in each column to digital signals, the AD conversion period may be reduced. Also, as compared to the mode wherein the AD conversion unit 40 converts signals based on the signals A in each column to digital signals, the amount of the digital signals A decreases, and accordingly, load of the signal processing of the DSP 80 unshown in FIG. 30A may be reduced.

One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

With the present embodiment, a mode has been described wherein the operational amplifier 18 outputs signals based signals obtained by adding the signals A of the pixels 100 in three columns to the AD conversion unit 40. The present embodiment is not restricted to this mode, and any mode may be employed as long as the operational amplifier 18 outputs signals based signals obtained by adding the signals A of the pixels 100 in multiple columns.

Also, with the present embodiment, though a mode has been illustrated wherein signals that the operational amplifiers 8 and 18 output are converted into digital signals at the AD conversion unit 40 in each column, the present embodiment is not restricted to this mode. For example, as illustrated in FIG. 13, a mode may be made wherein signals that the operational amplifiers 8 and 18 output from each column are output as analog signals. In such a mode, as compared to a mode wherein signals obtained by amplifying the signals A are output from each column, the number of columns to output signals obtained by amplifying the signals A decreases. Thus, as compared to a mode wherein signals obtained by amplifying the signals A are output from each column within one frame period, an output period for outputting signals obtained by amplifying the signals A may be reduced.

The imaging apparatus according to each embodiment that has been described so far may be implemented by being combined with the other embodiment as appropriate.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-045653 filed Mar. 1, 2012, and No. 2013-001084 filed Jan. 8, 2013, which are hereby incorporated by reference herein in their entirety.

What is claimed is:

1. An imaging apparatus comprising:
a micro lens array including a plurality of micro lenses;
a plurality of pixels arrayed in a matrix shape, each including m (m is an integer larger than 1) photoelectric conversion units each configured to generate signal charge, and to output a signal based on the signal charge, the m photoelectric conversion units being arranged in correspondence with one micro lense of the plurality of micro lenses;
wherein each pixel of at least a part of the plurality of pixels outputs a first signal based on n (n is an integer less than m) photoelectric conversion units among the m photoelectric conversion units within one frame period;
wherein each of the plurality of pixels outputs a second signal based on the signal charge of the m photoelectric conversion units which each of the plurality of pixels includes, within the one frame period; and
wherein the number of signals based on the first signals which the imaging apparatus outputs is less than the number of signals based on the second signals which the imaging apparatus outputs.

2. The imaging apparatus according to claim 1, further comprising:
a plurality of signal holding units; and
a plurality of amplifier circuits;
wherein one of the amplifier circuits outputs signals obtained by amplifying signals obtained by adding the first signals of the plurality of pixels to one of the signal holding units, and outputs the signal based on the second signal amplified by the amplifier circuit other than the one amplifier circuit to the signal holding unit other than the one signal holding unit.

3. The imaging apparatus according to claim 1, further comprising:
a plurality of signal holding units, each holding the signal based on the first signal;
wherein the plurality of signal holding units which hold the signal based on the first signal simultaneously output the signal, and the imaging apparatus outputs a signal obtained by adding the signals simultaneously output.

4. The imaging apparatus according to claim 1, further comprising:
a plurality of signal holding units which hold the signal based on the first signal and the signal based on the second signal; and
a horizontal scanning circuit;
wherein the horizontal scanning circuit outputs the signals based on the second signals from the plurality of signal holding units, and further outputs the signals based on the first signals from a part of the signal holding units of the plurality of signal holding units.

5. The imaging apparatus according to claim 1, with the first signals and the second signals which the plurality of pixels output being analog signals, further comprising:
a plurality of analog-to-digital conversion circuits configured to output the signals by converting the analog signals into digital signals;
wherein each of the plurality of analog-to-digital conversion circuits converts the first signal into a digital signal which is the signal based on the first signal, and converts the second signal into a digital signal which is the signal based on the second signal.

6. The imaging apparatus according to claim 5, further comprising:
a signal processing unit configured to process the digital signals generated by the plurality of analog-to-digital conversion circuits;
wherein the signal processing unit outputs a signal obtained by adding a digital signal based on the first signal of the pixels, and a digital signal based on the first signal of another pixel of the pixels;
and wherein the signal processing unit outputs a digital signal based on the second signal of the pixels, and a digital signal based on the second signal of the other pixel of the pixels.

7. The imaging apparatus according to claim 5, wherein the analog-to-digital conversion circuits include a comparator circuit configured to output a comparison result signal which indicates a result by comparing a reference signal and the analog signal, and a counter circuit configured to count a clock signal;

and wherein the plurality of pixels sequentially output the first signal to the same analog-to-digital conversion circuit;

and wherein the counter circuit generates a signal obtained by adding a signal counted from a clock signal based on a comparison result signal which indicates a comparison result between the first signal of one pixel of the plurality of pixels and the reference signal, and a signal counted from a clock signal based on a comparison result signal which indicates a comparison result between the first signal of another pixel other than the one pixel of the plurality of pixels and the reference signal.

8. The imaging apparatus according to claim 5, further comprising:

a counter control unit;

and wherein each of the plurality of analog-to-digital conversion circuits includes a comparator circuit configured to output a comparison result signal which indicates a result of comparison between the reference signal and the analog signal, and a counter circuit configured to count clock signals;

and wherein each of a plurality of the comparator circuits outputs the comparison result signal which indicates a result of comparison between the reference signal and the first signals of the pixels which mutually differ;

and wherein the counter control unit controls counting of the clock signal of the counter circuit based on the comparison result signal of the plurality of comparator circuits, and accordingly, the analog-to-digital conversion circuit generates a digital signal based on a signal obtained by adding the first signals of the pixels which mutually differ.

9. The imaging apparatus according to claim 8, wherein the plurality of pixels are provided in a matrix shape;

and wherein each of the plurality of analog-to-digital conversion circuits is provided corresponding to a column to which the plurality of pixels are provided;

and wherein the counter control unit controls counting of the clock signal of the counter circuit based on the comparison result signal of the plurality of comparator circuits, and the analog-to-digital conversion circuit generates a digital signal based on a signal obtained by adding the first signals of the pixels of which the columns mutually differ.

10. The imaging apparatus according to claim 1, further comprising:

a vertical scanning circuit;

wherein the plurality of pixels are arranged in rows and columns, and wherein the vertical scanning circuit scans the rows to output the first signal from each of pixels arranged in only a part of rows and the second signal from each of the pixels arranged in the rows.

11. The imaging apparatus according to claim 4, further comprising:

a vertical scanning circuit;

wherein the plurality of pixels are arranged in rows and columns, and wherein the vertical scanning circuit scans the rows to output the first signal from each of pixels arranged in only a part of rows and the second signal from each of the pixels arranged in the rows.

12. An imaging system comprising:

the imaging apparatus according to claim 1;

an optical system configured to condense light into the imaging apparatus; and an output signal processing unit;

wherein the signals based on the first signals based on the signal charge of the n photoelectric conversion units which a first pixel which is a part of the pixels of the plurality of pixels includes are output from the imaging apparatus to the output signal processing unit;

and wherein the signal based on the second signal is output from the imaging apparatus to the output signal processing unit;

and wherein the output signal processing unit obtains a difference signal which is difference between the signal based on the first signal of the first pixel and the signal based on the second signal of the first pixel, and performs focal-point detection using the difference signal and the signal based on the first signal of the first pixel;

and wherein the output signal processing unit further forms an image using the signals based on the second signals of the plurality of pixels.

13. An imaging system comprising:

an imaging apparatus; and a focal-point detection signal processing unit;

wherein the imaging apparatus includes a micro lens array including a plurality of micro lenses;

a plurality of pixels arrayed in a matrix shape;

wherein each of the plurality of pixels includes m (m is an integer larger than 1) photoelectric conversion units each configured to generate signal charge, the m photoelectric conversion units being arranged in correspondence with one micro lense of the plurality of micro lenses;

wherein each pixel of at least a part of the plurality of pixels outputs a first signal based on n (n is an integer less than m) photoelectric conversion units among the m photoelectric conversion units within one frame period;

wherein each of the plurality of pixels outputs a second signal based on the signal charge of the m photoelectric conversion units which each of the plurality of pixels includes, within the one frame period;

wherein the imaging apparatus outputs each of a signal based on the second signals of the plurality of pixels and a signal based on the first signal, to the focal-point detection signal processing unit; and wherein the focal-point detection signal processing unit outputs, of the signals based on the first signals of the plurality of pixels output to the focal-point detection signal processing unit, the signal based on the first signals of a part of the pixels of the plurality of pixels, and does not output the signal based on the first signals of the other pixels of the plurality of pixels.

14. A driving method for an imaging apparatus including a micro lens array including a plurality of micro lenses;

a plurality of pixels arrayed in a matrix shape, each of which including m (m is an integer larger than 1) photoelectric conversion units each configured to generate signal charge, the m photoelectric conversion units being arranged in correspondence with one micro lense of the plurality of micro lenses, the driving method comprising:

outputting, with at least a part of the pixels of the plurality of pixels, a first signal based on n (n is an integer less than m) photoelectric conversion units among the m photoelectric conversion units within one frame period;

outputting, with each of the plurality of pixels, a second signal based on the signal charge of the m photoelectric conversion units which each of the plurality of pixels includes, within the one frame period; and outputting, with the imaging apparatus, the signals based on the first signals and the signals based on the second signals by reducing the number of signals based on the first signals as compared to the number of signals based on the second signals.

15. A driving method for an imaging system including an imaging apparatus to perform signal processing of a signal output from the imaging apparatus, the imaging apparatus including a micro lens array including a plurality of micro lenses;

a plurality of pixels arrayed in a matrix shape, each of which including m (m is an integer larger than 1) photoelectric conversion units each configured to generate signal charge, the m photoelectric conversion units being arranged in correspondence with one micro lense of the plurality of micro lenses, and the driving method comprising:

outputting, with at least a part of the pixels of the plurality of pixels, a first signal based on n (n is an integer less than m) photoelectric conversion units among the m photoelectric conversion units within one frame period;

outputting, with each of the plurality of pixels, a second signal based on the signal charge of the m photoelectric conversion units which each of the plurality of pixels includes, within the one frame period; and outputting, with the imaging apparatus, the signals based on the first signals and the signals based on the second signals by reducing the number of signals based on the first signals as compared to the number of signals based on the second signals;

wherein the signal processing is processing to obtain a difference signal which is difference between the signal based on the first signal of the pixel, and the signal based on the second signal of the pixel, to perform focal-point detection using the difference signal and the signal based on the first signal of the pixel, and to form an image using the signal based on the second signal of the pixel.

16. A driving method for an imaging system including an imaging apparatus to perform signal processing of a signal output from the imaging apparatus, the imaging apparatus including a plurality of pixels arrayed in a matrix shape, each of which includes m photoelectric conversion units each configured to generate signal charge, the m photoelectric conversion units being arranged in correspondence with one micro lense of the plurality of micro lenses, and the driving method comprising:

outputting, with each of the plurality of pixels, a first signal based on the signal charge of n (n is an integer less than m) photoelectric conversion units among m (m is an integer) photoelectric conversion units which each of the pixels includes, within one frame period;

outputting, with each of the plurality of pixels, a second signal based on the signal charge of the m photoelectric conversion units which each of the plurality of pixels includes, within the one frame period; and outputting, with the imaging apparatus, the signal based on the first signal and the signal based on the second signal;

wherein the signal processing is processing to output, of the signals based on the first signals of the plurality of pixels, the signals based on the first signals of a part of the pixels of the plurality of pixels, and not to output the signals based on the first signals of the other pixels of the plurality of pixels.

17. An imaging apparatus comprising:

a micro lens array including a plurality of micro lenses;

a plurality of pixels arrayed in a matrix shape, each including m (m is an integer larger than 1) photoelectric conversion units each configured to generate signal charge, and to output a signal based on the signal charge, the m photoelectric conversion units being arranged in correspondence with one micro lens of the plurality of micro lenses; and a signal processing unit;

wherein each of the plurality of pixels outputs a first signal based on the signal charge of a part of the m photoelectric conversion units within one frame period, and a second signal based on the signal charge of the other part of the m photoelectric conversion units within the one frame period, wherein the signal processing unit generates and outputs third signals each of which is generated by adding a signal based on the first signal of one of the plurality of pixels and a signal based on the second signal of the one of the plurality of pixels, and further generates and outputs fourth signals each of which is generated by adding a signal based on the first signal of the one of the plurality of pixels and a signal based on the first signal of the other one of the plurality of pixels, and wherein a number of the third signals output from the signal processing unit is less than a number of the fourth signals output from the signal processing unit.

18. The imaging apparatus according to claim 17, further comprising:

a plurality of analog-to-digital conversion circuits each configured to convert the first signal into a digital signal and convert the second signal into a digital signal;

wherein the plurality of pixels is arranged in rows and columns, wherein each of the plurality of analog-to-digital conversion circuits is arranged in correspondence with one of the columns of the plurality of pixels, and wherein each of the third signals is generated by adding the digital signal converted by the first signal of one of the plurality of pixels and the digital signal converted by the second signal of the one of the plurality of pixels, and each of the fourth signals is generated by adding the digital signal converted by the first signal of the one of the plurality of pixels and the digital signal converted by the first signal of the other one of the plurality of pixels.

* * * * *